US012563184B2

(12) United States Patent
Filippov et al.

(10) Patent No.: US 12,563,184 B2
(45) Date of Patent: Feb. 24, 2026

(54) METHOD AND APPARATUS FOR INTRA PREDICTION USING LINEAR MODEL

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 18/770,700

(22) Filed: Jul. 12, 2024

(65) Prior Publication Data

US 2025/0030835 A1     Jan. 23, 2025

Related U.S. Application Data

(63) Continuation of application No. 17/407,554, filed on Aug. 20, 2021, now Pat. No. 12,063,350, which is a
(Continued)

(51) Int. Cl.
*H04N 19/105*        (2014.01)
*H04N 19/117*        (2014.01)
(Continued)

(52) U.S. Cl.
CPC ......... *H04N 19/105* (2014.11); *H04N 19/117* (2014.11); *H04N 19/136* (2014.11); *H04N 19/186* (2014.11); *H04N 19/196* (2014.11)

(58) Field of Classification Search
CPC .... H04N 19/105; H04N 19/11; H04N 19/117; H04N 19/136; H04N 19/186;
(Continued)

(56) References Cited

U.S. PATENT DOCUMENTS 8,023,569  B2     9/2011   Sun
12,063,350  B2     8/2024   Filippov et al.
(Continued)

FOREIGN PATENT DOCUMENTS

CN        103369315  A      10/2013
CN        107409209  A       4/2018
(Continued)

OTHER PUBLICATIONS

Document: JCTVC-B021, Jungsun Kim et al, New intra chroma prediction using inter-channel correlation, Joint Collaborative Team on Video Coding (JCT-VC) of ITU-T SG16 WP3 and ISO/IEC JTC1/SC29/WG11, 2nd Meeting: Geneva, CH, Jul. 21-28, 2010, total 9 pages.
(Continued)

*Primary Examiner* — Nathnael Aynalem

(57)        ABSTRACT

The present disclosure relates to the field of picture processing. In particular, the present disclosure relates to improving intra prediction (such as the chroma intra prediction) using a cross component linear model (CCLM) and, more particularly, relating to spatial filtering used in a cross-component linear model for intra prediction with different chroma formats. An apparatus, an encoder, a decoder and corresponding methods for cross-component prediction for a picture, in which the set of down-sampling filters applied during the prediction depends on a chroma format, that may be one of multiple supported chroma formats are provided, so as to improve coding efficiency.

20 Claims, 22 Drawing Sheets

Related U.S. Application Data continuation of application No. PCT/CN2020/076466, filed on Feb. 24, 2020.

(60) Provisional application No. 62/825,796, filed on Mar. 28, 2019, provisional application No. 62/825,021, filed on Mar. 28, 2019, provisional application No. 62/809,555, filed on Feb. 22, 2019.

(51) Int. Cl.
| | | |
|---|---|---|
| *H04N 19/136* | (2014.01) | |
| *H04N 19/186* | (2014.01) | |
| *H04N 19/196* | (2014.01) | |

(58) Field of Classification Search
CPC .. H04N 19/196; H04N 19/107; H04N 19/109; H04N 19/103; H04N 19/503; H04N 19/587; H04N 19/59; H04N 19/593; H04N 19/86; H04N 19/23
USPC .............................................. 375/240–240.29
See application file for complete search history.

(56) References Cited

U.S. PATENT DOCUMENTS

| | | | | |
|---|---|---|---|---|
| 2013/0142260 | A1 | 6/2013 | Wahadaniah et al. | |
| 2014/0064386 | A1* | 3/2014 | Chen .................. | H04N 19/117 |
| | | | | 375/240.29 |
| 2016/0277762 | A1* | 9/2016 | Zhang ................. | H04N 19/593 |
| 2017/0150186 | A1* | 5/2017 | Zhang ................. | H04N 19/124 |
| 2017/0359595 | A1* | 12/2017 | Zhang ................. | H04N 19/186 |
| 2018/0077426 | A1* | 3/2018 | Zhang ................. | H04N 19/157 |
| 2018/0176594 | A1* | 6/2018 | Zhang ................... | H04N 19/59 |
| 2018/0205946 | A1 | 7/2018 | Zhang et al. | |
| 2021/0243457 | A1* | 8/2021 | Ahn ....................... | H04N 19/11 |

FOREIGN PATENT DOCUMENTS

| | | | |
|---|---|---|---|
| CN | 109257605 | A | 1/2019 |
| EP | 3684055 | A1 | 7/2020 |
| JP | 2014523698 | A | 9/2014 |
| JP | 2018056685 | A | 4/2018 |
| RU | 2637480 | C2 | 12/2017 |
| WO | 2012164939 | A1 | 12/2012 |
| WO | 2012175646 | A1 | 12/2012 |
| WO | 2013006986 | A1 | 1/2013 |
| WO | 2019009540 | A1 | 1/2019 |
| WO | 2019054200 | A1 | 3/2019 |

OTHER PUBLICATIONS

Document: JVET-L0191, Guillaume Laroche et al, CE3-5.1: On cross-component linear model simplification, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages.
Document: JVET-M0142-v3, Philippe Hanhart et al, CE3: Modified CCLM downsampling filter for "type-2" content (Test 2.4), Joint Video Experts Team (JVET) of ITU-T SG 16 WP 3 and ISO/IEC JTC 1/SC 29/WG 11, 13th Meeting: Marrakech, MA, Jan. 9-18, 2019, total 5 pages.
ITU-T H.264 (Apr. 2017), Series H: Audiovisual and Multimedia Systems, Infrastructure of audiovisual services—Coding of moving video, Advanced video coding for generic audiovisual services, total 812 pages.
ITU-T H.265 (Feb. 2018), Series H: Audiovisual and Multimedia Systems Infrastructure of audiovisual services—Coding of moving video, High efficiency video coding, total 692 pages.

International Search Report and Written Opinion issued in PCT/CN2020/076466, dated May 21, 2020, 9 pages.
JVET-M1002-v2, Jianle Chen et al., "Algorithm description for Versatile Video Coding and Test Model 4 (VTM 4)", 13th JVET Meeting; Jan. 2019, total 62 pages.
Extended European Search Report issued in EP20758453.3, dated Mar. 25, 2022, 10 pages.
Guillaume Laroche et al.,"Non-CE3: On cross-component linear model simplification", Joint Video Experts Team (JVET) of ITU-T SG 16 WP 3 and ISO/IEC JTC 1/SC 29/WG 11,11th Meeting: Ljubljana, SI, Jul. 10-18, 2018, JVET-K0204-v2, total: 5 pages.
Office Action issued in CN202080016082.2, dated Sep. 23, 2022, 8 pages.
Meng Wang et al., "CE3-1.5: CCLM derived with four neighbour-ing samples", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0271-v1, total: 3 pages.
Communication pursuant to Article 94(3) EPC issued in EP20758453.3, dated Feb. 13, 2023, 7 pages.
Wang, Meng et al., CE3-related: Modified linear model derivation for CCLM modes, Joint Video Experts Team (JVET) of ITU-T SG 16 WP 3 and ISO/IEC JTC 1/SC 29/WG 11 13th Meeting: Marrakech, MA, Jan. 9-18, 2019, [JVET-M0274], JVET-M0274 (version 1), ITU-T, Jan. 3, 2019, URL: http://jvet-experts.org/doc_end_user/documents/13_Marrakech/wg11/JVET-M0274-v1.zip>: JVET-M0274.docx: pp. 1-3.
Office Action issued in JP2021-549529, dated Jan. 4, 2023, 14 pages.
Zhou Yun et al, Study on the Development of Video Coding Standard VVC, Content Production and Broadcasting, 2018, with the English Abstract, 6 pages.
Filippov, Alexey et al., Support of 4:4:4 and 4:2:2 chroma formats in VVC, Joint Video Experts Team (JVET) of ITU-T SG 16 WP 3 and ISO/IEC JTC 1/SC 29/WG 11 14th Meeting: Geneva, CH, Mar. 19-27, 2019, [JVET-N0671-v3], JVET-N0671 (version 4), ITU-T, Mar. 24, 2019, URL: https://jvet-experts.org/doc_end_user/documents/14_Geneva/wg11/JVET-N0671-v4.zip>: JVET-N0671_v3.docx: pp. 1-7, JVET-N0671-DraftText.docx: pp. 15-17, 121-131.
Huo, Junyan et al., CE3-1. 5: CCLM derived with four neighbouring samples, Joint Video Experts Team (JVET) of ITU-T SG 16 WP 3 and ISO/IEC JTC 1/SC 29/WG 11 14th Meeting: Geneva, CH, Mar. 19-27, 2019, [JVET-N0271-v3], JVET-N0271 (version 4 ), ITU-T, Mar. 26, 2019, URL: https://jvet-experts.org/doc_end_user/documents/ 14_Geneva/ wg11/JVET-N0271-v4.zip>: JVET-N0271-v3_clean.docx: pp. 1-3.
Office Action issued in JP2021-549529, dated Sep. 19, 2023, with English translation, 18 pages.
Extended European Search Report issued in EP20758453.3, dated Sep. 8, 2023, 7 pages.
Filippov (Huawei) A et al: "4:4:4 and 4:2:2 chroma formats support for VVC", 14. JVET Meeting; Mar. 19, 2019-Mar. 27, 2019; Geneva; (The Joint Video Exploration Team of 1S0/IEC JTC1/SC29/WG11 and ITU-T SG.16 ), No. JVET-N0392 Mar. 22, 2019 (Mar. 22, 2019), XP030204485, Retrieved from the Internet: URL:http://phenix.int-evry.fr/jvet/doc_end_user/documents/14_ Geneva/wg11 /JVET-N0392-v5.zip JVET-N0392-DraftText.docx.
Office Action issued in RU2021127560/07, dated Jul. 19, 2023, 10 pages.
Jianle Chen et al: "Algorithm description for Versatile Video Coding and Test Model 4(VTM 4)", 13. JVET Meeting; Jan. 9, 2019-Jan. 19, 2019; Marrakech; (The Joint Video Exploration Team of ISO/IEC JTC1/SC29/WG11 and ITU-T SG.16 ), No. JVET-M1002-v2; JVET-M1002 Jan. 18, 2019 (Jan. 18, 2019), pp. 1-63, XP030255391.
Office Action issued in AU2020226573, dated Oct. 21, 2024, 4 pages.
Notice of Allowance issued in KR10-2021-7029813, dated Jan. 3, 2025, 2 pages.

* cited by examiner

X = Location of luma sample
O = Location of chroma sample

FIG. 6A

= Location of luma sample
= Location of chroma sample

FIG. 6B

X = Location of luma sample
O = Location of chroma sample

Luma

Chroma

4:2:2
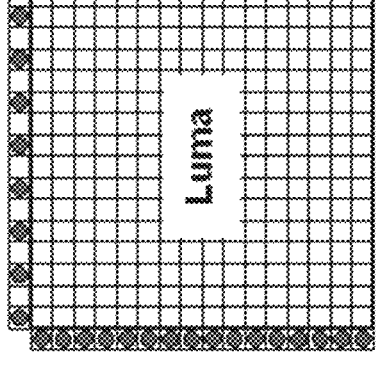
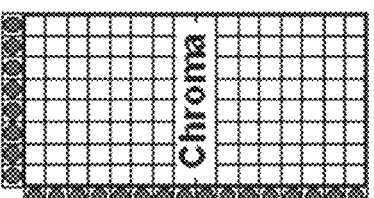
FIG. 7C

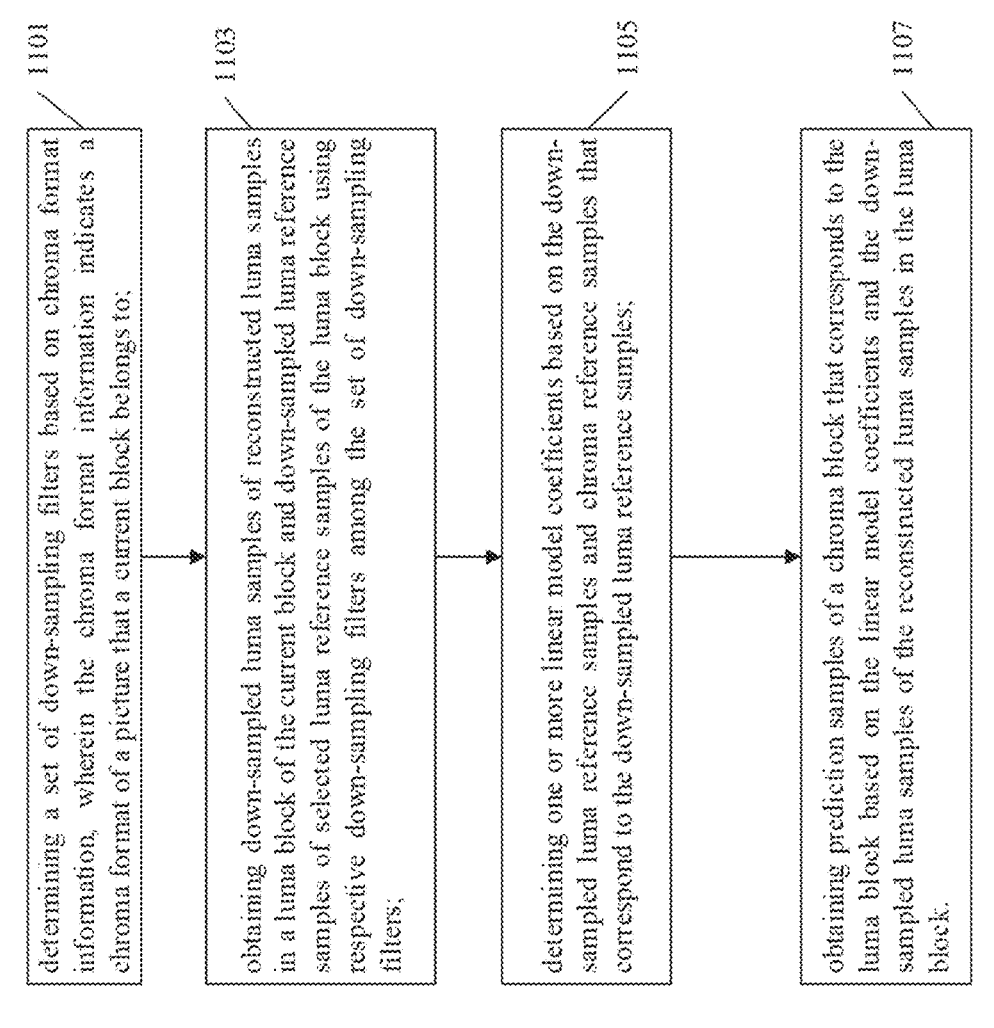

determining a set of down-sampling filters based on chroma format information, wherein the chroma format information indicates a chroma format of a picture that a current block belongs to; — 1101 obtaining down-sampled luma samples of reconstructed luma samples in a luma block of the current block and down-sampled luma reference samples of selected luma reference samples of the luma block using respective down-sampling filters among the set of down-sampling filters; — 1103 determining one or more linear model coefficients based on the down-sampled luma reference samples and chroma reference samples that correspond to the down-sampled luma reference samples; — 1105 obtaining prediction samples of a chroma block that corresponds to the luma block based on the linear model coefficients and the down-sampled luma samples of the reconstructed luma samples in the luma block. — 1107

METHOD AND APPARATUS FOR INTRA PREDICTION USING LINEAR MODEL

CROSS-REFERENCE TO RELATED APPLICATIONS

This application is a continuation of U.S. patent application Ser. No. 17/407,554, filed on Aug. 20, 2021, which is a continuation of International Application No. PCT/CN2020/076466, filed on Feb. 24, 2020, which claims the priority to U.S. Provisional Patent Application No. 62/809,555, filed Feb. 22, 2019 and Patent Application No. 62/825,021, filed Mar. 28, 2019 and Patent Application No. 62/825,796, filed Mar. 28, 2019. All of the aforementioned patent applications are hereby incorporated by reference in their entireties.

TECHNICAL FIELD

Embodiments of the present disclosure generally relate to the field of picture processing and more particularly to intra prediction (such as the chroma intra prediction) using cross component linear modeling (CCLM) and more particularly to spatial filtering used in cross-component linear model for intra prediction with different chroma formats.

BACKGROUND

Video coding (video encoding and/or decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands for higher video quality, improved compression and decompression techniques with a higher compression ratio and little to no sacrifice in picture quality are desirable.

Particularly, the current Versatile Video Coding and Test Model (VTM) coder mainly supports chroma format 4:2:0 as the input picture format. The VTM coder crash may happen when the input chroma format becomes 4:4:4. To avoid such an issue, a coder that supports other chroma formats (such as, 4:4:4 or 4:2:2) is highly desirable and even mandatory for a wide variety of applications.

SUMMARY

In view of the above-mentioned challenges, a modification to video coding process to support multiple chroma formats is proposed in the present disclosure. In particular, embodiments of the present application aim to provide an apparatus, an encoder, a decoder and corresponding methods for cross-component prediction for a picture, in which the set of down-sampling filters applied during the prediction depends on a chroma format, that may be one of multiple supported chroma formats, so as to improve coding efficiency.

Embodiments are defined by the features of the independent claims, and further advantageous implementations of the embodiments by the features of the dependent claims.

Particular embodiments are outlined in the attached independent claims, with other embodiments in the dependent claims.

The foregoing and other objects are achieved by the subject matter of the independent claims. Further implementation forms are apparent from the dependent claims, the description and the figures.

According to a first aspect of the invention, a method for performing intra prediction using a linear model is provided, the method comprises:

determining a set of down-sampling filters (a set of down-sampling filter coefficients) based on chroma format information, wherein the chroma format information indicates a chroma format of a picture that a current block belongs to;

obtaining down-sampled luma samples of reconstructed luma samples in a luma block of the current block and down-sampled luma reference samples of selected luma reference samples of the luma block (neighboring to the luma block) using respective down-sampling filters among (selected from) the set of down-sampling filters;

determining one or more linear model coefficients based on the down-sampled luma reference samples and (selected or available) chroma reference samples that correspond to the down-sampled luma reference samples; and obtaining prediction samples of a chroma block that corresponds to the luma block based on the linear model coefficients and the down-sampled luma samples of the reconstructed luma samples in the luma block.

Thus, an improved method is provided allowing for a more accurate chroma prediction signal and prediction error reduction by selection of the filter set based on the chroma format information. The technical result of a smaller prediction error is a reduction of residual signal energy. This coding method may utilize this reduction in order to decrease distortion of the reconstructed signal, decrease the bitrate that is required to encode residual signal or decrease both distortion and bitrate. These beneficial effects achieved by the present invention improve the values of the overall compression performance of the coding method that uses the present invention.

It is noted that the term "block", "coding block" or "image block" is used in the present disclosure which can be applied for transform units (TUs), prediction units (PUs), coding units (CUs) etc. In VVC in general transform units and coding units are mostly aligned except in few scenarios when TU tiling or sub block transform (SBT) is used. It can be understood that the terms "block/image block/coding block/transform block", and "block size/transform block size" may be exchanged with each other in the present disclosure. The terms "sample/pixel" may be exchanged with each other in the present disclosure.

In a possible implementation form of the method according to the first aspect as such, the determining a set of down-sampling filters (a set of down-sampling filter coefficients) based on chroma format information comprises:

determining subsampling ratio information in horizontal and vertical directions (such as the variables SubWidthC and SubHeightC) based on the chroma format information; and determining the set of down-sampling filters based on the subsampling ratio information (such as the variables SubWidthC and SubHeightC).

In a possible implementation form of the method according to any preceding implementation of the first aspect or the first aspect as such, for the chroma format being a 4:2:0 chroma format, a first set of down-sampling filters (a set of down-sampling filter coefficients) is used for the luma block of the current block;

for the chroma format being a 4:2:2 chroma format, a second set of down-sampling filters (a set of down-sampling filter coefficients) is used for a luma block of the current block; or for the chroma format being a 4:4:4 chroma format, a third set of down-sampling filters (i.e. a filter with coefficient [1], i.e. as a bypass filter) is used for a luma block of the current block.

In a possible implementation form of the method according to any preceding implementation of the first aspect or the first aspect as such, the determining the set of down-sampling filters based on the subsampling ratio information, comprises one or more of:

when the variables SubWidthC=2 and SubHeightC=2, determining a first set of down-sampling filters (a set of down-sampling filter coefficients) for the luma block of the current block;

when SubWidthC=2 and SubHeightC=1, determining a second set of down-sampling filters (a set of down-sampling filter coefficients) for the luma block of the current block; or when SubWidthC=1 and SubHeightC=1, determining a third set of down-sampling filters (a set of down-sampling filter coefficients) for the luma block of the current block.

In a possible implementation form of the method according to any preceding implementation of the first aspect or the first aspect as such, when a subsampled chroma sample is co-located with the corresponding luma sample within the current block, the obtaining down-sampled luma samples of reconstructed luma samples in a luma block of the current block and down-sampled luma reference samples of selected luma reference samples of the luma block using respective down-sampling filters among the set of down-sampling filters, comprises:

obtaining a down-sampled luma sample of a reconstructed luma sample in the luma block by applying a first down-sampling filter to a first set of reconstructed luma samples, wherein the first set of reconstructed luma samples comprises: reconstructed luma samples at positions that are horizontally and/or vertically adjacent to a position of the reconstructed luma sample (the down-sampled luma sample); and obtaining a down-sampled luma reference sample of at least one selected reference luma samples by applying the first down-sampling filter to a second set of reconstructed luma samples, wherein the second set of reconstructed luma samples comprises: reconstructed luma samples at positions that are horizontally and/or vertically adjacent to a position of the selected reference luma sample (the down-sampled luma sample);

wherein the first down-sampling filter is selected from the set of down-sampling filters.

In a possible implementation form of the method according to any preceding implementation of the first aspect or the first aspect as such, when 4:2:2 chroma format is used (SubWidthC=2 and SubHeightC=1), the first down-sampling filter is a 1D non-separable filter; or when 4:2:0 chroma format is used (SubWidthC=2 and SubHeightC=2), the first down-sampling filter is a 2D non-separable filter.

In a possible implementation form of the method according to any preceding implementation of the first aspect or the first aspect as such, when 4:2:2 chroma format is used (SubWidthC=2 and SubHeightC=1), the first down-sampling filter (1D non-separable filter F2 recited in standard) is represented by [1, 2, 1] or $$\begin{bmatrix} 0 & 0 & 0 \\ 1 & 2 & 1 \\ 0 & 0 & 0 \end{bmatrix},$$

wherein non-zero coefficients are at positions that are horizontally adjacent to the position of the filtered reconstructed luma sample, wherein a central position with a coefficient "2" corresponds to the position of the filtered reconstructed luma sample.

In a possible implementation form of the method according to any preceding implementation of the first aspect or the first aspect as such, if 4:2:0 chroma format is used (SubWidthC=2 and SubHeightC=2), the first down-sampling filter (2D non-separable filter, F3 recited in VVC standard) is represented by $$\begin{bmatrix} 0 & 1 & 0 \\ 1 & 4 & 1 \\ 0 & 1 & 0 \end{bmatrix},$$

wherein non-zero coefficients are at positions that are horizontally and/or vertically adjacent to the position of the filtered reconstructed luma sample, wherein the central position with the coefficient "4" corresponds to the position of the filtered reconstructed luma sample.

In a possible implementation form of the method according to any preceding implementation of the first aspect or the first aspect as such, when a subsampled chroma sample is not co-located with the corresponding luma sample within the current block, the obtaining down-sampled luma samples of reconstructed luma samples in a luma block of the current block and down-sampled luma reference samples of selected luma reference samples of the luma block using respective down-sampling filters among the set of down-sampling filters, comprises:

obtaining a down-sampled luma sample of a reconstructed luma sample in the luma block by applying a second down-sampling filter to a third set of reconstructed luma samples, wherein the third set of reconstructed luma samples comprises: reconstructed luma samples at positions that are horizontally and/or vertically adjacent to a position of the reconstructed luma sample (the down-sampled luma sample); and obtaining a down-sampled luma reference sample of at least one selected reference luma sample by applying the second down-sampling filters to a fourth set of reconstructed luma samples, wherein the fourth set of reconstructed luma samples comprises: reconstructed luma samples at positions that are horizontally and/or vertically adjacent to a position of the selected reference luma sample (the down-sampled luma sample); wherein the second down-sampling filter is selected from the set of down-sampling filters.

In a possible implementation form of the method according to any preceding implementation of the first aspect or the first aspect as such, if 4:2:2 chroma format is used (SubWidthC=2 and SubHeightC=1), the second down-sampling filter is 1D non-separable filter; or if 4:2:0 chroma format is used (SubWidthC=2 and SubHeightC=2), the second down-sampling filter is 2D non-separable filter.

In a possible implementation form of the method according to any preceding implementation of the first aspect or the first aspect as such, if 4:2:2 chroma format is used (SubWidthC=2 and SubHeightC=1), the second down-sampling filter (1D non-separable filter F1, F2 recited in standard) is represented by [2, 0] or [1, 2, 1] or $$\begin{bmatrix} 0 & 0 & 0 \\ 1 & 2 & 1 \\ 0 & 0 & 0 \end{bmatrix},$$

wherein non-zero coefficients are at positions that are horizontally adjacent to the position of the filtered reconstructed luma sample, wherein the central position with the coefficient "2" corresponds to the position of the filtered reconstructed luma sample.

In a possible implementation form of the method according to any preceding implementation of the first aspect or the first aspect as such, if 4:2:0 chroma format is used (SubWidthC=2 and SubHeightC=2), the second down-sampling filter (2D non-separable filter, F4 recited in VVC standard) is represented by $$\begin{bmatrix} 0 & 0 & 0 \\ 1 & 2 & 1 \\ 1 & 2 & 1 \end{bmatrix},$$

wherein non-zero coefficients are at positions that are horizontally or vertically adjacent to the position of the filtered reconstructed luma sample, wherein the central position with the coefficient "2" corresponds to the position of the filtered reconstructed luma sample.

In a possible implementation form of the method according to any preceding implementation of the first aspect or the first aspect as such, the subsampled chroma sample is co-located with the corresponding luma sample within the current block when a chroma sample type of the subsampled chroma sample comprises any one of the following:

Chroma sample type 2, or

Chroma sample type 4.

In a possible implementation form of the method according to any preceding implementation of the first aspect or the first aspect as such, the subsampled chroma sample is not co-located with the corresponding luma sample within the current block, when a chroma sample type of the subsampled chroma sample comprises any one of the following:

Chroma sample type 0,

Chroma sample type 1,

Chroma sample type 3, or

Chroma sample type 5.

In a possible implementation form of the method according to any preceding implementation of the first aspect or the first aspect as such, wherein the set of down-sampling filters is determined as follows:

if the chroma format is 4:4:4 chroma format, a bypass filter used; otherwise, the set of filters {F2, F3, F5, F6} is determined as follows:

F3[0]=1, F3[1]=2, F3[2]=1,

F5[i][j]=F6[i][j]=0, with i=0 . . . 2, j=0 . . . 2.

If the chroma format is 4:2:0 chroma format,

F5[0][1]=1, F5[1][1]=4, F5[2][1]=1, F5[1][0]=1, F5[1][2]=1,

F6[0][1]=1, F6[1][1]=2, F6[2][1]=1,

F6[0][2]=1, F6[1][2]=2, F6[2][2]=1,

F2[0]=1, F2[1]=1

If the chroma format is 4:2:2 chroma format,

F5[0][1]=0, F5[1][1]=8, F5[2][1]=0, F5[1][0]=0, F5[1][2]=0

F6[0][1]=2, F6[1][1]=4, F6[2][1]=2,

F6[0][2]=0, F6[1][2]=0, F6[2][2]=0,

F2[0]=2, F2[1]=0.

As above, the filters for the chroma format 4:2:0 and 4:2:2 is allowed to minimizing computation complexity by minimal access to neighbor samples. Thus it allows to providing desired spectral characteristics and smoothing effect. In addition, it allows to specifying the luma filtering process for the case when the chroma component is not subsampled.

In a possible implementation form of the method according to any preceding implementation of the first aspect or the first aspect as such, the set of down-sampling filters is determined as follows:

if at least a first condition including SubWidthC==1 and SubHeightC==1 is not fulfilled, a set of filters {F2, F3, F5, F6} is determined as follows:

F3[0]=1, F3[1]=2, F3[2]=1,

F5[i][j]=F6[i][j]=0, with i=0 . . . 2, j=0 . . . 2.

If at least a second condition is fulfilled, wherein the second condition includes SubWidthC==2 and SubHeightC==2,

F5[0][1]=1, F5[1][1]=4, F5[2][1]=1, F5[1][0]=1, F5[1][2]=1,

F6[0][1]=1, F6[1][1]=2, F6[2][1]=1,

F6[0][2]=1, F6[1][2]=2, F6[2][2]=1,

F2[0]=1, F2[1]=1

Otherwise,

F5[0][1]=0, F5[1][1]=8, F5[2][1]=0, F5[1][0]=0, F5[1][2]=0,

F6[0][1]=2, F6[1][1]=4, F6[2][1]=2,

F6[0][2]=0, F6[1][2]=0, F6[2][2]=0,

F2[0]=2, F2[1]=0.

As above, the filters for the chroma format 4:2:0 and 4:2:2 is allowed to minimizing computation complexity by minimal access to neighbor samples. Thus it allow to providing desired spectral characteristics and smoothing effect.

In a possible implementation form of the method according to any preceding implementation of the first aspect or the first aspect as such, the selected luma reference samples comprise at least one of:

neighboring luma samples that are above the luma block and that are selected based on L available chroma reference samples, or neighboring luma samples that are left to the luma block and that are selected based on L available chroma reference samples.

In a possible implementation form of the method according to any preceding implementation of the first aspect or the first aspect as such, the positions of the available chroma reference samples are specified as:

S[W'/4, −1], S[3 W'/4, −1], S[−1, H'/4], S[−1, 3H'/4] when LM mode is applied and both above and left neighboring samples are available;

S[W'/8, −1], S[3 W'/8, −1], S[5 W'/8, −1], S[7 W'/8, −1] when LM-A mode is applied or only the above neighboring samples are available; or S[−1, H'/8], S[−1, 3H'/8], S[−1, 5H'/8], S[−1, 7H'/8] when LM-L mode is applied or only the left neighboring samples are available;

wherein the chroma block dimensions are W×H, and W' and H' are set as

W'=W, H'=H when the LM mode is applied;

W'=W+H when the LM-A mode is applied;

H'=H+W when the LM-L mode is applied.

In a possible implementation form of the method according to any preceding implementation of the first aspect or the first aspect as such, the determining one or more linear model coefficients based on the down-sampled luma reference samples of the selected luma reference samples and chroma reference samples that correspond to the down-sampled luma reference samples, comprises:

determining a maximum luma value and a minimum luma value based on the down-sampled luma reference samples;

obtaining a first chroma value based, at least in part, upon one or more positions of one or more down-sampled luma reference samples associated with the maximum luma value;

obtaining a second chroma value based, at least in part, upon one or more positions of one or more down-sampled luma reference samples associated with the minimum luma value;

calculating the one or more linear model coefficients based on the first chroma value, the second chroma value, the maximum luma value and the minimum luma value.

According to a second aspect of the invention, a method of determining one or more downsampling filters (luma downsampling filter) used in cross-component prediction of a current image block of video data is provided, the method comprising:

determining chroma scaling factors in horizontal and vertical directions based on chroma format information, wherein the chroma format information indicates a chroma format of a current picture which the current image block belongs to;

when values of the chroma scaling factors in horizontal and vertical directions equal to a first value, determining a first set of downsampling filters (a set of downsampling filter coefficients) for a luma block of the current block;

when a value of the chroma scaling factor in horizontal direction equals to the first value and a value of the chroma scaling factor in vertical direction equals to a second value, determining a second set of downsampling filters (a set of downsampling filter coefficients) for a luma block of the current block; or when values of the chroma scaling factors in horizontal and vertical directions equal to the second value, determining a third set of downsampling filters (a set of downsampling filter coefficients) for a luma block of the current block.

According to a third aspect of the invention, a method of determining one or more luma downsampling filters used in cross-component prediction of a current block of video data, the method comprising:

determining a chroma format of a picture that the current block belongs to;

when the chroma format is 4:2:0 chroma format, determining a first set of downsampling filters (a set of downsampling filter coefficients) to be used for a luma block of the current block;

when the chroma format is 4:2:2 chroma format, determining a second set of downsampling filters (a set of downsampling filter coefficients) to be used for a luma block of the current block;

when the chroma format is 4:4:4 chroma format, determining a third set of downsampling filters (a set of downsampling filter coefficients) to be used for a luma block of the current block.

According to a fourth aspect of the invention, an apparatus for intra prediction using linear model, comprising:

a determining unit configured to determine a set of down-sampling filters based on chroma format information, wherein the chroma format information indicates a chroma format of a picture that a current block belongs to;

a filtering unit configured to obtain down-sampled luma samples of reconstructed luma samples in a luma block of the current block and down-sampled luma reference samples of selected luma reference samples of the luma block using respective down-sampling filters among the set of down-sampling filters;

a linear model derivation unit configured to determine one or more linear model coefficients based on the down-sampled luma reference samples and chroma reference samples that correspond to the down-sampled luma reference samples; and a prediction processing unit configured to obtain prediction samples of a chroma block that corresponds to the luma block based on the linear model coefficients and the down-sampled luma samples of the reconstructed luma samples in the luma block.

It is noted that the term "block", "coding block" or "image block" is used in the present disclosure which can be applied for transform units (TUs), prediction units (PUs), coding units (CUs) etc. In VVC in general transform units and coding units are mostly aligned except in few scenarios when TU tiling or sub block transform (SBT) is used. It can be understood that the terms "block/image block/coding block/transform block", and "block size/transform block size" may be exchanged with each other in the present disclosure. The terms "sample/pixel" may be exchanged with each other in the present disclosure.

Thus, an improved device is provided allowing for a more accurate chroma prediction signal and prediction error reduction by selection of the filter set based on the chroma format information. The technical result of a smaller prediction error is a reduction of residual signal energy. This coding method may utilize this reduction in order to decrease distortion of the reconstructed signal, decrease the bitrate that is required to encode residual signal or decrease both distortion and bitrate. These beneficial effects achieved by the present invention improve the overall compression performance of the coding method that uses the present invention.

In a possible implementation form of the apparatus according to the fourth aspect as such, the determining unit is configured to:

determine subsampling ratio information in horizontal and vertical directions based on the chroma format information; and determine the set of down-sampling filters based on the subsampling ratio information.

In a possible implementation form of the apparatus according to any preceding implementation of the fourth aspect or the fourth aspect as such, for the chroma format being a 4:2:0 chroma format, a first set of down-sampling filters is used for the luma block of the current block;

for the chroma format being a 4:2:2 chroma format, a second set of down-sampling filters is used for a luma block of the current block; or for the chroma format being a 4:4:4 chroma format, a third set of down-sampling filters is used for a luma block of the current block.

In a possible implementation form of the apparatus according to any preceding implementation of the fourth aspect or the fourth aspect as such, the determining unit is configured for:

when the variables SubWidthC=2 and SubHeightC=2, determining a first set of down-sampling filters (a set of down-sampling filter coefficients) for the luma block of the current block;

when SubWidthC=2 and SubHeightC=1, determining a second set of down-sampling filters (a set of down-sampling filter coefficients) for the luma block of the current block; or when SubWidthC=1 and SubHeightC=1, determining a third set of down-sampling filters (a set of down-sampling filter coefficients) for the luma block of the current block.

In a possible implementation form of the apparatus according to any preceding implementation of the fourth aspect or the fourth aspect as such, when a subsampled chroma sample is co-located with the corresponding luma sample within the current block, the filtering unit is configured to: obtain a down-sampled luma sample of a reconstructed luma sample in the luma block by applying a first down-sampling filter to a first set of reconstructed luma samples, wherein the first set of reconstructed luma samples comprises: reconstructed luma samples at positions that are horizontally and/or vertically adjacent to a position of the reconstructed luma sample; and obtain a down-sampled luma reference sample of at least one selected reference luma samples by applying the first down-sampling filter to a second set of reconstructed luma samples, wherein the second set of reconstructed luma samples comprises: reconstructed luma samples at positions that are horizontally and/or vertically adjacent to a position of the selected reference luma sample;

wherein the first down-sampling filter is selected from the set of down-sampling filters.

In a possible implementation form of the apparatus according to any preceding implementation of the fourth aspect or the fourth aspect as such, when 4:2:2 chroma format is used (SubWidthC=2 and SubHeightC=1), the first down-sampling filter is a 1D non-separable filter; or when 4:2:0 chroma format is used (SubWidthC=2 and SubHeightC=2), the first down-sampling filter is a 2D non-separable filter.

In a possible implementation form of the apparatus according to any preceding implementation of the fourth aspect or the fourth aspect as such, when 4:2:2 chroma format is used (SubWidthC=2 and SubHeightC=1), the first down-sampling filter (1D non-separable filter F2 recited in standard) is represented by [1, 2, 1] or $$\begin{bmatrix} 0 & 0 & 0 \\ 1 & 2 & 1 \\ 0 & 0 & 0 \end{bmatrix},$$

wherein non-zero coefficients at positions that are horizontally adjacent to the position of the filtered reconstructed luma sample, wherein a central position with a coefficient "2" corresponds to the position of the filtered reconstructed luma sample.

In a possible implementation form of the apparatus according to any preceding implementation of the fourth aspect or the fourth aspect as such, if 4:2:0 chroma format is used (SubWidthC=2 and SubHeightC=2), the first down-sampling filter (2D no-separable filter, F3 recited in VVC standard) is represented by $$\begin{bmatrix} 0 & 1 & 0 \\ 1 & 4 & 1 \\ 0 & 1 & 0 \end{bmatrix},$$

wherein non-zero coefficients are at positions that are horizontally and/or vertically adjacent to the position of the filtered reconstructed luma sample, wherein the central position with the coefficient "4" corresponds to the position of the filtered reconstructed luma sample.

In a possible implementation form of the apparatus according to any preceding implementation of the fourth aspect or the fourth aspect as such, when a subsampled chroma sample is not co-located with the corresponding luma sample within the current block, the filtering unit is configured to: obtain a down-sampled luma sample of a reconstructed luma sample in the luma block by applying a second down-sampling filter to a third set of reconstructed luma samples, wherein the third set of reconstructed luma samples comprises: reconstructed luma samples at positions that are horizontally and/or vertically adjacent to a position of the reconstructed luma sample; and obtain a down-sampled luma reference sample of at least one selected reference luma sample by applying the second down-sampling filters to a fourth set of reconstructed luma samples, wherein the fourth set of reconstructed luma samples comprises: reconstructed luma samples at positions that are horizontally and/or vertically adjacent to a position of the selected reference luma sample;

wherein the second down-sampling filter is selected from the set of down-sampling filters.

In a possible implementation form of the apparatus according to any preceding implementation of the fourth aspect or the fourth aspect as such, if 4:2:2 chroma format is used (SubWidthC=2 and SubHeightC=1), the second down-sampling filter is 1D non-separable filter; or if 4:2:0 chroma format is used (SubWidthC=2 and SubHeightC=2), the second down-sampling filter is 2D non-separable filter.

In a possible implementation form of the apparatus according to any preceding implementation of the fourth aspect or the fourth aspect as such, if 4:2:2 chroma format is used (SubWidthC=2 and SubHeightC=1), the second down-sampling filter (1D non-separable filter F1, F2 recited in standard) is represented by [2, 0] or [1, 2, 1] or $$\begin{bmatrix} 0 & 0 & 0 \\ 1 & 2 & 1 \\ 0 & 0 & 0 \end{bmatrix},$$

wherein non-zero coefficients are at positions that are horizontally adjacent to the position of the filtered reconstructed luma sample, wherein the central position with the coefficient "2" corresponds to the position of the filtered reconstructed luma sample.

In a possible implementation form of the apparatus according to any preceding implementation of the fourth aspect or the fourth aspect as such, if 4:2:0 chroma format is used (SubWidthC=2 and SubHeightC=2), the second down-sampling filter (2D non-separable filter, F4 recited in VVC standard) is represented by $$\begin{bmatrix} 0 & 0 & 0 \\ 1 & 2 & 1 \\ 1 & 2 & 1 \end{bmatrix},$$

wherein non-zero coefficients are at positions that are horizontally or vertically adjacent to the position of the filtered reconstructed luma sample, wherein the central position with the coefficient "2" corresponds to the position of the filtered reconstructed luma sample.

In a possible implementation form of the apparatus according to any preceding implementation of the fourth aspect or the fourth aspect as such, the subsampled chroma sample is co-located with the corresponding luma sample within the current block when a chroma sample type of the subsampled chroma sample comprises any one of the following:

Chroma sample type 2, or

Chroma sample type 4.

In a possible implementation form of the apparatus according to any preceding implementation of the fourth aspect or the fourth aspect as such, the subsampled chroma sample is not co-located with the corresponding luma sample within the current block, when a chroma sample type of the subsampled chroma sample comprises any one of the following:

Chroma sample type 0,

Chroma sample type 1,

Chroma sample type 3, or

Chroma sample type 5.

In a possible implementation form of the apparatus according to any preceding implementation of the fourth aspect or the fourth aspect as such, the determining unit is configured to determine a set of down-sampling filters:

if the chroma format is 4:4:4 chroma format, a bypass filter used; otherwise, the set of filters {F2, F3, F5, F6} is determined as follows:

F3[0]=1, F3[1]=2, F3[2]=1,

F5[i][j]=F6[i][j]=0, with i=0 . . . 2, j=0 . . . 2

If the chroma format is 4:2:0 chroma format,

F5[0][1]=1, F5[1][1]=4, F5[2][1]=1, F5[1][0]=1, F5[1][2]=1,

F6[0][1]=1, F6[1][1]=2, F6[2][1]=1,

F6[0][2]=1, F6[1][2]=2, F6[2][2]=1,

F2[0]=1, F2[1]=1.

If the chroma format is 4:2:2 chroma format,

F5[0][1]=0, F5[1][1]=8, F5[2][1]=0, F5[1][0]=0, F5[1][2]=0,

F6[0][1]=2, F6[1][1]=4, F6[2][1]=2,

F6[0][2]=0, F6[1][2]=0, F6[2][2]=0,

F2[0]=2, F2[1]=0.

In a possible implementation form of the apparatus according to any preceding implementation of the fourth aspect or the fourth aspect as such, the determining unit is configured to determine a set of filters {F2, F3, F5, F6} as follows:

F3[0]=1, F3[1]=2, F3[2]=1,

F5[i][j]=F6[i][j]=0, with i=0 . . . 2, j=0 . . . 2.

wherein, if at least a second condition is fulfilled, wherein the second condition includes SubWidthC==2 and SubHeightC==2,

F5[0][1]=1, F5[1][1]=4, F5[2][1]=1, F5[1][0]=1, F5[1][2]=1,

F6[0][1]=1, F6[1][1]=2, F6[2][1]=1,

F6[0][2]=1, F6[1][2]=2, F6[2][2]=1,

F2[0]=1, F2[1]=1.

Otherwise,

F5[0][1]=0, F5[1][1]=8, F5[2][1]=0, F5[1][0]=0, F5[1][2]=0,

F6[0][1]=2, F6[1][1]=4, F6[2][1]=2,

F6[0][2]=0, F6[1][2]=0, F6[2][2]=0,

F2[0]=2, F2[1]=0.

In a possible implementation form of the apparatus according to any preceding implementation of the fourth aspect or the fourth aspect as such, the selected luma reference samples comprise at least one of:

neighboring luma samples that are above the luma block and that are selected based on L available chroma reference samples, or neighboring luma samples that are left to the luma block and that are selected based on L available chroma reference samples.

In a possible implementation form of the apparatus according to any preceding implementation of the fourth aspect or the fourth aspect as such, the positions of the available chroma reference samples are specified as:

S[W'/4, −1], S[3 W'/4, −1], S[−1, H'/4], S[−1, 3H'/4] when LM mode is applied and both above and left neighboring chroma samples are available;

S[W'/8, −1], S[3 W'/8, −1], S[5 W'/8, −1], S[7 W'/8, −1] when LM-A mode is applied or only the above neighboring chroma samples are available;

S[−1, H'/8], S[−1, 3H'/8], S[−1, 5H'/8], S[−1, 7H'/8] when LM-L mode is applied or only the left neighboring chroma samples are available;

wherein the chroma block dimensions are W×H, and W' and H' are set as

W'=W, H'=H when the LM mode is applied;

W'=W+H when the LM-A mode is applied; and

H'=H+W when the LM-L mode is applied.

In a possible implementation form of the apparatus according to any preceding implementation of the fourth aspect or the fourth aspect as such, the linear model derivation unit is configured to determine a maximum luma value and a minimum luma value based on the down-sampled luma reference samples;

obtain a first chroma value based, at least in part, upon one or more positions of one or more down-sampled luma reference samples associated with the maximum luma value;

obtain a second chroma value based, at least in part, upon one or more positions of one or more down-sampled luma reference samples associated with the minimum luma value; and calculate the one or more linear model coefficients based on the first chroma value, the second chroma value, the maximum luma value and the minimum luma value.

According to a fifth aspect, the disclosure relates to a method of encoding implemented by an encoding device, comprising:

performing intra prediction using linear model (such as cross-component linear model, CCLM, or multi-directional linear model, MDLM) according to any of the preceding aspects; and generating a bitstream including a plurality of syntax elements, wherein the plurality of syntax elements include a syntax element which indicates a selection of a filter for a luma sample belonging to a block (such as a selection of a luma filter of CCLM, in particular, a SPS flag, such as sps_cclm_colocated_chroma_flag).

In a possible implementation form of the method according to the fifth aspect as such, wherein when the value of the syntax element is 0 or false, the filter is applied to a luma sample for the linear model determination and the prediction; and when the value of the syntax element is 1 or true, the filter is not applied to a luma sample for the linear model determination and the prediction.

According to a sixth aspect, the disclosure relates to a method of decoding implemented by a decoding device, comprising:

parsing from a bitstream a plurality of syntax elements, wherein the plurality of syntax elements include a syntax element which indicates a selection of a filter for a luma sample belonging to a block (such as a selection of a luma filter of CCLM, in particular, a SPS flag, such as sps_cclm_colocated_chroma_flag); and performing intra prediction using the indicated linear model (such as CCLM) according to any of the preceding aspects.

In a possible implementation form of the method according to the sixth aspect as such, when the value of the syntax element is 0 or false, the filter is applied to a luma sample for the linear model determination and the prediction;

when the value of the syntax element is 1 or true, the filter is not applied to a luma sample for the linear model determination and the prediction, e.g., when co-located, do not use luma filter.

According to a seventh aspect, the disclosure relates to a decoder, comprising:

one or more processors; and a non-transitory computer-readable storage medium coupled to the processors and storing programming for execution by the processors, wherein the programming, when executed by the processors, configures the decoder to carry out the method according to any of the preceding aspects or any possible embodiment of the preceding aspects.

According to an eighth aspect, the disclosure relates to an encoder, comprising:

one or more processors; and a non-transitory computer-readable storage medium coupled to the processors and storing programming for execution by the processors, wherein the programming, when executed by the processors, configures the encoder to carry out the method according to the preceding aspects or any possible embodiment of the preceding aspects.

The method according to the first aspect of the disclosure can be performed by the apparatus according to the fourth aspect of the disclosure. Further features and implementation forms of the method according to the first aspect of the disclosure correspond to the features and implementation forms of the apparatus according to the fourth aspect of the disclosure.

The method according to the first aspect of the disclosure can be performed by the apparatus according to the fourth aspect of the disclosure. Further features and implementation forms of the method according to the first aspect of the disclosure correspond to the features and implementation forms of the apparatus according to the fourth aspect of the disclosure.

According to another aspect the disclosure relates to an apparatus for decoding a video stream includes a processor and a memory. The memory is storing instructions that cause the processor to perform the method according to the first or third aspect.

According to another aspect the disclosure relates to an apparatus for encoding a video stream includes a processor and a memory. The memory is storing instructions that cause the processor to perform the method according to the second aspect.

According to another aspect, a computer-readable storage medium having stored thereon instructions that, when executed, cause one or more processors configured to code video data is proposed. The instructions cause the one or more processors to perform a method according to the first or second or third aspect or any possible embodiment of the first or second or third aspect.

According to another aspect, the disclosure relates to a computer program comprising program code for performing the method according to the first or second or third aspect or any possible embodiment of the first or second or third aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments are described in more detail with reference to the attached figures and drawings, in which:

FIG. 6A is an example illustrating nominal vertical and horizontal locations of 4:2:0 luma and chroma samples in a picture;

FIG. 6B is an example illustrating nominal vertical and horizontal locations of 4:2:2 luma and chroma samples in a picture;

FIG. 6C is an example illustrating nominal vertical and horizontal locations of 4:4:4 luma and chroma samples in a picture;

FIG. 7C is an example illustrating co-located luma and chroma blocks which are included in a current image block of a current picture and the associated luma and chroma reference samples, when the chroma format of the current picture is 4:4:4;

FIG. 11 is a flow diagram illustrating a process for performing cross-component intra-prediction according to some aspects of the present disclosure.

Figure 1A:
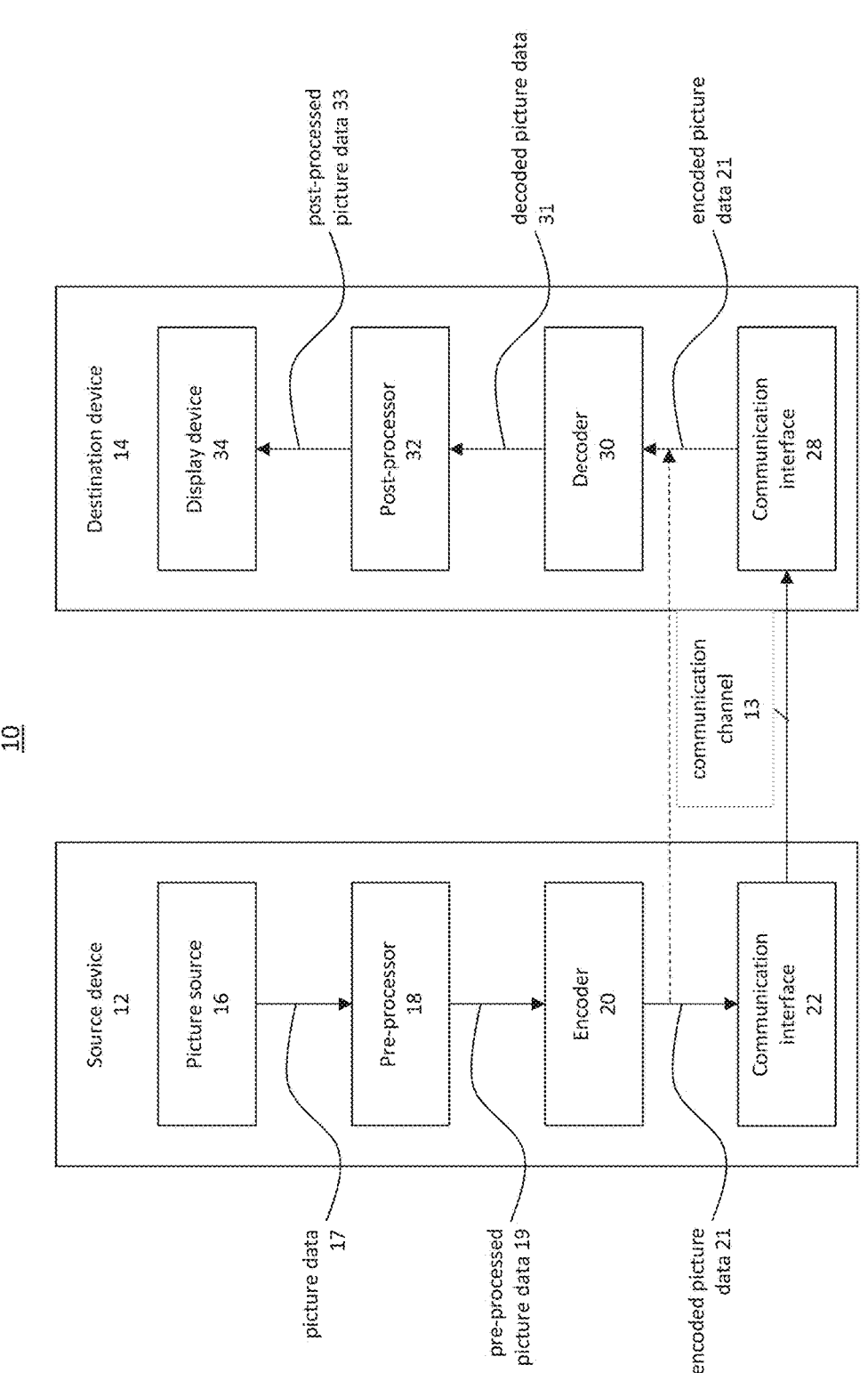
FIG. 1A is a block diagram showing an example of a video coding system configured to implement embodiments disclosed herein.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments disclosed herein or specific aspects in which embodiments disclosed herein may be used. It is understood that embodiments disclosed herein may be used in other aspects and comprise structural or logical changes not depicted in the figures. The following detailed description, therefore, is not to be taken in a limiting sense, and the scope of the present disclosure is defined by the appended claims.

The following abbreviations apply:

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of using the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or coding system 10 for short) that may utilize techniques of this present application. Video encoder 20 (or encoder 20 for short) and video decoder 30 (or decoder 30 for short) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 21.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 21 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may comprise, for example, liquid crystal displays (LCD), organic light emitting diodes (OLED) displays, plasma displays, projectors, micro LED displays, liquid crystal on silicon (LCoS), a digital light processor (DLP) or any kind of other display(s).

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
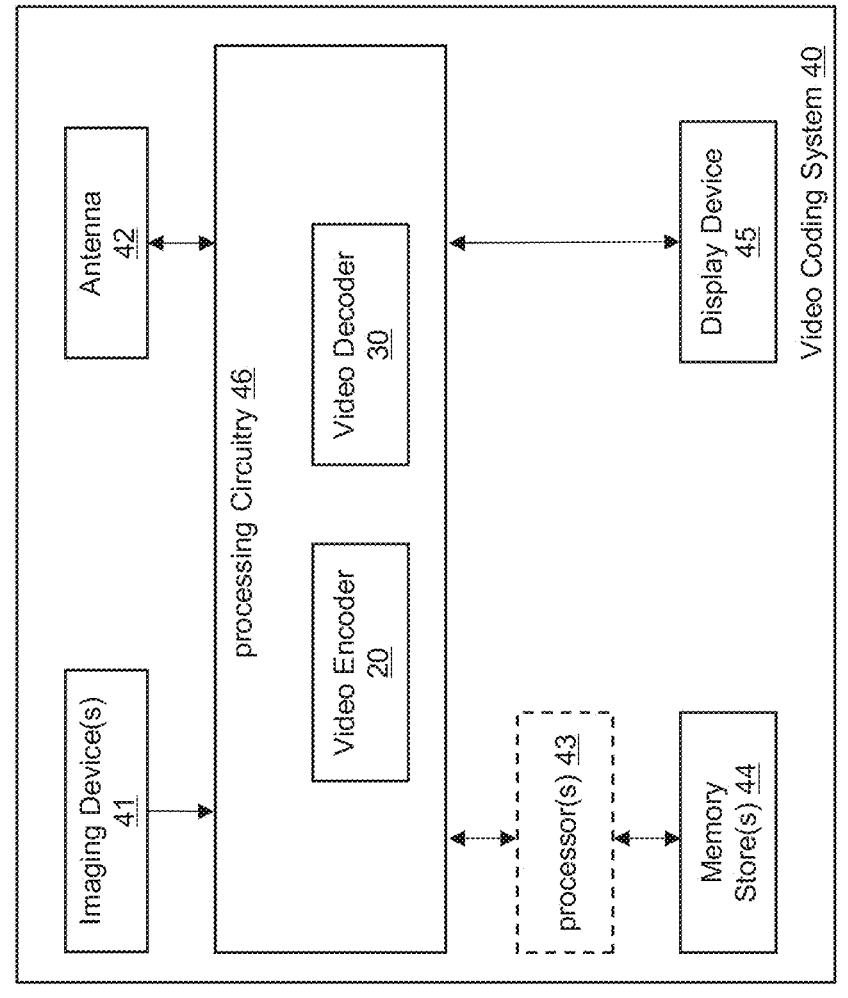
FIG. 1B is a block diagram showing another example of a video coding system configured to implement embodiments disclosed herein.

The encoder 20 (e.g. a video encoder 20) or the decoder 30 (e.g. a video decoder 30) or both the encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments disclosed herein are not limited to HEVC or VVC.

Encoder and Encoding Method

Figure 2:
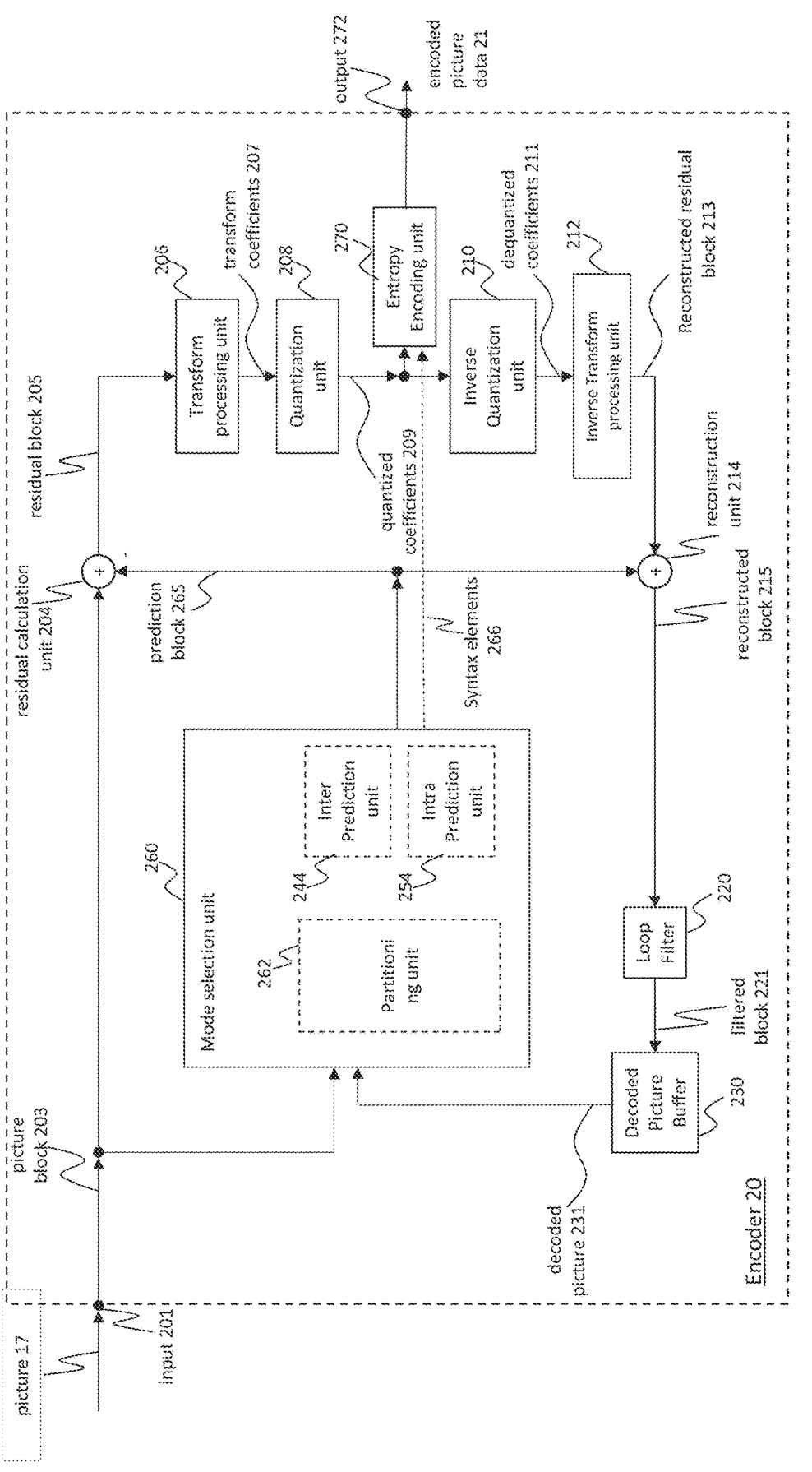
FIG. 2 is a block diagram showing an example of a video encoder configured to implement embodiments disclosed herein.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
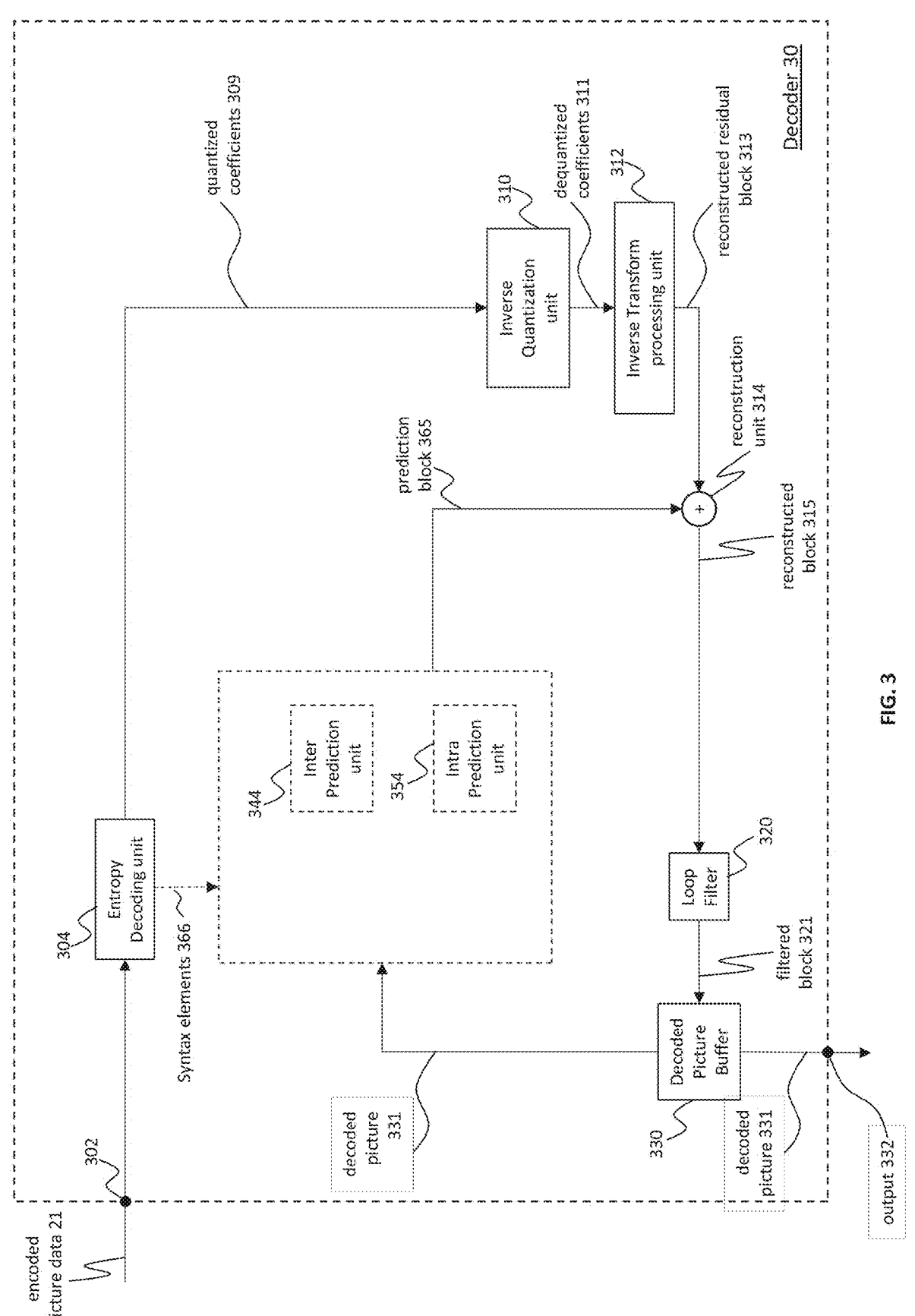
FIG. 3 is a block diagram showing an example structure of a video decoder configured to implement embodiments disclosed herein.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or a matrix of samples with intensity values. A sample in the array may also be referred to as a pixel (a short form of a picture element) or a pel. The number of samples in the horizontal and vertical direction (or axis) of the array or picture define the size and/or resolution of the picture. For representation of color, typically three color components are employed, i.e. the picture may be represented or include three sample arrays. In an RGB format or a color space, a picture comprises a corresponding red, green and blue sample array. However, in video coding, each pixel is typically represented in a luminance and chrominance format or a color space, e.g. YCbCr, which comprises a luminance component indicated by Y (sometimes also L is used instead) and two chrominance components indicated by Cb and Cr. The luminance (or luma for short) component Y represents the brightness or grey level intensity (e.g. like in a grey-scale picture), while the two chrominance (or chroma for short) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the current block size, or to change the current block size between pictures or subsets or groups of pictures, and partition each picture into the corresponding blocks.

In further embodiments, the video encoder 20 may be configured to receive directly a block 203 of the picture 17, e.g. one, several or all blocks forming the picture 17. The picture block 203 may also be referred to as a current picture block or a picture block to be coded.

Like the picture 17, the picture block 203 again is or can be regarded as a two-dimensional array or a matrix of samples with intensity values (sample values), although of smaller dimension than the picture 17. In other words, the current block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the current block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as a residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, a bit depth of the transform coefficients, a tradeoff between accuracy and implementation costs, etc. Specific scaling factors are, for example, specified for the inverse transform, e.g. by inverse transform processing unit 212 (and the corresponding inverse transform, e.g., by inverse transform processing unit 312 at the video decoder 30) and corresponding scaling factors for the forward transform, e.g. by the transform processing unit 206, at an encoder 20 may be specified accordingly.

Embodiments of the video encoder 20 (comprising the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding dequantization and/or the inverse quantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for the quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (comprising the quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond to the transform coefficients 207, although typically not identical to the transform coefficients due to the loss by quantization.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (e.g. an adder or a summer) is configured to add the transform block 213 (i.e. a reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or a "loop filter" 220 for short) is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (comprising the loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e.

select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the current block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the current block partitions or sub-blocks, wherein the mode selection comprises the selection of the tree-structure of the partitioned block 203 and the prediction modes are applied to each of the current block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the current block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of the video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the current block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous, at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, a skip mode and/or a direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the current blocks and video slices for use by video decoder 30 in decoding the picture blocks of the video slice. In addition or as an alternative to slices and respective syntax elements, tile groups and/or tiles and respective syntax elements may be generated or used.
Entropy Coding The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.
Decoder and Decoding Method FIG. 3 shows an example video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DPB) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 20 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.
Entropy Decoding The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), an intra prediction parameter (e.g., an intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by the video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening filter, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or display to a user.

Prediction

The inter prediction unit 344 may be identical to the inter prediction unit 244 (in particular to the motion compensation unit) and the intra prediction unit 354 may be identical to the intra prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and use the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g., a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of a motion vector is bitDepth, then the range is-$2^{\wedge}$(bitDepth−1)~ $2^{\wedge}$(bitDepth−1)−1, where "A" means exponentiation. For example, if bitDepth is set equal to 16, the range is −32768~ 32767; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = \left(mvx + 2^{bitDepth}\right) \% \ 2^{bitDepth} \qquad (1)$$

$$mvx = \left(ux >= 2^{bitDepth-1}\right) ? \left(ux - 2^{bitDepth}\right): ux \qquad (2)$$

$$uy = \left(mvy + 2^{bitDepth}\right) \% \ 2bitDepth \qquad (3)$$

$$mvy = \left(uy >= 2^{bitDepth-1}\right) ? \left(uy - 2^{bitDepth}\right): uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer systems, decimal numbers are stored as two's complement. The two's complement of −32769 is 1,0111,1111, 1111,1111 (17 bits), then the MSB is discarded, so the resulting two's complement is 0111, 1111,1111, 1111 (decimal number is 32767), which is same as the output by applying formula (1) and (2).

$$ux = \left(mvpx + mvdx + 2^{bitDepth}\right) \% \ 2^{bitDepth} \qquad (5)$$

$$mvx = \left(ux >= 2^{bitDepth-1}\right) ? \left(ux - 2^{bitDepth}\right): ux \qquad (6)$$

$$uy = \left(mvpy + mvdy + 2^{bitDepth}\right) \% \ 2^{bitDepth} \qquad (7)$$

$$mvy = \left(uy >= 2^{bitDepth-1}\right) ? \left(uy - 2^{bitDepth}\right): uy \qquad (8)$$

The operations may be applied during the sum of mvp and mvd, as shown in formula (5) to (8).

Method 2: remove the overflow MSB by clipping the value $$vx = Clip3\left(-2^{bitDepth} - 1, 2^{bitDepth} - 1 - 1, vx\right)$$

$$vy = Clip3\left(-2^{bitDepth} - 1, 2^{bitDepth} - 1 - 1, vy\right)$$

where vx is a horizontal component of a motion vector of an image block or a sub-block, vy is a vertical component of a motion vector of an image block or a sub-block; x, y and z respectively correspond to three input values of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
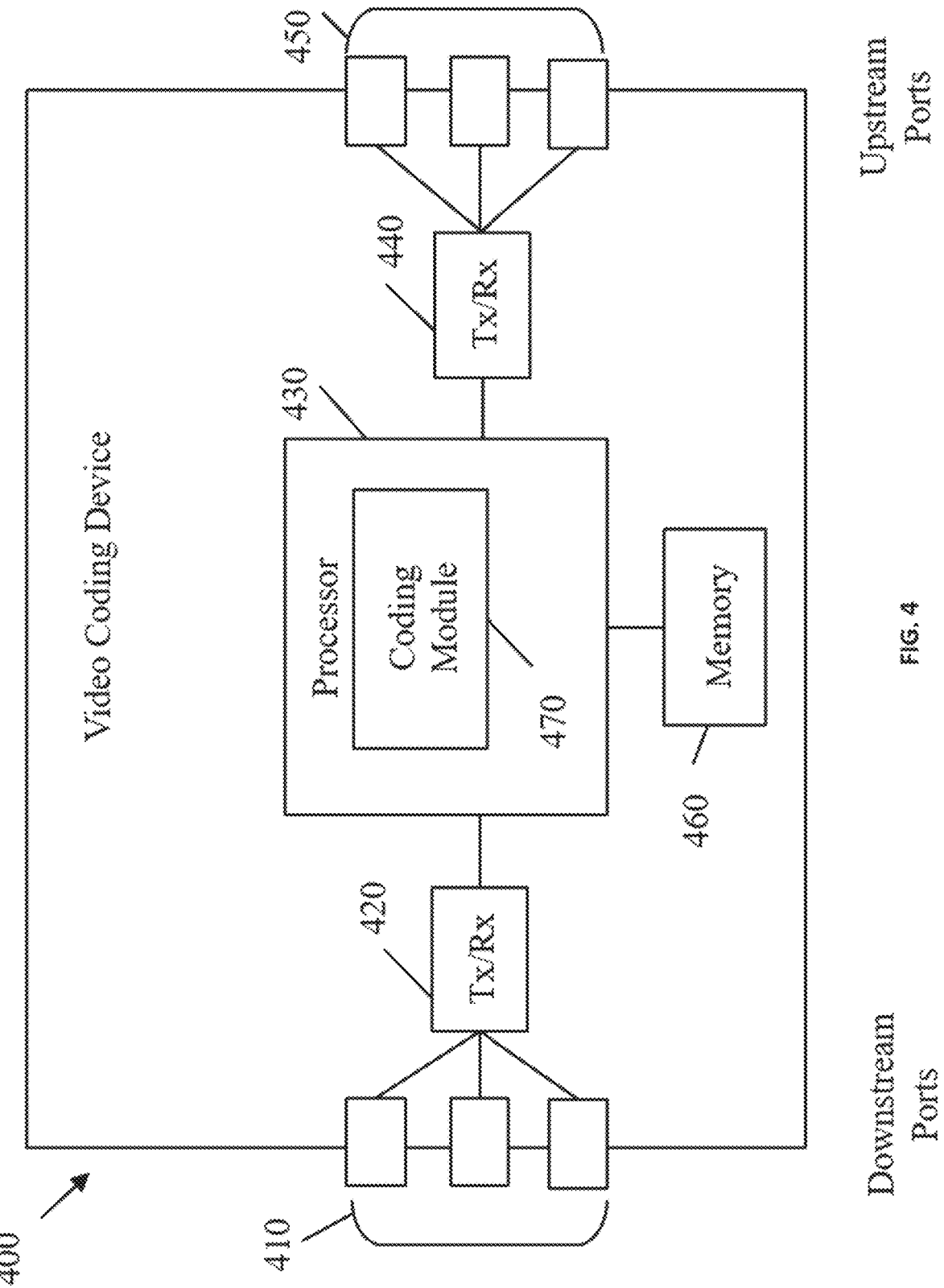
FIG. 4 is a block diagram illustrating an example of an encoding apparatus or a decoding apparatus according to an embodiment disclosed herein.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
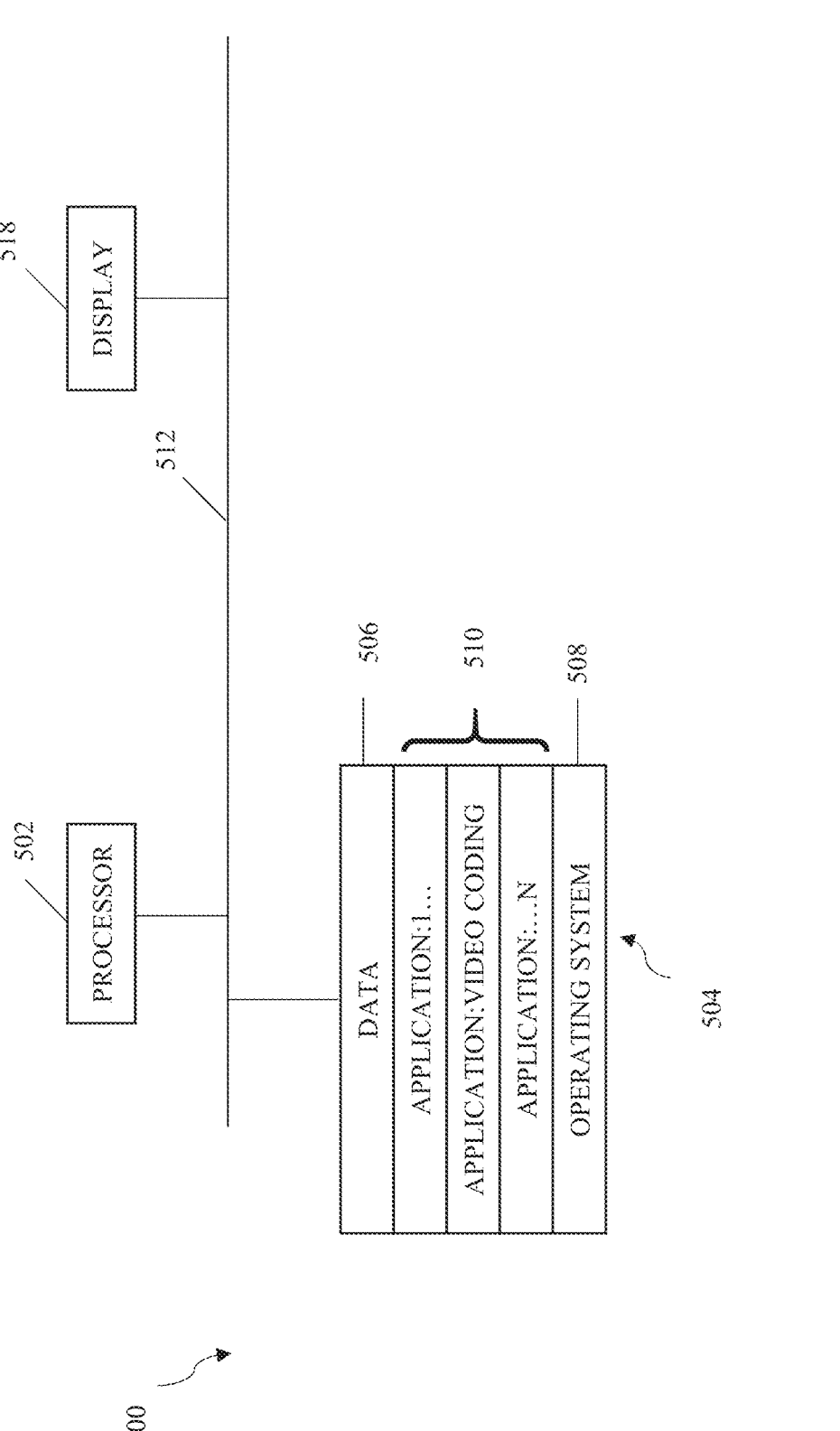
FIG. 5 is a block diagram illustrating another example of an encoding apparatus or a decoding apparatus according to an exemplary embodiment disclosed herein.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The embodiments presented herein will be described in more detail as follows. A video source that is represented by a bitstream can include a sequence of pictures in decoding order.

Each of the pictures (which can be a source picture or a decoded picture) includes one or more of the following sample arrays:

Luma (Y) only (monochrome).

Luma and two chroma (YCbCr or YCgCo).

Green, blue, and red (GBR, also known as RGB).

Arrays representing other unspecified monochrome or tri-stimulus colour samplings (for example, YZX, also known as XYZ).

For convenience of notation and terminology in the present disclosure, the variables and terms associated with these arrays are referred to as luma (or L or Y) and chroma, where the two chroma arrays are referred to as Cb and Cr.

Figure 6A:
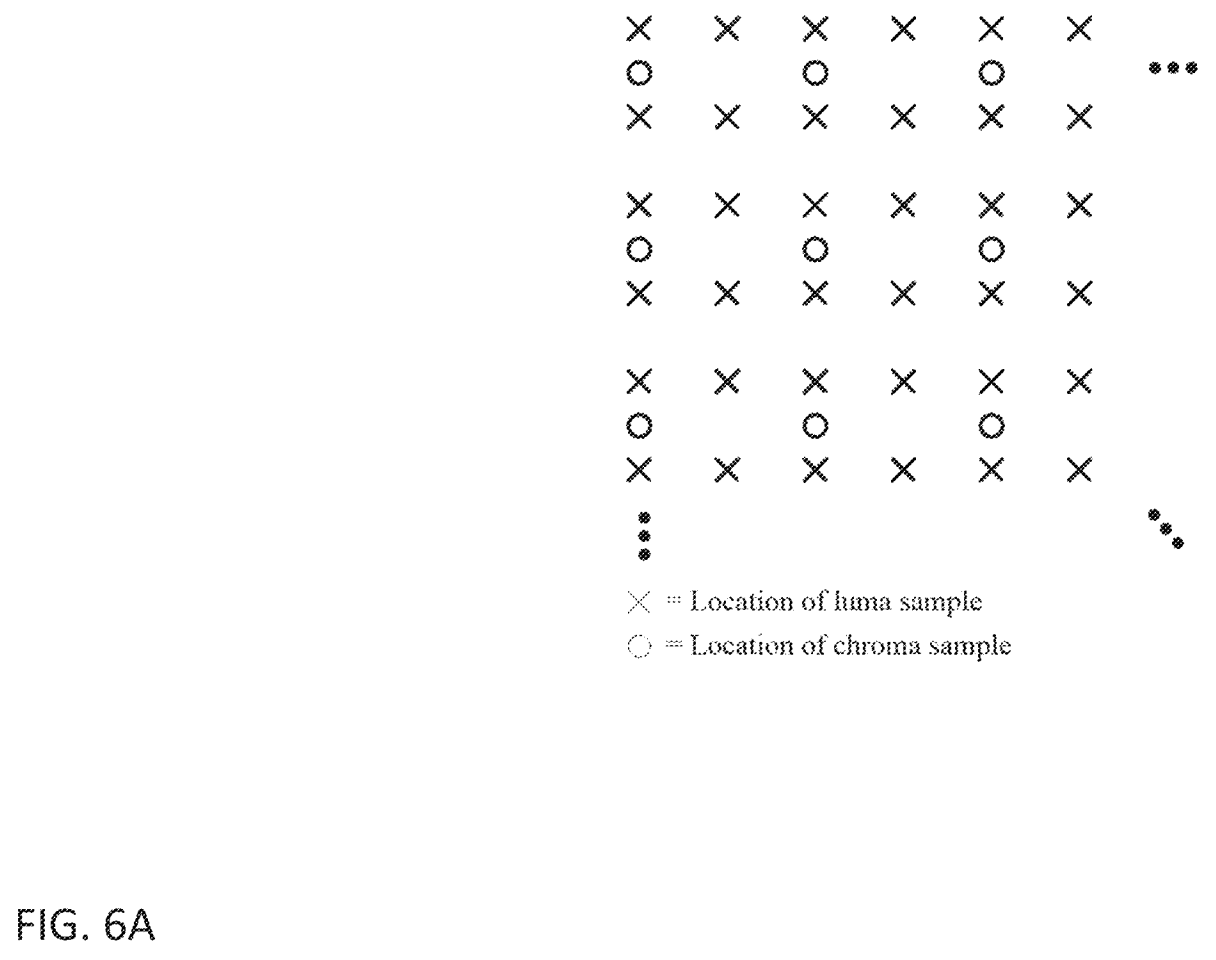
Figure 6B:
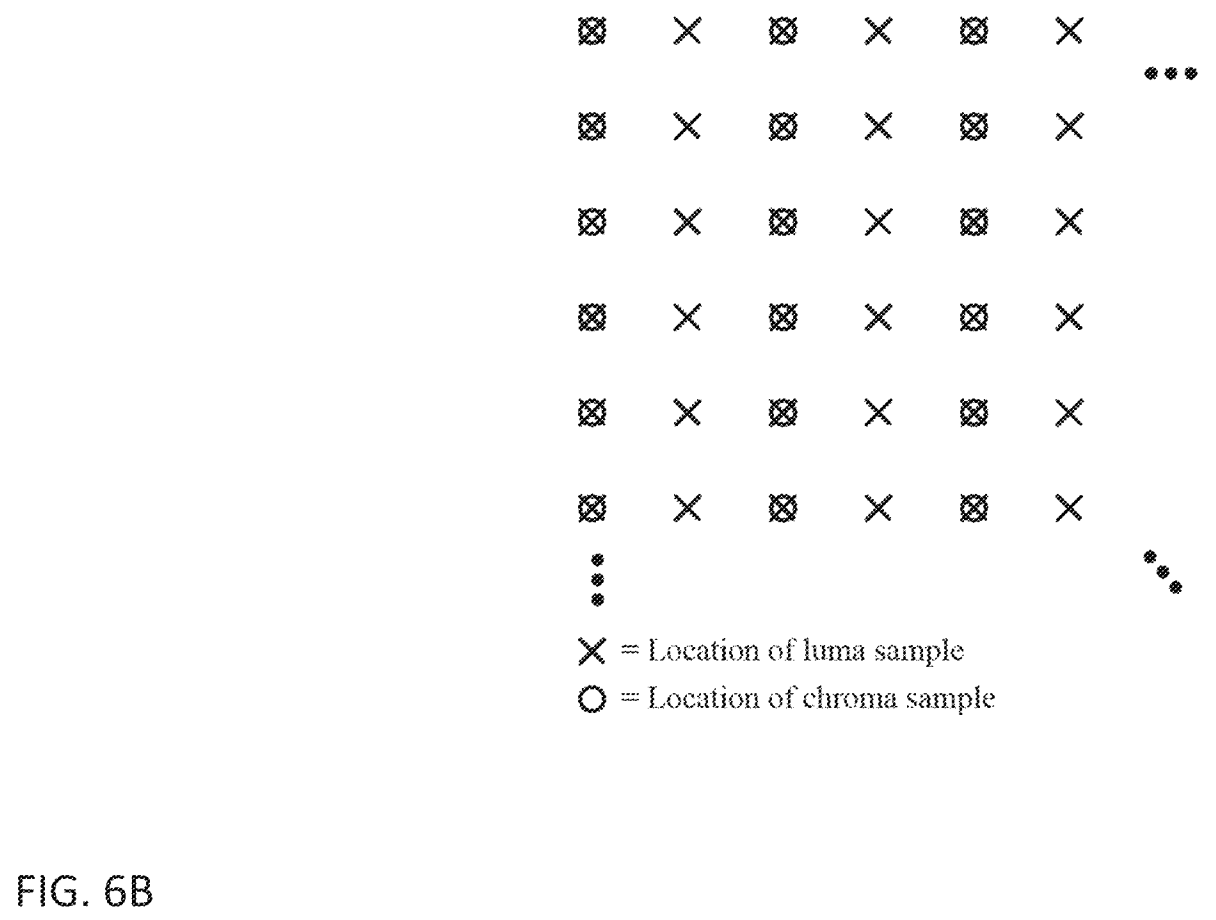
Figure 6C:
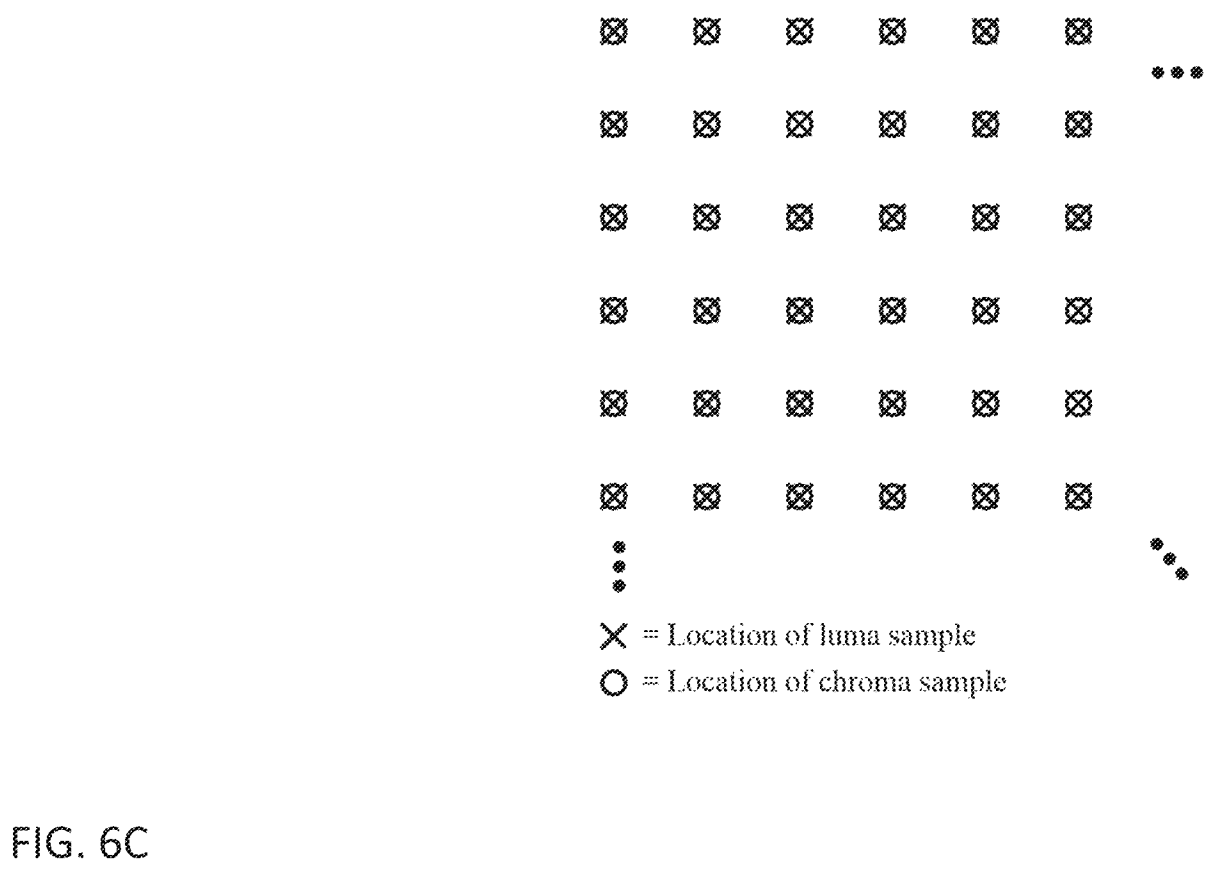
Figure 6D:
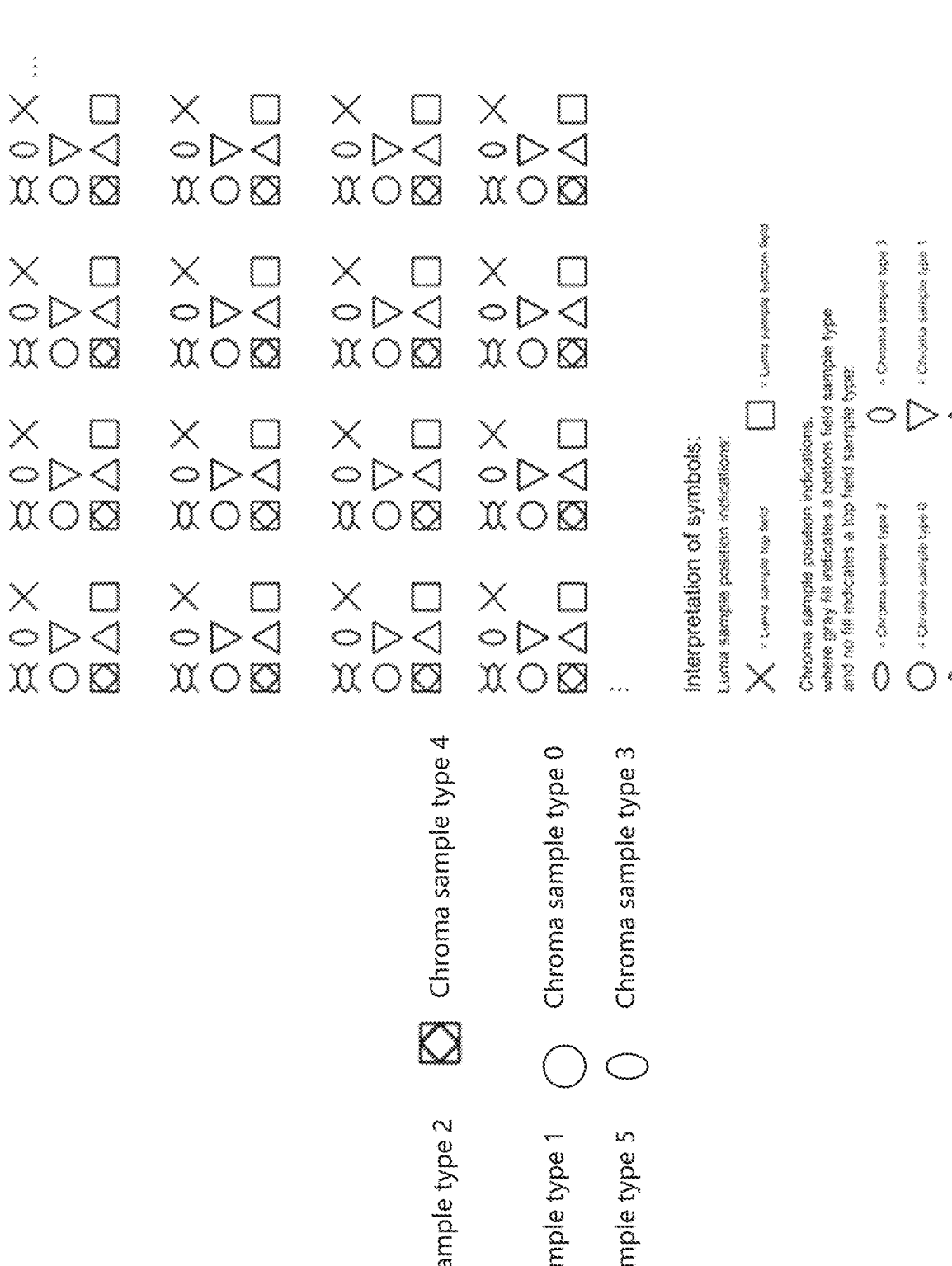
FIG. 6D illustrates various sampling patterns for an interlaced image.

FIG. 6A illustrates chroma component locations for the 4:2:0 sampling scheme. In the 4:2:0 sampling scheme, each of the two chroma arrays has half the height and half the width of the luma array. FIG. 6B illustrates chroma component locations for the 4:2:2 sampling scheme. In the 4:2:2 sampling scheme, each of the two chroma arrays has the same height and half the width of the luma array. FIG. 6C illustrates chroma component locations for the 4:4:4 sampling scheme. In the 4:4:4 sampling scheme, if separate_colour_plane_flag is equal to 0, each of the two chroma arrays has the same height and width as the luma array. FIG. 6D shows various sampling patterns for an interlaced image. In FIG. 6D, chroma sample type 0, chroma sample type 1, chroma sample type 2, chroma sample type 3, chroma sample type 4 and chroma sample type 5 are represented.

Intra-prediction of chroma samples could be performed using samples of reconstructed luma block.

Figure 6E:
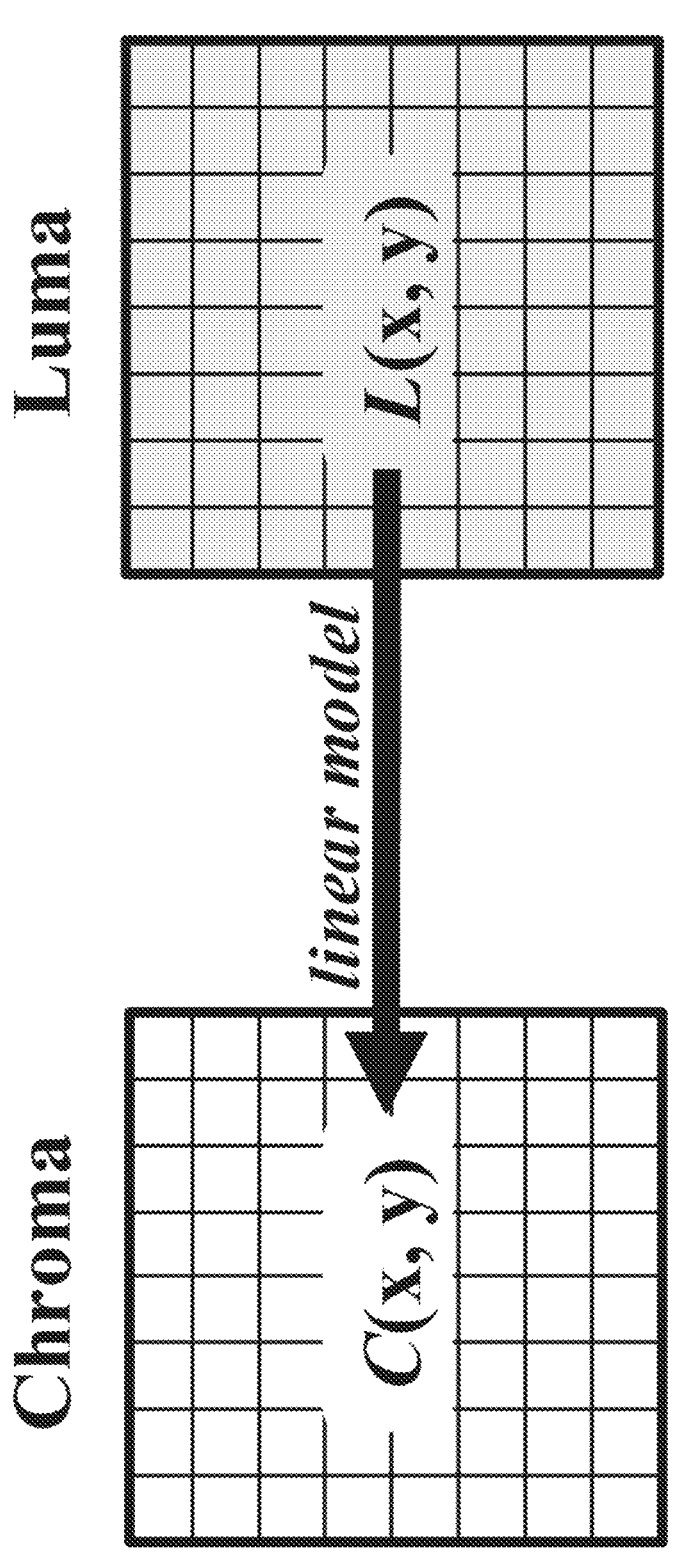
FIG. 6E is a drawing illustrating a concept of Cross-component Linear Model for chroma intra prediction.

During HEVC development, Cross-component Linear Model (CCLM) chroma intra prediction was proposed [J. Kim, S.-W. Park, J.-Y. Park, and B.-M. Jeon, Intra Chroma Prediction Using Inter Channel Correlation, document JCTVC-B021, July 2010]. CCLM uses linear correlation between a chroma sample and a luma sample at a position in a coding block corresponding to the position of the chroma sample. When a chroma block is coded using CCLM, a linear model is derived from the reconstructed neighboring luma and chroma samples through linear regression. The chroma samples in the current block can then be predicted using the reconstructed luma samples in the current block with the derived linear model (as shown in FIG. 6E):

$$C(x, y) = \alpha \times L(x, y) + \beta,$$

where C and L indicate chroma and luma sample values, respectively. Parameters $\alpha$ and $\beta$ are derived by the least-squares method as follows:

$$\alpha = \frac{R(L, C)}{R(L, L)}$$

$$\beta = M(C) - \alpha \times M(L),$$

where M(A) represents mean of A, and R(A,B) is defined as follows:

$$R(A, B) = M((A - M(A)) \times (B - M(B))).$$

If the encoded or decoded picture has a format that specifies different number of samples for luma and chroma components (e.g. 4:2:0 YCbCr format as shown in FIG. 6), luma samples are down-sampled before modelling and prediction.

The method has been adopted for usage in VTM2.0. Specifically, parameter derivation is performed as follows:

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)},$$

$$\beta = \frac{\sum C(n) - \alpha \cdot \sum L(n)}{N},$$

where L(n) represents the down-sampled top and left neighbouring reconstructed luma samples, C(n) represents the top and left neighbouring reconstructed chroma samples.

Figure 8:
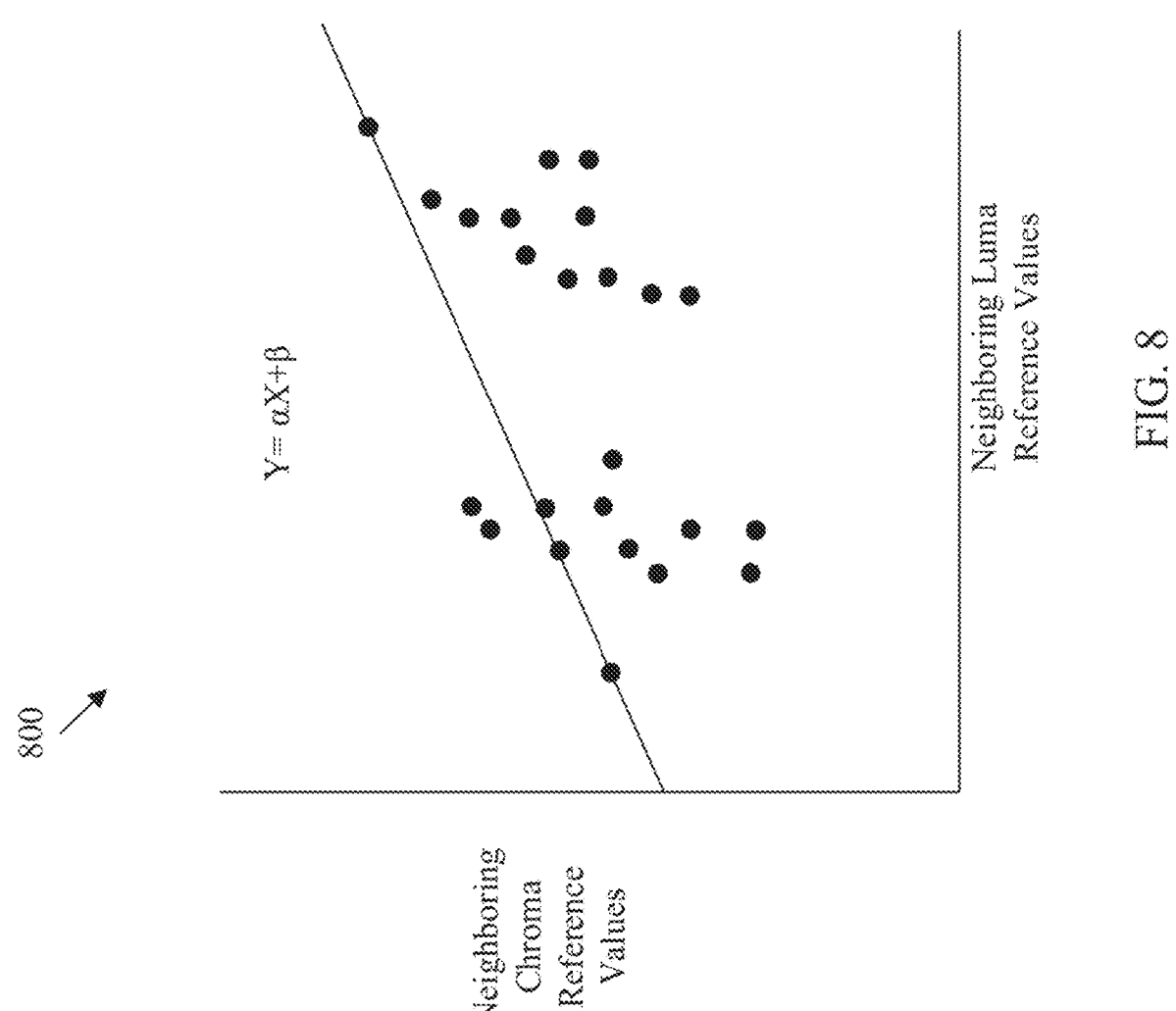
FIG. 8 is a drawing illustrating examples chroma and luma reference samples used for linear model parameter derivation.

In [G. Laroche, J. Taquet, C. Gisquet, P. Onno (Canon), "CE3: Cross-component linear model simplification (Test 5.1)", Input document to 12th JVET Meeting in Macao, China, October 2018] a different method of deriving $\alpha$ and $\beta$ was proposed (as shown in FIG. 8). In particular, the linear model parameters $\alpha$ and $\beta$ are obtained according to the following equations:

$$\alpha = \frac{C(B) - C(A)}{L(B) - L(A)}$$

$$\beta = L(A) - \alpha C(A),$$

where B=argmax (L(n)) and A=argmin (L(n)) are positions of maximum and minimum values in the luma samples.

Figure 7A:
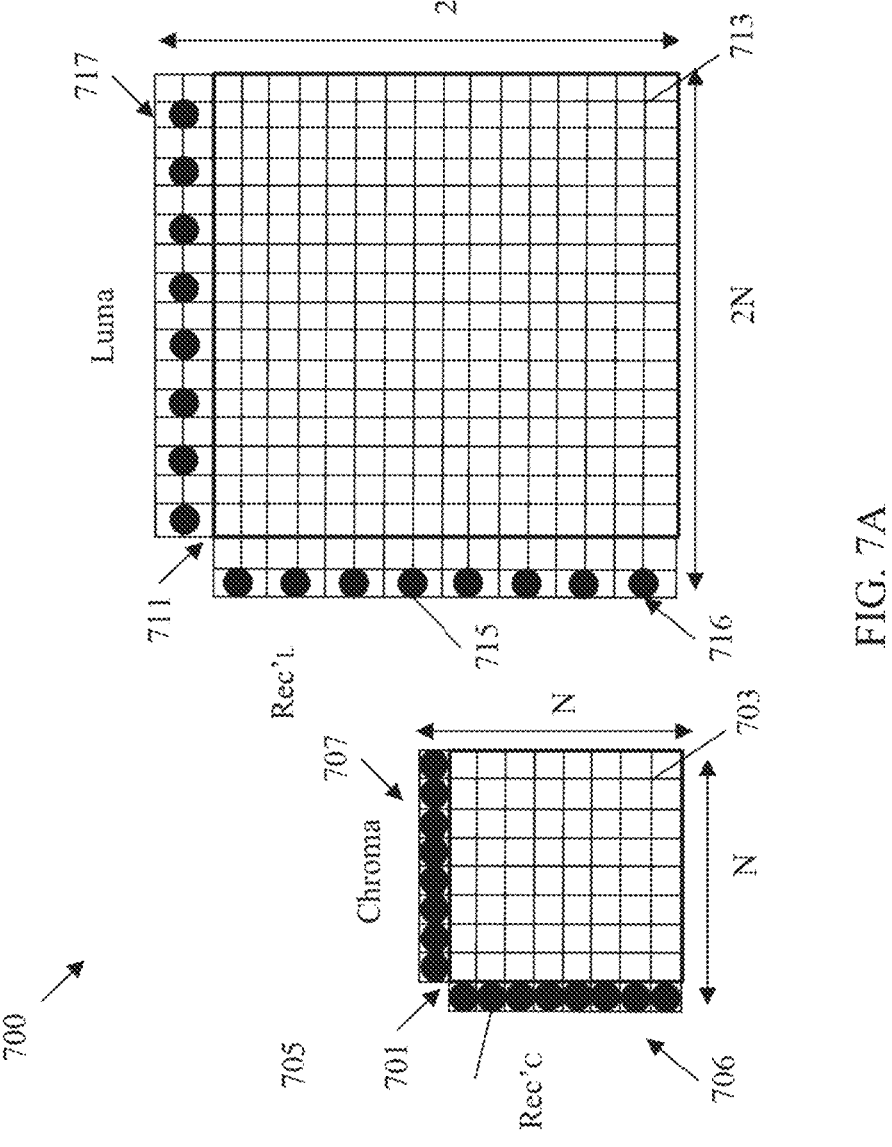
FIG. 7A is an example illustrating co-located luma and chroma blocks which are included in a current image block of a current picture and the associated luma and chroma reference samples, when the chroma format of the current picture is 4:2:0.

FIG. 7A shows the location of the top and left causal samples and the samples of the current block involved in the CCLM mode if YCbCr 4:2:0 chroma format is in use. It should be understood that the "top and left samples" can also be referred to as "left and above samples," "left and top samples," or "above and left samples." These samples refer to the samples in neighboring blocks on the left and on top of (or the above of) a current block.

To perform cross-component prediction, for the 4:2:0 chroma format, the reconstructed luma block needs to be downsampled to match the size of the chroma signal or chroma samples or chroma block. The default downsampling filter used in the CCLM mode is as follows.

$$Rec'_L[x, y] = \qquad (0)$$

$$(2 \times Rec_L[2x, 2y] + 2 \times Rec_L[2x, 2y+1] + Rec_L[2x-1, 2y] +$$

$$Rec_L[2x+1, 2y] + Rec_L[2x-1, 2y+1] + Rec_L[2x+1, 2y+1] + 4) \gg 3$$

Figure 9:
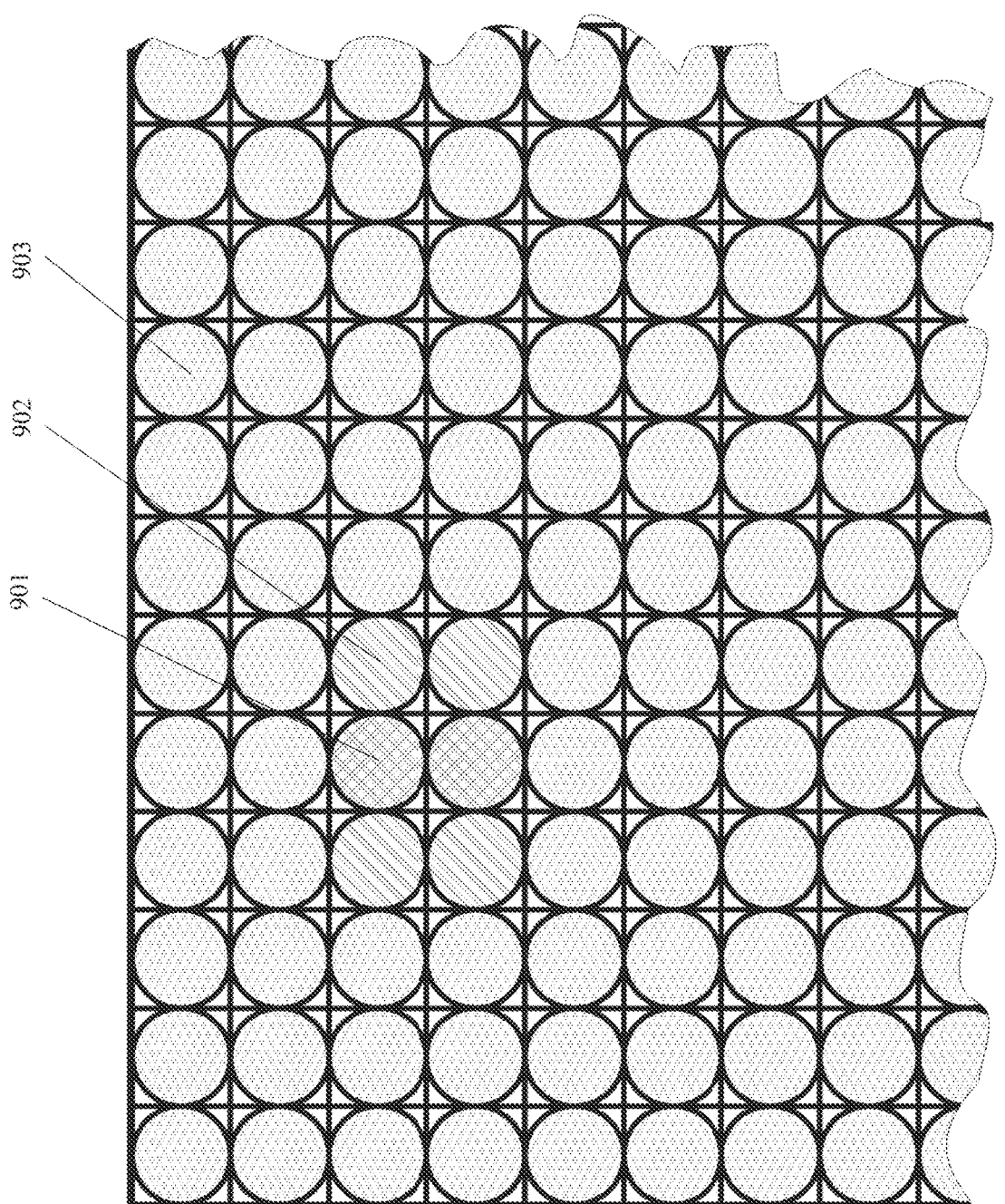
FIG. 9 is a diagram illustrating spatial positions of luma samples involved in the down-sampling during cross-component intra-prediction when the chroma format of the current picture is 4:2:0.

Note that this downsampling assumes that the "type 0" phase relationship is defined for the positions of the chroma samples relative to the positions of the luma samples, i.e. collocated sampling horizontally and interstitial sampling vertically. The above 6-tap downsampling filter shown in Eqn. (0) is used as the default filter for both the single model CCLM mode and the multiple model CCLM mode. Spatial positions of the samples used by this 6-tap downsampling filter are illustrated in FIG. 9. In this figure, there are sample 901, samples 902, and samples 903 which are marked using different line patterns. During the filtering, the samples 901, 902 and 903 have weights of 2, 1, and 0, respectively.

If luma samples are located on a block boundary and adjacent top and left blocks are unavailable, the following formulas are used:

Rec'$_L$[x, y]=Rec$_L$[2x,2y] if the row with y=0 is the 1st row of a CTU, x=0 as well as the left and top adjacent blocks are unavailable; or Rec'$_L$[x, y]=(2×Rec$_L$[2x,2y]+Rec$_L$[2x−1,2y]+Rec$_L$[2x+1, 2y]+2)>>2, if the row with y=0 is the 1st row of a CTU and the top adjacent block is unavailable; or Rec'$_L$[x, y]=(Rec$_L$[2x,2y]+Rec$_L$[2x,2y+1]+1)>>1, if x=0 as well as the left and top adjacent blocks are unavailable.

When considering the sampling of the Luma and Chroma components in the 4:2:0 sampling scheme, there may be a shift between the Luma and Chroma component grids. In a block of 2×2 pixels, the Chroma components are actually shifted by half a pixel vertically compared to the Luma component (illustrated in FIG. 6A). Such shift may have an influence on the interpolation filters when down-sampling is performed, or when up-sampling is performed. The same as described above may apply to other sampling schemes as shown in FIG. 6B or 6C. In FIG. 6D, various sampling patterns are represented for an interlaced image. This means that the parity, i.e. whether the pixels are on the top or bottom fields of an interlaced image, is also taken into account.

As proposed in [P. Hanhart, Y. He, "CE3: Modified CCLM downsampling filter for "type-2" content (Test 2.4)", Input document JVET-M0142 to the 13th JVET Meeting in Marrakech, Morocco, January 2019] and included into the VVC spec draft (version 4), to avoid misalignment between the chroma samples and the downsampled luma samples in CCLM for "type-2" content, the following downsampling filters are applied to luma samples for the linear model determination and the prediction:

$$3\text{-tap: } Rec'_L(i, j) = [Rec_L(2i-1, 2j) + 2 \cdot rec_L(2i, 2j) +$$
$$Rec_L(2i+1, 2j) + 2] \gg 2$$

$$5\text{-tap: } Rec'_L(i, j) = [Rec_L(2i, 2j-1) + Rec_L(2i-1, 2j) + 4 \cdot Rec_L$$
$$(2i, 2j) + Rec_L(2i+1, 2j) + Rec_L(2i, 2j+1) + 4] \gg 3$$

To avoid increasing the number of line buffer, these modifications are not applied at the top CTU boundary. The downsampling filter selection is governed by the SPS flag sps_cclm_colocated_chroma_flag. When the value of sps_cclm_colocated_chroma_flag is 0 or false, the downsampling filter is applied to luma samples for the linear model determination and the prediction; When the value of sps_cclm_colocated_chroma_flag is 1 or true, the downsampling filter is not applied to luma samples for the linear model determination and the prediction.

Boundary luma reconstructed samples L ( ) that are used to derive linear model parameters as described above are subsampled from the filtered luma samples Rec'$_L$[x, y].

The process of luma sample filtering and subsampling in a previous design is described in 8.3.4.2.8 of the VVC specification:

8.3.4.2.8. Specification of INTRA_LT_CCLM, INTRA_L_CCLM and INTRA_T_CCLM intra prediction mode Inputs to this process are:

the intra prediction mode predModeIntra, a sample location (xTbC, yTbC) of the top-left sample of the current transform block relative to the top-left sample of the current picture, a variable nTbW specifying the transform block width, a variable nTbH specifying the transform block height, chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

$$(xTbY, yTbY) = (xTbC << 1, yTbC << 1) \qquad (8\text{-}155)$$

The variables availL, availT and availTL are derived as follows:

The availability of left neighbouring samples derivation process for a block is invoked with the current chroma location (xCurr, yCurr) set equal to (xTbC, yTbC) and the neighbouring chroma location (xTbC−1, yTbC) as inputs, and the output is assigned to availL.

The availability of top neighbouring samples derivation process for a block is invoked with the current chroma location (xCurr, yCurr) set equal to (xTbC, yTbC) and the neighbouring chroma location (xTbC, yTbC−1) as inputs, and the output is assigned to availT.

The availability of top-left neighbouring samples derivation process for a block is invoked with the current chroma location (xCurr, yCurr) set equal to (xTbC, yTbC) and the neighbouring chroma location (xTbC−1, yTbC−1) as inputs, and the output is assigned to availTL.

The number of available top-right neighbouring chroma samples numTopRight is derived as follows:

The variable numTopRight is set equal to 0 and availTR is set equal to TRUE.

When predModeIntra is equal to INTRA_T_CCLM, the following applies for X=nTbW . . . 2*nTbW−1 until availTR is equal to FALSE or x is equal to 2*nTbW−1:

The availability derivation process for a block is invoked with the current chroma location (xCurr, yCurr) set equal to (xTbC, yTbC) and the neighbouring chroma location (xTbC+x, yTbC−1) as inputs, and the output is assigned to availableTR When availableTR is equal to TRUE, numTopRight is incremented by one.

The number of available left-below neighbouring chroma samples numLeftBelow is derived as follows:

The variable numLeftBelow is set equal to 0 and availLB is set equal to TRUE.

When predModeIntra is equal to INTRA_L_CCLM, the following applies for y=nTbH . . . 2*nTbH−1 until availLB is equal to FALSE or y is equal to 2*nTbH−1:

The availability derivation process for a block is invoked with the current chroma location (xCurr, yCurr) set equal to (xTbC, yTbC) and the neighbouring chroma location (xTbC−1, yTbC+y) as inputs, and the output is assigned to availableLB When availableLB is equal to TRUE, numLeftBelow is incremented by one.

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

$$numSampT=availT?nTbW:0 \qquad (8\text{-}156)$$

$$numSampL=availL?nTbH:0 \qquad (8\text{-}157)$$

Otherwise, the following applies:

$$\begin{aligned}numSampT=(availT \text{ \&\& } \\ predModeIntra==INTRA\_T\_CCLM)?(nTbW+ \\ numTopRight):0 \end{aligned} \qquad (8\text{-}158)$$

$$\begin{aligned}numSampL=(availL \text{ \&\& } \\ predModeIntra==INTRA\_L\_CCLM)?(nTbH+ \\ numLeftBelow):0 \end{aligned} \qquad (8\text{-}159)$$

The variable bCTUboundary is derived as follows:

$$bCTUboundary = \qquad (8\text{-}160)$$
$$(yTbC \text{ \&} (1<<(CtbLog2SizeY-1)-1)==0)?TRUE:FALSE.$$

The prediction samples predSamples [x][y] with x=0 . . . nTbW−1, y=0 . . . nTbH−1 are derived as follows:

If both numSampL and numSampT are equal to 0, the following applies:

$$predSamples[x][y] = 1<<(BitDepthC-1) \qquad (8\text{-}161)$$

Otherwise, the following ordered steps apply:

The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).

The neighbouring luma samples pY[x][y] are derived as follows:

When numSampL is greater than 0, the neighbouring left luma samples pY[x][y] with x=−1 . . . 3, y=0 . . . 2*numSampL−1, are set equal to the reconstructed luma samples prior to the deblocking filter process at the locations (xTbY+x, yTbY+y).

When numSampT is greater than 0, the neighbouring top luma samples pY[x][y] with X=0 . . . 2*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

2. The down-sampled collocated luma samples pDsY[x][y] with x=0 . . . nTbW−1, y=0 . . . nTbH−1 are derived as follows:

If sps_cclm_colocated_chroma_flag is equal to 1, the following applies:

pDsY[x][y] with x=1 . . . nTbW−1, y=1 . . . nTbH−1 is derived as follows:

$$\begin{aligned}pDsY[x][y] = (pY[2*x][2*y-1] + pY[2*x-1][2*y] + \\ 4*pY[2*x][2*y] + pY[2*x+1][2*y] + pY[2*x][2*y+1]+4) \\ \gg 3 \end{aligned} \qquad (8\text{-}162)$$

If availL is equal to TRUE, pDsY[0][y] with y=1 . . . nTbH−1 is derived as follows:

$$\begin{aligned}pDsY[0][y] = (pY[0][2*y-1] + pY[-1][2*y] + \\ 4*pY[0][2*y] + pY[1][2*y] + pY[0][2*y+1] +4) \gg 3 \end{aligned} \qquad (8\text{-}163)$$

Otherwise, pDsY[0][y] with y=1 . . . nTbH−1 is derived as follows:

$$\begin{aligned}pDsY[0][y] = \\ (pY[0][2*y-1] + 2*pY[0][2*y] + pY[0][2*y+1] +2) \gg 2 \end{aligned} \qquad (8\text{-}164)$$

If availT is equal to TRUE, pDsY[x][0] with x=1 . . . nTbW−1 is derived as follows:

$$pDsY[x][0] = (pY[2*x][-1] + pY[2*x-1][0] + \qquad (8\text{-}165)$$
$$4*pY[2*x][0] + pY[2*x+1][0] + pY[2*x][1] + 4) \gg 3$$

Otherwise, pDsY[x][0] with x=1 . . . nTbW−1 is derived as follows:

$$pDsY[x][0] = \qquad (8\text{-}166)$$
$$(pY[2*x-1][0] + 2*pY[2*x][0] + pY[2*x+1][0] + 2) \gg 2$$

If availL is equal to TRUE and availT is equal to TRUE, pDsY[0][0] is derived as follows:

$$pDsY[0][0] = (pY[0][-1] + \qquad (8\text{-}167)$$
$$pY[-1][0] + 4*pY[0][0] + pY[1][0] + pY[0][1] + 4) \gg 3$$

Otherwise if availL is equal to TRUE and availT is equal to FALSE, pDsY[0][0] is derived as follows:

$$pDsY[0][0] = (pY[-1][0] + 2*pY[0][0] + pY[1][0] + 2) \gg 2 \qquad (8\text{-}168)$$

Otherwise if availL is equal to FALSE and availT is equal to TRUE, pDsY[0][0] is derived as follows:

$$pDsY[0][0] = (pY[0][-1] + 2*pY[0][0] + pY[0][1] + 2) >> 2 \qquad (8\text{-}169)$$

Otherwise (availL is equal to FALSE and availT is equal to FALSE), pDsY[0][0] is derived as follows:

$$pDsY[0][0] = pY[0][0] \qquad (8\text{-}170)$$

Otherwise, the following applies:
pDsY[x][y] with x=1 . . . nTbW−1, y=0 . . . nTbH−1 is derived as follows:

$$pDsY[x][y] = (pY[2*x-1][2*y] + pY[2*x-1][2*y+1] + \qquad (8\text{-}171)$$
$$2*pY[2*x][2*y] + 2*pY[2*x][2*y+1] +$$
$$pY[2*x+1][2*y] + pY[2*x+1][2*y+1] + 4) \gg 3$$

If availL is equal to TRUE, pDsY[0][y] with y=0 . . . nTbH−1 is derived as follows:

$$pDsY[0][y] = \qquad (8\text{-}172)$$
$$(pY[-1][2*y] + pY[-1][2*y+1] + 2*pY[0][2*y] +$$
$$2*pY[0][2*y+1] + pY[1][2*y] + pY[1][2*y+1] + 4) \gg 3$$

Otherwise, pDsY[0][y] with y=0 . . . nTbH−1 is derived as follows:

$$pDsY[0][y] = (pY[0][2*y] + pY[0][2*y+1] + 1) \gg 1 \qquad (8\text{-}173)$$

CCLM predicts the values of chroma samples in a chroma block by using subsampled luma block (down-sampled luma block) that is spatially collocated with the chroma block. Subsampling or down-sampling of luma block comprises filtering to suppress aliasing artifacts caused by spectrum mirroring. Selection of the interpolation filter type is dependent on the subsampling type and the value of subsample spatial offsets between chroma and luma samples of the original picture.

In the previous design, a set of interpolation filters was defined without consideration of the chroma format, and hence, when chroma subsampling ratio in the horizontal direction (SubWidthC) is not equal to chroma subsampling ratio in the vertical direction (SubHeightC), the following flaws could occur:

extra smoothing;

wrong phase shifts of the filtered luminance signal.

The present disclosure provides a method to consider the chroma format of the picture when predicting chroma samples from luma samples. By selecting the filter set based on the chroma format, the flaws of the previous design may be eliminated which results in a more accurate chroma prediction signal and thus prediction error reduction. The technical result of a smaller prediction error is a reduction of residual signal energy. Coding methods may utilize this reduction to decrease distortion of the reconstructed signal, decrease the bitrate that is required to encode residual signal or decrease both distortion and bitrate. These beneficial effects achieved by the present disclosure improve the overall compression performance of the coding method.

Table 1 shows the chroma formats which can be supported in the present disclosure. Chroma format information, such as chroma_format_idc and/or separate_colour_plane_flag, which may be used to determine the values of the variables SubWidthC and SubHeightC.

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | chroma_format_idc specifies the chroma sampling relative to the luma sampling. The value of chroma_format_idc shall be in the range of 0 to 3, inclusive.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax.

Chroma format determines precedence and subsampling of chroma arrays;

In monochrome sampling, there is only one sample array, which is nominally considered the luma array.

In 4:2:0 sampling, each of the two chroma arrays has half the height and half the width of the luma array, as shown in FIG. 6A.

In 4:2:2 sampling, each of the two chroma arrays has the same height and half the width of the luma array, as shown in FIG. 6B.

In 4:4:4 sampling, depending on the value of separate_colour_plane_flag, the following applies:

If separate_colour_plane_flag is equal to 0, each of the two chroma arrays has the same height and width as the luma array, as shown in FIG. 6C.

Otherwise (separate_colour_plane_flag is equal to 1), the three colour planes are separately processed as monochrome sampled pictures.

In the present disclosure, a method for processing luma samples that are used as an input data to determine parameters of a linear model is provided. The linear model may include but not limited to cross-component linear model (CCLM) or multi-directional linear model (MDLM). The method includes determination of a set of filters (such as two filters) that are conditionally applied in vertical and horizontal directions.

In some embodiments, a set of conditions are introduced that are checked in order to determine coefficients of the filter to be applied to the reconstructed luma samples. The set of conditions include, but not are limited to conditions involving chroma sampling ratios (also namely, chroma sampling factors, such as the variables SubWidthC and SubHeightC).

FIG. 7A is a schematic diagram illustrating an example mechanism of performing CCLM intra-prediction 700. The CCLM intra-prediction 700 is one type of cross-component intra-prediction. Hence, CCLM intra-prediction 700 may be performed by an intra-prediction unit 254 of the encoder 20 and/or an intra-prediction unit 354 of the decoder 30 CCLM intra-prediction 700 predicts chroma samples 703 in a chroma block 701. The chroma samples 703 appear at integer positions shown as grids or cells formed by intersecting lines. The prediction is based in part on neighboring reference samples, which are depicted as black circles. The chroma samples 703 are not predicted solely based on the neighboring chroma reference samples 705, which are denoted as reconstructed chroma samples (Rec'C). The chroma samples 703 are also predicted based on reconstructed luma samples 713 and neighboring luma reference samples 715. Specifically, a CU contains a luma block 711 and two chroma blocks 701. A model is generated that correlates the chroma samples 703 and the reconstructed luma samples 713 in the same CU. Linear coefficients for the model may be determined by comparing the neighboring luma reference samples 715 to the neighboring chroma reference samples 705, in an example, Linear coefficients for the model may be determined by comparing down-sampled luma reference samples 719 of selected neighboring luma reference samples 715 to selected neighboring chroma reference samples 705, and the positions of the selected neighboring chroma reference samples 705 may correspond to the positions of the down-sampled luma reference samples 719.

The neighboring chroma reference samples 705 are selected from chroma samples in neighboring blocks adjacent to the chroma block 701. The neighboring chroma reference samples 705 are selected from a top template 707 and/or a left template 706. For example, the neighboring chroma reference samples 705 may be selected based on the availability of the top template 707 and/or the left template 706. As shown in FIG. 7D, four neighboring chroma reference samples 705 may be selected. Because the neighboring chroma reference samples 705 are reconstructed samples, the neighboring chroma reference samples 705 are denoted as reconstructed chroma samples (Rec'C). The reconstructed luma samples 713 are obtained from the luma block 711 in the same CU as the chroma block 701. The neighboring luma reference samples 715 are selected from luma samples in neighboring blocks adjacent to the luma block 711. The neighboring luma reference samples 715 are selected from a top template 717 and/or a left template 716. For example, as shown in FIG. 7D, in order to obtain four down-sampled luma reference samples 719 that correspond to the selected four neighboring chroma reference samples 705 (i.e. the positions of four down-sampled luma reference samples 719 correspond to the positions of the selected four neighboring chroma reference samples 705), neighboring luma reference samples 715 are selected. Such as, if a 6-tap downsampling filter is applied, six neighboring luma reference samples 715 are used to obtain one down-sampled luma reference sample 719 that corresponds to one selected neighboring chroma reference sample 705. The reconstructed luma samples 713 are denoted as Rec'L. Also, as used herein, the template 706, 707, 716, and 717 is a mechanism that correlates neighboring luma reference samples 715 to neighboring chroma reference samples 705.

As shown, the luma block 711 contains four times the samples as the chroma block 701. Specifically, the chroma block 701 contains N by N samples while the luma block 711 contains 2N by 2N samples. Hence, the luma block 711 is four times the resolution of the chroma block 701. For the prediction to operate on the reconstructed luma samples 713 and the (selected) neighboring luma reference samples 715, the reconstructed luma samples 713 and the (selected) neighboring luma reference samples 715 are down-sampled to provide an accurate comparison with the neighboring chroma reference samples 705 and the chroma samples 703. Downsampling is the process of reducing the resolution of a group of samples.

Once the (selected) neighboring luma reference samples 715 and the reconstructed luma samples 713 are down-sampled, a model can be generated to predict the chroma samples 703 of the chroma block 701. Specifically, in CCLM intra-prediction 700, a prediction for chroma samples 703 of the chroma block 701 can be determined according to the model described by the below equation 1:

$$pred_C(i, j) = \alpha \cdot rec'_L(i, j) + \beta \qquad (1)$$

where $pred_C(i, j)$ is the prediction chroma sample 703 of the chroma block 701 at a location (i,j), where i is the horizontal index and j is the vertical index. $rec_L'(i, j)$ is the down-sampled luma sample at location (i, j) of the reconstructed luma sample 713 and $\alpha$ and $\beta$ are linear coefficients determined based on down-sampled luma reference samples of the (selected) neighboring luma reference samples 715 and the (selected) chroma reference samples 705. For YUV 4:2:0 format, each chroma sample has 4 collocated luma samples, so both luma samples used to derive $\alpha$ and $\beta$ and the samples used for calculating predicted chroma samples are down sampled (see FIG. 6A).

In an example, $\alpha$ and $\beta$ are determined based on the minimum and maximum value of the down-sampled neighboring luma reference samples 719 of the selected neighboring luma reference samples 715 as discussed with respect to FIG. 8 and FIG. 7D. In one exemplary implementation, after a maximum luma value and a minimum luma value are determined based on the down-sampled luma reference samples 719; a first chroma value is obtained based at least in part upon one or more positions (such as two positions) of one or more down-sampled luma reference samples (such as two down-sampled luma reference samples) associated with the maximum luma value. For example, the first chroma value is obtained based on two chroma reference samples at two positions which correspond to two down-sampled luma reference samples associated with the maximum luma value. A second chroma value is obtained based at least in part upon one or more positions of one or more down-sampled luma reference samples associated with the minimum luma value. For example, the second chroma value is obtained based on two chroma reference samples at two positions which correspond to two down-sampled luma reference samples associated with the minimum luma value. The linear model coefficients α and β are calculated based on the first chroma value, the second chroma value, the maximum luma value and the minimum luma value (refer to FIG. 7D and FIG. 8).

As noted above, the (selected) neighboring luma reference samples 715 and the reconstructed luma samples 713 are down-sampled prior to generating the linear model. Further, employing multiple lines/rows and columns to generate the neighboring luma reference samples 715 does not significantly increase the accuracy of the remaining calculations pursuant to CCLM intra-prediction 700. As such, a single row and/or column of neighboring luma reference samples 715 can be employed during downsampling, which reduces utilization of the line buffer memory without significantly impacting the accuracy and/or coding efficiency of CCLM intra-prediction 700.

Figure 7B:
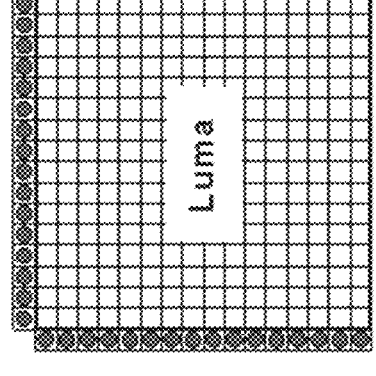
FIG. 7B is an example illustrating co-located luma and chroma blocks which are included in a current image block of a current picture and the associated luma and chroma reference samples, when the chroma format of the current picture is 4:2:2.
Figure 7D:
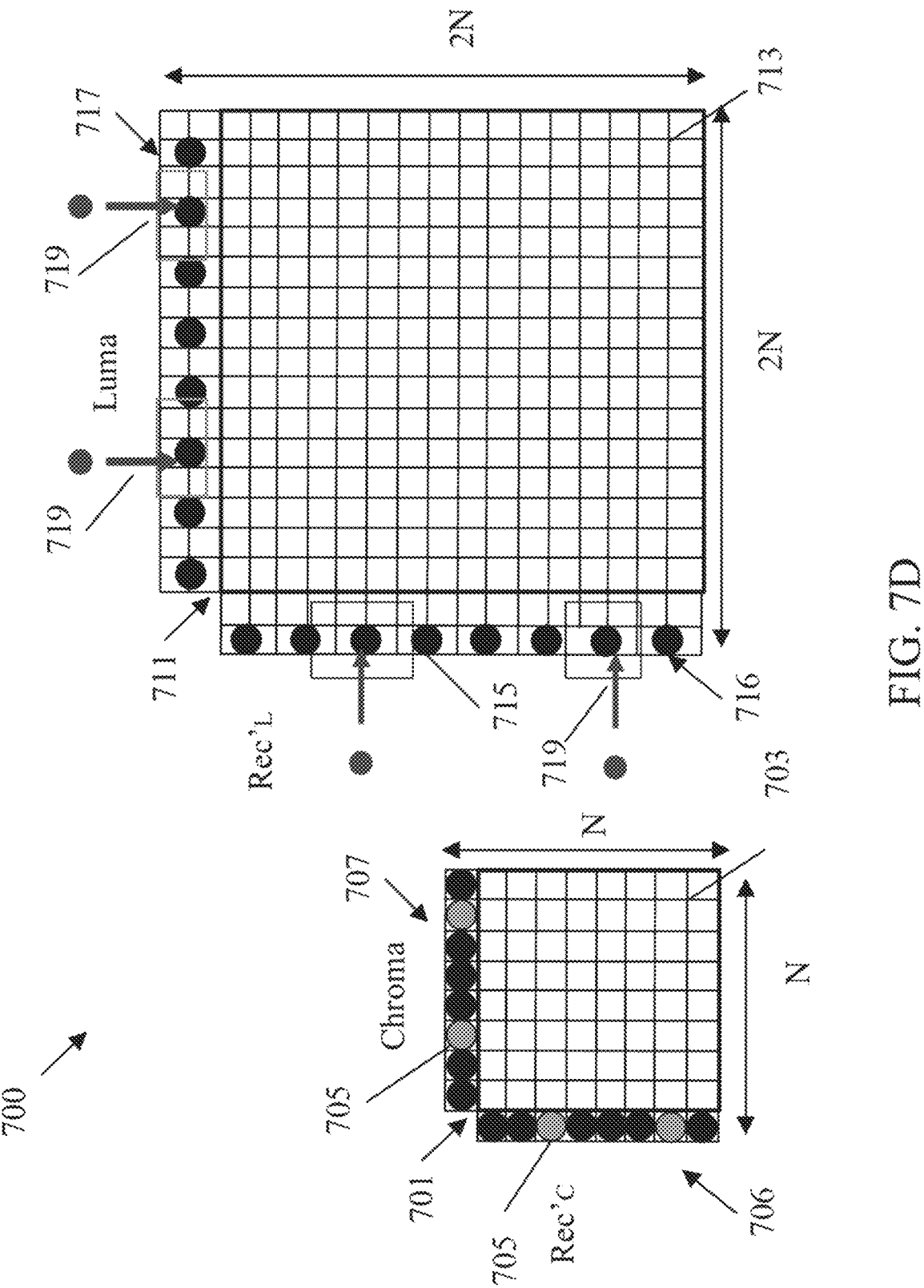
FIG. 7D is an example illustrating down-sampled luma reference samples 719 of selected luma reference samples 715 of the luma block 711, and chroma reference samples 705 that correspond to the down-sampled luma reference samples 719, when the chroma format of the current picture is 4:2:0.

FIG. 7B shows the locations of the left and above causal samples and the sample of the current block involved in the CCLM mode if YCbCr 4:4:4 chroma format is in use. In this case, no downsampling is performed for CCLM.

FIG. 7C shows the locations of the left and above causal samples and the sample of the current block involved in the CCLM mode if YCbCr 4:2:2 chroma format is in use. In this case, filtering is performed prior to downsampling the luma samples in the horizontal direction for CCLM.

Figure 10:
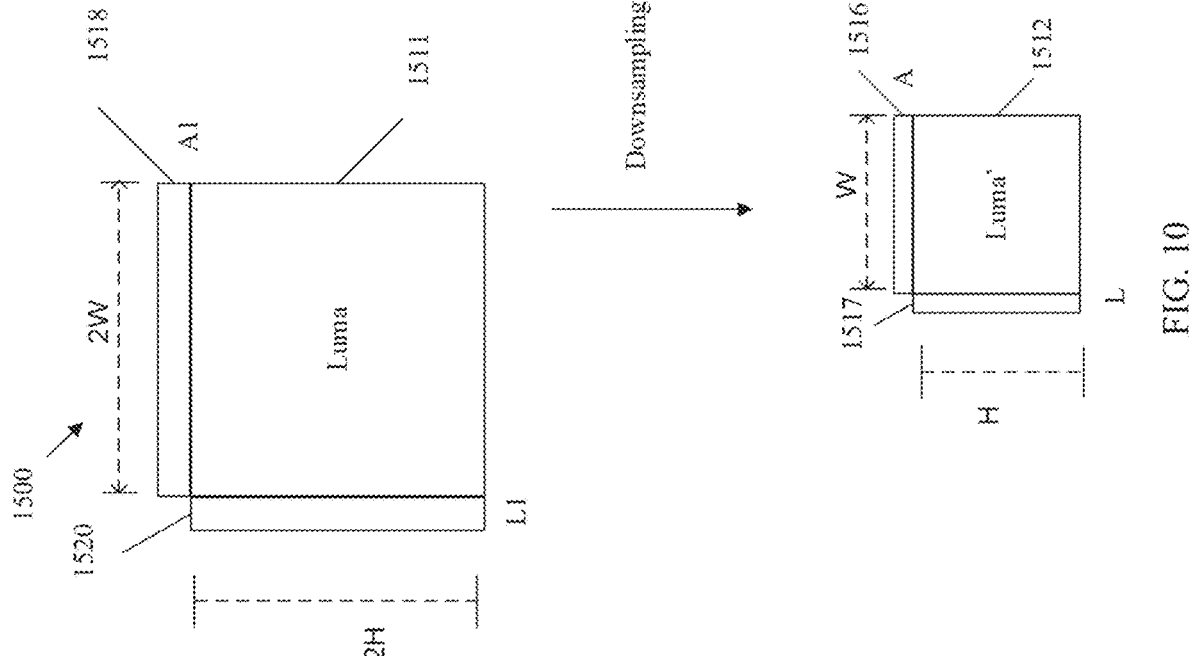
FIG. 10 is a schematic diagram illustrating example mechanisms of downsampling to support cross-component intra-prediction.

FIG. 10 is a schematic diagram illustrating an example mechanism 1500 of downsampling to support cross-component intra-prediction.

Mechanism 1500 employs a single row 1518 of neighboring luma reference samples and a single column 1520 of neighboring luma reference samples. The row 1518 and column 1520 are directly adjacent to a luma block 1511 that shares a CU with a chroma block being predicted according to cross-component intra-prediction. After downsampling, the row 1518 of neighboring luma reference samples becomes a row 1516 of down-sampled neighboring luma reference samples. Further, the column 1520 of neighboring luma reference samples are down-sampled resulting in a single column 1517 of down-sampled neighboring luma reference samples. The down-sampled neighboring luma reference samples from the row 1516 and the column 1517 can then be employed for cross-component intra-prediction according to equation 1.

Accordingly, in one exemplary implementation, a single row 1518 of neighboring luma reference samples and a single column 1520 of neighboring luma reference samples are down-sampled for use in cross-component intra-prediction. It is noted that in another exemplary implementation, selected luma reference samples of a single row 1518 of neighboring luma reference samples and selected luma reference samples of a single column 1520 of neighboring luma reference samples are down-sampled for use in cross-component intra-prediction.

For a luma block 1511, the top neighboring row 1518, denoted as A1, is used for downsampling to get the down-sampled neighboring row 1516 denoted as A. A [i] is the ith sample in A and A1[i] is the ith sample in A1. In a specific example, one or more downsampling filters, which are determined or selected depending on the chroma format of the picture, can be applied to neighboring row 1518 to obtain the down-sampled neighboring row 1516. In another specific example, one or more downsampling filters, which are determined or selected depending on the chroma format of the picture, can be applied to some selected luma reference samples A1[i] of the single row 1518 to obtain the down-sampled luma reference samples, as shown in FIG. 7D. Details in this regard will be introduced below.

Further, the left neighboring column 1520 is denoted as L1 and is used for downsampling to obtain a down-sampled neighboring column 1517 denoted as L. L[i] is the ith sample in L and L1[i] is the ith sample in L1. In a specific example, one or more downsampling filters, which are determined or selected depending on the chroma format of the picture, can be applied to neighboring column 1520 to obtain down-sampled neighboring column 1517. Details in this regard will be introduced below. In another specific example, one or more downsampling filters, which are determined or selected depending on the chroma format of the picture, can be applied to some selected luma reference samples L1[i] of the single column 1520 to obtain the down-sampled luma reference samples, as shown in FIG. 7D.

Further, it should also be noted that mechanism 1500 can also be applied when the dimensions of rows 1518, and/or 1516 and/or columns 1520, and/or 1517 is larger than the width or height of the luma block 1511 or the down-sampled luma block 1512. In an alternative design, that mechanism 1500 can also be applied for some selected neighboring reference samples A1[i] and/or some selected neighboring reference samples L1[i].

FIG. 11 is a flowchart of an example process 1100 for performing intra prediction using a linear model according to some embodiments of the present disclosure. The method may be performed by a video encoder 20 and/or a video decoder 30 of a codec system 10 or 40 shown in FIGS. 1A and 1B. In particular, the method can be performed by an intra prediction unit 244 of the video encoder 20 shown in FIG. 2, and/or an intra prediction unit 354 of the video decoder 30 shown in FIG. 3.

At block 1101, a set of down-sampling filters is determined based on chroma format information, wherein the chroma format information indicates a chroma format of a picture that a current block belongs to. The current block comprises a luma block and a co-located chroma block. It can be understood that each down-sampling filter of the set of down-sampling filters can be defined by one or more down-sampling filter coefficients. It will be explained as below in details.

At block 1103, down-sampled luma samples of reconstructed luma samples in a luma block of the current block and down-sampled luma reference samples of selected luma reference samples (also namely, selected luma neighboring samples) of (adjacent to) the luma block are obtained using respective down-sampling filters among the set of down-sampling filters;

It can be understood that the spatial resolution of the luma block is usually larger than the chroma block, a luma block (i.e. a reconstructed luma block) is down-sampled to obtain a down-sampled luma block, as illustrated in FIG. 10. The reconstructed luma samples that are horizontally and/or vertically adjacent to the selected neighboring luma sample (the down-sampled luma reference sample) are used to obtain down-sampled luma reference samples of selected neighboring luma samples outside the luma block, as illustrated in FIG. 9 or 10.

At block 1105, one or more linear model coefficients are determined or derived based on the down-sampled luma reference samples and chroma reference samples that correspond to (or that is associated with) the down-sampled luma reference samples; and At block 1107, prediction samples of a chroma block that corresponds to the luma block are obtained based on the linear model coefficients and the down-sampled luma samples of the reconstructed luma samples in the luma block.

The block 1101 is to determine or obtain or get the values of the variables SubWidthC) and SubHeightC based on the chroma format information indicating the chroma format of the picture being coded.

The block 1101 is to define or determine a filter "F" used for the values of the variables SubWidthC and SubHeightC.

Exemplary embodiments of how the filters may be associated with the corresponding values of SubWidthC and SubHeightC as shown in Tables 2-5. A Spatial filter "F" is defined in a form of a matrix of coefficients. Positions of samples to which those coefficients are applied, are defined as follows where the position of the filtered or modified luma sample is denoted as (x,y):

$$\begin{bmatrix} (x-1, y-1) & (x, y-1) & (x+1, y-1) \\ (x-1, y) & (x, y) & (x+1, y) \\ (x-1, y+1) & (x, y+1) & (x+1, y+1) \end{bmatrix}. \tag{5}$$

When the position of the output filtered reconstructed sample is on a block boundary, some of the neighboring positions may become unavailable, due to the neighboring blocks being not available. In this case, selection of the input samples is modified to duplicate samples at the block boundary. This modification could be implemented as applying another filter on a smaller set of samples with different filter coefficients.

Specifically, when the output sample is on the left boundary of the current block and samples adjacent to the left of a luma block are not available, positions of samples used for filtering are defined as follows:

$$\begin{bmatrix} (x, y-1) & (x, y-1) & (x+1, y-1) \\ (x, y) & (x, y) & (x+1, y) \\ (x, y+1) & (x, y+1) & (x+1, y+1) \end{bmatrix}. \tag{6}$$

When the output sample is on the top boundary of the current block and samples adjacent to the top side of a luma block are not available, positions of samples used for filtering are defined as follows:

$$\begin{bmatrix} (x-1, y) & (x, y) & (x+1, y) \\ (x-1, y) & (x, y) & (x+1, y) \\ (x-1, y+1) & (x, y+1) & (x+1, y+1) \end{bmatrix}. \tag{7}$$

When position of the output sample is on the right boundary of the current block, positions of samples used for filtering are defined as follows:

$$\begin{bmatrix} (x-1, y-1) & (x, y-1) & (x, y-1) \\ (x-1, y) & (x, y) & (x, y) \\ (x1, y+1) & (x, y+1) & (x, y+1) \end{bmatrix}. \tag{8}$$

When position of the output sample is on the bottom boundary of the current block, positions of samples used for filtering are defined as follows:

$$\begin{bmatrix} (x-1, y-1) & (x, y-1) & (x+1, y-1) \\ (x-1, y) & (x, y) & (x+1, y) \\ (x-1, y) & (x, y) & (x+1, y) \end{bmatrix} \tag{9}$$

TABLE 2

An example of the association of a spatial filter to the values of SubWidthC and SubHeightC:

| SubWidthC | SubHeightC | Spatial Filter F |
|---|---|---|
| 1 | 1 | $\begin{bmatrix} 0 & 0 & 0 \\ 0 & 1 & 0 \\ 0 & 0 & 0 \end{bmatrix}$ |
| 1 | 2 | $\begin{bmatrix} 0 & 1 & 0 \\ 0 & 2 & 0 \\ 0 & 1 & 0 \end{bmatrix}$ |
| 2 | 1 | $\begin{bmatrix} 0 & 0 & 0 \\ 1 & 2 & 1 \\ 0 & 0 & 0 \end{bmatrix}$ |
| 2 | 2 | $\begin{bmatrix} 0 & 1 & 0 \\ 1 & 4 & 1 \\ 0 & 1 & 0 \end{bmatrix}$ |

TABLE 3

An example of the association of a spatial filter to the values of SubWidthC and SubHeightC:

| SubWidthC | SubHeightC | Spatial Filter |
|---|---|---|
| 1 | 1 | $\begin{bmatrix} 0 & 1 & 0 \\ 1 & 4 & 1 \\ 0 & 1 & 0 \end{bmatrix}$ |
| 1 | 2 | $\begin{bmatrix} 0 & 1 & 0 \\ 0 & 2 & 0 \\ 0 & 1 & 0 \end{bmatrix}$ |
| 2 | 1 | $\begin{bmatrix} 0 & 0 & 0 \\ 1 & 2 & 1 \\ 0 & 0 & 0 \end{bmatrix}$ |
| 2 | 2 | $\begin{bmatrix} 0 & 1 & 0 \\ 1 & 4 & 1 \\ 0 & 1 & 0 \end{bmatrix}$ |

TABLE 4

An example of the association of a spatial filter to the values of SubWidthC and SubHeightC:

| SubWidthC | SubHeightC | Spatial Filter F |
|---|---|---|
| 1 | 1 | $\begin{bmatrix} 0 & 0 & 0 \\ 0 & 1 & 0 \\ 0 & 0 & 0 \end{bmatrix}$ |
| 1 | 2 | $\begin{bmatrix} 0 & 1 & 0 \\ 0 & 2 & 0 \\ 0 & 1 & 0 \end{bmatrix}$ |
| 2 | 1 | $\begin{bmatrix} 0 & 0 & 0 \\ 1 & 2 & 1 \\ 0 & 0 & 0 \end{bmatrix}$ |
| 2 | 2 | $\begin{bmatrix} 1 & 2 & 1 \\ 2 & 4 & 2 \\ 1 & 2 & 1 \end{bmatrix}$ |

TABLE 5

An example of the association of a spatial filter to the values of SubWidthC and SubHeightC:

| SubWidthC | SubHeightC | Spatial Filter F |
|---|---|---|
| 1 | 1 | $\begin{bmatrix} 0 & 0 & 0 \\ 0 & 1 & 0 \\ 0 & 0 & 0 \end{bmatrix}$ |
| 1 | 2 | $\begin{bmatrix} 0 & 0 & 0 \\ 1 & 2 & 1 \\ 1 & 2 & 1 \end{bmatrix}$ |
| 2 | 1 | $\begin{bmatrix} 0 & 0 & 0 \\ 1 & 2 & 1 \\ 1 & 2 & 1 \end{bmatrix}$ |
| 2 | 2 | $\begin{bmatrix} 0 & 0 & 0 \\ 1 & 2 & 1 \\ 1 & 2 & 1 \end{bmatrix}$ |

The block 1103 is to perform filtering of the reconstructed luma sample in order to obtain the filtered luma sample values Rec'$_L$[x, y]. In particular, this is performed by applying a selected filter "F" to the reconstructed samples Rec$_L$ [x, y]:

$$Rec'_L[x, y] = \left( \sum_{i=-1}^{1} \sum_{j=-1}^{1} Rec'_L[x+i, y+j] \cdot F[i+1, j+1] + \frac{N}{2} \right) \gg \log_2(N),$$

where F represents the spatial filter, N is a sum of coefficients of the spatial filter F, and (x,y) represents the position of the reconstructed sample. This filtering corresponds to the scenario depicted in Eqn. (5). In other scenarios, such as those described above with respect to Eqns. (6)-(9), the filtering can be applied by adjusting the above filtering based on the positions of samples shown in Eqns. (6)-(9).

In a further embodiment, the filter can switch between different filter types (such as the various filter associations defined in Tables 2-5) depending on the position of the subsampled chroma samples relative to luma samples. As an example, when the subsampled chroma samples are not collocated with the corresponding luma samples (as showed in FIG. 6D, see Chroma sample type 0, 1, 3 or 5, as signalled by a flag (such as, sps_cclm_colocated_chroma_flag being the value of 0) in the bitstream), Table 4 is used. Otherwise, either Table 2 or Table 3 is used for the current block.

A determination of using Table 2 or Table 3 could be made based on the number of luma samples in the current block. For example, for blocks comprising 64 samples or less, no chroma filtering is applied when no chroma subsampling is performed (thus Table 2 is selected for use). On the other hand, when the block size is greater than 64 samples, Table 3 is used to define filter "F". It should be noted that 64 is used only as an example, other threshold values for the number of samples may be used.

In another embodiment, the filter F is selected in accordance with information indicating the chroma format and chroma type as shown in Tables 6-10. Chroma type specifies the displacement of the chroma component and is shown in FIG. 6D. In FIG. 6D, for Chroma sample type 2 and Chroma sample type 4, the subsampled chroma sample is co-located with the corresponding luma sample. For Chroma sample types 0, 1, 3 and 5, the subsampled chroma sample is not co-located with the corresponding luma sample. In Tables 6-10, the filters specified in the "YUV 4:2:0" column are used in the previous design of the VVC draft. Columns "YUV 4:2:2" and "YUV 4:4:4" define filters that can substitute filters defined in column "YUV 4:2:0" when a corresponding chroma format is defined.

TABLE 6

Association of a spatial filter F to the values of chroma format and chroma type, the chroma types are shown in Fig. 6D.

| Chroma type | YUV 4:2:0 | YUV 4:2:2 | YUV 4:4:4 |
|---|---|---|---|
| Chroma Type-0 | $\begin{bmatrix} 0 & 0 & 0 \\ 1 & 2 & 1 \\ 1 & 2 & 1 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 0 & 0 \\ 0 & 1 & 0 \\ 0 & 0 & 0 \end{bmatrix}$ |
| | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
| | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
| | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
| Chroma Type-2 | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
| | $\begin{bmatrix} 0 & 1 & 0 \\ 1 & 4 & 1 \\ 0 & 1 & 0 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 0 & 0 \\ 0 & 1 & 0 \\ 0 & 0 & 0 \end{bmatrix}$ |

TABLE 7

Association of a spatial filter F to the values of chroma format and chroma type:

| Chroma type | YUV 4:2:0 | YUV 4:2:2 | YUV 4:4:4 |
|---|---|---|---|
| Chroma Type-0 | $\begin{bmatrix} 0 & 0 & 0 \\ 1 & 2 & 1 \\ 1 & 2 & 1 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 1 & 0 \\ 1 & 4 & 1 \\ 0 & 1 & 0 \end{bmatrix}$ |

TABLE 7-continued

Association of a spatial filter F to the values of chroma format and chroma type:

| Chroma type | YUV 4:2:0 | YUV 4:2:2 | YUV 4:4:4 |
|---|---|---|---|
|  | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
| Chroma Type-2 | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 1 & 0 \\ 1 & 4 & 1 \\ 0 & 1 & 0 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 1 & 0 \\ 1 & 4 & 1 \\ 0 & 1 & 0 \end{bmatrix}$ |

TABLE 8

Association of a spatial filter F to the values of chroma format and chroma type:

| Chroma type | YUV 4:2:0 | YUV 4:2:2 | YUV 4:4:4 |
|---|---|---|---|
| Chroma Type-0 | $\begin{bmatrix} 0 & 0 & 0 \\ 1 & 2 & 1 \\ 1 & 2 & 1 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 1 & 0 \\ 1 & 4 & 1 \\ 0 & 1 & 0 \end{bmatrix}$ |
|  | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 0 & 0 \end{bmatrix}$ |
| Chroma Type-2 | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |

TABLE 9

Association of a spatial filter F to the values of chroma format and chroma type:

| Chroma type | YUV 4:2:0 | YUV 4:2:2 | YUV 4:4:4 |
|---|---|---|---|
| Chroma Type-0 | $\begin{bmatrix} 0 & 0 & 0 \\ 1 & 2 & 1 \\ 1 & 2 & 1 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 1 & 0 \\ 1 & 4 & 1 \\ 0 & 1 & 0 \end{bmatrix}$ |

TABLE 9-continued

Association of a spatial filter F to the values of chroma format and chroma type:

| Chroma type | YUV 4:2:0 | YUV 4:2:2 | YUV 4:4:4 |
|---|---|---|---|
|  | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 1 & 0 \end{bmatrix}$ | $\begin{bmatrix} 0 & 0 & 0 \\ 0 & 1 & 0 \\ 0 & 0 & 0 \end{bmatrix}$ |
| Chroma Type-2 | $\begin{bmatrix} 0 & 0 & 0 \\ 1 & 2 & 1 \\ 0 & 0 & 0 \end{bmatrix}$ | $\begin{bmatrix} 0 & 0 & 0 \\ 1 & 2 & 1 \\ 1 & 2 & 1 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |

TABLE 10

Association of a spatial filter F to the values of chroma format and chroma type:

| Chroma type | YUV 4:2:0 | YUV 4:2:2 | YUV 4:4:4 |
|---|---|---|---|
| Chroma Type-0 | $\begin{bmatrix} 0 & 0 & 0 \\ 1 & 2 & 1 \\ 1 & 2 & 1 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |
|  | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ | $\begin{bmatrix} 0 & 0 & 0 \\ 0 & 1 & 0 \\ 0 & 0 & 0 \end{bmatrix}$ |
|  | $\begin{bmatrix} 0 & 0 & 0 \\ 1 & 2 & 1 \\ 0 & 0 & 0 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |
|  | $\begin{bmatrix} 0 & 0 & 0 \\ 0 & 1 & 0 \\ 0 & 1 & 0 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |
| Chroma Type-2 | $\begin{bmatrix} 0 & 0 & 0 \\ 1 & 2 & 1 \\ 0 & 0 & 0 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |
|  | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ | $\begin{bmatrix} 0 & 1 & 0 \\ 1 & 4 & 1 \\ 0 & 1 & 0 \end{bmatrix}$ |

The filter $$\begin{bmatrix} 0 & 0 & 0 \\ 0 & 1 & 0 \\ 0 & 0 & 0 \end{bmatrix}$$

could be implemented in different ways, including a filter bypass operation (i.e. by setting an output value to an input value, i.e., the filter is a bypass filter). Alternatively, it could be implemented using the similar add and shift operations, i.e.:

$$Rec'_L[x, y] = \left(\sum_{i=-1}^{1} \sum_{j=-1}^{1} Rec'_L[x+i, y+j] \cdot F[i+1, j+1] + \frac{N}{2}\right) \gg \log_2(N) =$$

$$\left(N + \frac{N}{2}\right) \gg \log_2(N) \quad 5$$

According to the suggested changes, the details of a process for performing intra prediction using a linear model (cross-component prediction of a block) according to one exemplary embodiment presented herein are described as follows in the format of a part of the specification of the VVC draft:

3. The down-sampled collocated luma samples pDsY[x][y] with x=0 . . . nTbW−1, y=0 . . . nTbH−1 are derived as follows:

If sps_cclm_colocated_chroma_flag is equal to 1, the following applies:

pDsY[x][y] with x=1 . . . nTbW−1, y=1 . . . nTbH−1 is derived as follows:

$$pDsY[x][y] = (F[1][0] * pY[SubWidthC * x][SubHeightC * y - 1] +$$

$$F[0][1] * pY[SubWidthC * x - 1][SubHeightC * y] +$$

$$F[1][1] * pY[SubWidthC * x][SubHeightC * y] +$$

$$F[2][1] * pY[SubWidthC * x + 1][SubHeightC * y] +$$

$$F[1][2] * pY[SubWidthC * x][SubHeightC * y + 1] + 4) \gg 3$$

If availL is equal to TRUE, pDsY[0][y] with y=1 . . . nTbH−1 is derived as follows:

$$pDsY[0][y] = (F[1][0] * pY[0][SubHeightC * y - 1] + F[0][1] * pY[-1]$$

$$[SubHeightC * y] + F[1][1] * pY[0][SubHeightC * y] + 2) \gg 2$$

Otherwise, pDsY[0][y] with y=1 . . . nTbH−1 is derived as follows:

$$pDsY[0][y] = (2 * F[1][0] * pY[0][SubHeightC * y - 1] +$$

$$F[1][1] * pY[0][SubHeightC * y] + 2) \gg 2$$

If availT is equal to TRUE, pDsY[x][0] with x=1 . . . nTbW−1 is derived as follows:

$$pDsY[x][0] =$$

$$(F[1][0] * pY[SubWidthC * x][-1] + F[0][1] * pY[SubWidthC * x - 1][0] +$$

$$F[1][1] * pY[SubWidthC * x][0] + F[2][1] * pY[SubWidthC * x + 1][0] +$$

$$F[1][2] * pY[SubWidthC * x][1] + 4) \gg 3$$

Otherwise, pDsY[x][0] with x=1 . . . nTbW−1 is derived as follows:

$$pDsY[x][0] =$$

$$(F[1][0] * pY[SubWidthC * x][-1] + F[0][1] * pY[SubWidthC * x - 1][0] +$$

-continued $$F[1][1] * pY[SubWidthC * x][0] + F[2][1] * pY[SubWidthC * x + 1][0] +$$

$$F[1][2] * pY[SubWidthC * x][1] + 4) \gg 3$$

If availL is equal to TRUE and availT is equal to TRUE, pDsY[0][0] is derived as follows:

$$pDsY[0][0] =$$

$$(F[1][0] * pY[0][-1] + F[0][1] * pY[-1][0] + F[1][1] * pY[0][0] +$$

$$F[2][1] * pY[1][0] + F[1][2] * pY[0][1] + 4) \gg 3$$

Otherwise if availL is equal to TRUE and availT is equal to FALSE, pDsY[0][0] is derived as follows:

$$pDsY[0][0] =$$

$$(F[0][1] * pY[-1][0] + F[1][1] * pY[0][0] + F[2][1] * pY[1][0] + 2) \gg 2$$

Otherwise if availL is equal to FALSE and availT is equal to TRUE, pDsY[0][0] is derived as follows:

$$pDsY[0][0] = (pY[0][-1] + 2 * pY[0][0] + pY[0][1] + 2) \gg 2 \quad (8-169)$$

Otherwise (availL is equal to FALSE and availT is equal to FALSE), pDsY[0][0] is derived as follows:

$$pDsY[0][0] = pY[0][0] \quad (8-170)$$

Otherwise, the following applies:

pDsY[x][y] with x=1 . . . nTbW−1, y=0 . . . nTbH−1 is derived as follows:

$$pDsY[x][y] = (F[0][1] * pY[SubWidthC * x - 1][SubHeightC * y] +$$

$$F[0][2] * pY[SubWidthC * x - 1][SubHeightC * y + 1] +$$

$$F[1][1] * pY[SubWidthC * x][SubHeightC * y] +$$

$$F[1][2] * pY[SubWidthC * x][SubHeightC * y + 1] +$$

$$F[2][1] * pY[SubWidthC * x + 1][SubHeightC * y] +$$

$$F[2][2] * pY[SubWidthC * x + 1][SubHeightC * y + 1] + 4 \gg 3$$

If availL is equal to TRUE, pDsY[0][y] with y=0 . . . nTbH−1 is derived as follows:

$$pDsY[0][y] = (F[0][1] * pY[-1][SubHeightC * y] +$$

$$F[0][2] * pY[-1][SubHeightC * y + 1] + F[1][1] * pY[0][SubHeightC * y] +$$

$$F[1][2] * pY[0][SubHeightC * y + 1] + F[2][1] * pY[1][SubHeightC * y] +$$

$$F[2][2] * pY[1][SubHeightC * y + 1] + 4) \gg 3$$

Otherwise, pDsY[0][y] with y=0 . . . nTbH−1 is derived as follows:

$$pDsY[0][y] = (F[1][1] * pY[0][SubHeightC * y] +$$

$$F[1][2] * pY[0][SubHeightC * y + 1] + 1) \gg 1$$

The filter F[i][j] mentioned in the description above is specified in accordance with the embodiments presented herein.

The details of a process for performing intra prediction using a linear model (cross-component prediction of a block) according to another exemplary embodiment are described as follows in the format of a part of the specification of the VVC draft:

8.4.4.2.8 Specification of INTRA_LT_CCLM, INTRA_L_CCLM and INTRA_T_CCLM intra prediction mode Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

$$(xTbY, yTbY) = \qquad (8\text{--}156)$$

$$(xTbC \ll (SubWidthC - 1), yTbC \ll (SubHeightC - 1))$$

The variables availL, availT and availTL are derived as follows:

The availability of left neighbouring samples derivation process for a block is invoked with the current chroma location (xCurr, yCurr) set equal to (xTbC, yTbC) and the neighbouring chroma location (xTbC−1, yTbC) as inputs, and the output is assigned to availL.

The availability of top neighbouring samples derivation process for a block is invoked with the current chroma location (xCurr, yCurr) set equal to (xTbC, yTbC) and the neighbouring chroma location (xTbC, yTbC−1) as inputs, and the output is assigned to availT.

The availability of top-left neighbouring samples derivation process for a block is invoked with the current chroma location (xCurr, yCurr) set equal to (xTbC, yTbC) and the neighbouring chroma location (xTbC−1, yTbC−1) as inputs, and the output is assigned to availTL.

The number of available top-right neighbouring chroma samples numTopRight is derived as follows:
The variable numTopRight is set equal to 0 and availTR is set equal to TRUE.
When predModeIntra is equal to INTRA_T_CCLM, the following applies for x=nTbW . . . 2*nTbW−1 until availTR is equal to FALSE or x is equal to 2*nTbW−1:
The availability derivation process for a block is invoked with the current chroma location (xCurr, yCurr) set equal to (xTbC, yTbC) and the neighbouring chroma location (xTbC+x, yTbC−1) as inputs, and the output is assigned to availableTR When availableTR is equal to TRUE, numTopRight is incremented by one.

The number of available left-below neighbouring chroma samples numLeftBelow is derived as follows:
The variable numLeftBelow is set equal to 0 and availLB is set equal to TRUE.
When predModeIntra is equal to INTRA_L_CCLM, the following applies for y=nTbH . . . 2*nTbH−1 until availLB is equal to FALSE or y is equal to 2*nTbH−1:
The availability derivation process for a block is invoked with the current chroma location (xCurr, yCurr) set equal to (xTbC, yTbC) and the neighbouring chroma location (xTbC−1, yTbC+y) as inputs, and the output is assigned to availableLB
When availableLB is equal to TRUE, numLeftBelow is incremented by one.

The number of available neighbouring chroma samples on the top and top-right numTopSamp and the number of available neighbouring chroma samples on the left and left-below nLeftSamp are derived as follows:
If predModeIntra is equal to INTRA_LT_CCLM, the following applies:

numSampT=availT?nTbW:0 numSampL=availL?nTbH:0

Otherwise, the following applies:

numSampT=(availT &&
predModeIntra==INTRA_T_CCLM)?(nTbW+
numTopRight):0 numSampL=(availL &&
predModeIntra==INTRA_L_CCLM)?(nTbH+
numLeftBelow):0

The variable bCTUboundary is derived as follows:

$$bCTUboundary =$$

$$(yTbC \& (1 \ll (CtbLog2SizeY - 1) - 1) == 0)?TRUE:FALSE.$$

The prediction samples predSamples [x][y] with x=0 . . . nTbW−1, y=0 . . . nTbH−1 are derived as follows:
If both numSampL and numSampT are equal to 0, the following applies:

$$predSamples[x][y] = 1 \ll (BitDepth_C - 1)$$

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
When numSampL is greater than 0, the neighbouring left luma samples pY[x][y] with x=−1 . . . 3, y=0 . . . . SubHeightC*numSampL−1, are set equal to the reconstructed luma samples prior to the deblocking filter process at the locations (xTbY+x, yTbY+y).
When numSampT is greater than 0, the neighbouring top luma samples pY[x][y] with x=0 . . . . SubWidthC*numSampT−1, y=−1, 2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

3. The down-sampled collocated luma samples pDsY[x][y] with x=0 nTbW−1, y=0 . . . nTbH−1 are derived as follows:

If SubWidthC==1 and SubHeightC==1, the following applies:

pDsY[x][y] with x=1 . . . nTbW−1, y=1 . . . nTbH−1 is derived as follows: pDstY[x][y]=pY[x][y]

//Explanatory notes: No down-sampling is required, i.e. no filtering is performed when 4:4:4 (if both SubWidthC and SubHeightC are equal to 1), and it also may be interpreted as a filter with coefficient [1], i.e. as a bypass filter//

Otherwise, the following applies for a set of filters {F3, F5, F6}. //Explanatory notes: Here define the coefficients of the filters when 4:2:0 or 4:2:2 (if both SubWidthC and SubHeightC are not equal to 1), in which F2 belongs to both the first and second sets of the down-sampling filters//

```
F3[0] = 1, F3[1] = 2, F3[2] = 1
—If SubWidthC==2 and SubHeightC==2
F5[0][1] = 1, F5[1][1] = 4, F3[2][1] = 1, F5[1][0] = 1, F5[1][2] = 1,
F6[0][1] = 1, F6[1][1] = 2, F6[2][1] = 1,
F6[0][2] = 1, F6[1][2] = 2, F6[2][2] = 1,
F2[0] = 1, F2[1] = 1.
—Otherwise
F5[0][1] = 0, F5[1][1] = 8, F3[2][1] = 0, F5[1][0] = 0, F5[1][2] = 0,
F6[0][1] = 2, F6[1][1] = 4, F6[2][1] = 2,
F6[0][2] = 0, F6[1][2] = 0, F6[2][2] = 0,
F2[0] = 2, F2[1] = 0
```

If sps_cclm_colocated_chroma_flag is equal to 1, the following applies:

pDsY[x][y] with x=1 . . . nTbW−1, y=1 . . . nTbH−1 is derived as follows by setting F to be F5:

$$pDsY[x][y] = (F[1][0] * pY[SubWidthC * x][SubHeightC * y - 1] +$$

$$F[0][1] * pY[SubWidthC * x - 1][SubHeightC * y] +$$

$$F[1][1] * pY[SubWidthC * x][SubHeightC * y] +$$

$$F[2][1] * pY[SubWidthC * x + 1][SubHeightC * y] +$$

$$F[1][2] * pY[SubWidthC * x][SubHeightC * y + 1] + 4) \gg 3$$

//Explanatory notes: F5 corresponds to the claimed first downsampling filter//

If availL is equal to TRUE, pDsY[0][y] with y=1 . . . nTbH−1 is derived as follows for F set to F5:

$$pDsY[0][y] =$$

$$(F[1][0] * pY[0][SubHeightC * y - 1] + F[0][1] * pY[-1][SubHeightC * y] +$$

$$F[1][1] * pY[0][SubHeightC * y] + F[2][1] * pY[1][SubHeightC * y] +$$

$$F[1][2] * pY[0][SubHeightC * y + 1] + 4) \gg 3$$

Otherwise, pDsY[0][y] with y=1 . . . nTbH−1 is derived as follows for F set to F3:

$$pDsY[0][y] =$$

$$(F[0] * pY[0][SubHeightC * y - 1] + + F[1] * pY[0][SubHeightC * y] + +$$

$$F[2] * pY[0][SubHeightC * y + 1] + +2) \gg 2$$

If availT is equal to TRUE, pDsY[x][0] with x=1 . . . nTbW−1 is derived as follows for F set to F5:

$$pDsY[x][0] = (F[1][0] * pY[SubWidthC * x][-1] + +$$

$$F[0][1] * pY[SubWidthC * x - 1][0] + +$$

$$F[1][1] * pY[SubWidthC * x][0] + +$$

$$F[2][1] * pY[SubWidthC * x + 1][0] + +$$

$$F[1][2] * pY[SubWidthC * x][1] + 4) \gg 3$$

Otherwise, pDsY[x][0] with x=1 . . . nTbW−1 is derived as follows for F set to F3:

$$pDsY[x][0] =$$

$$(F[0] * pY[SubWidthC * x - 1][0] + + F[1] * pY[SubWidthC * x][0] + +$$

$$F[2] * pY[SubWidthC * x + 1][0] + 2) \gg 2$$

If availL is equal to TRUE and availT is equal to TRUE, pDsY[0][0] is derived as follows for F set to F5:

$$pDsY[0][0] =$$

$$(F[1][0] * pY[0][-1] + + F[0][1] * pY[-1][0] + + F[1][1] * pY[0][0] + +$$

$$F[2][1] * pY[1][0] + + F[1][2] * pY[0][1] + 4) \gg 3$$

Otherwise if availL is equal to TRUE and availT is equal to FALSE, pDsY[0][0] is derived as follows for F set to F3:

$$pDsY[0][0] =$$

$$(F[0] * pY[-1][0] + F[1] * pY[0][0] + F[2] * pY[1][0] + 2) \gg 2$$

Otherwise if availL is equal to FALSE and availT is equal to TRUE, pDsY[0][0] is derived as follows for F set to F3:

$$pDsY[0][0] =$$

$$(F[0] * pY[0][-1] + F[1] * pY[0][0] + F[2] * pY[0][1] + 2) \gg 2$$

Otherwise (availL is equal to FALSE and availT is equal to FALSE), pDsY[0][0] is derived as follows:

$$pDsY[0][0] = pY[0][0]$$

Otherwise, the following applies:
pDsY[x][y] with x=1 . . . nTbW−1, y=0 . . . nTbH−1 is derived as follows for F set to F6:

$$pDsY[x][y] = (F[0][1] * pY[SubWidthC * x - 1][SubHeightC * y] + +$$
$$F[0][2] * pY[SubWidthC * x - 1][SubHeightC * y + 1] + +$$
$$F[1][1] * pY[SubWidthC * x][SubHeightC * y] + +$$
$$F[1][2] * pY[SubWidthC * x][SubHeightC * y + 1] + +$$
$$F[0][2] * pY[SubWidthC * x - 1][SubHeightC * y + 1] +$$
$$F[2][1] * pY[SubWidthC * x + 1][SubHeightC * y] + +$$
$$F[2][2] * pY[SubWidthC * x + 1][SubHeightC * y + 1] + 4) >> 3$$

If availL is equal to TRUE, pDsY[0][y] with y=0 . . . nTbH−1 is derived as follows for F set to F6:

$$pDsY[0][y] = (F[0][1] * pY[-1][SubHeightC * y] + +$$
$$F[0][2] * pY[-1][SubHeightC * y + 1] + +$$
$$F[1][1] * pY[0][SubHeightC * y] + +$$
$$F[1][2] * pY[0][SubHeightC * y + 1] + +$$
$$F[2][1] * pY[1][SubHeightC * y] + +$$
$$F[2][2] * pY[1][SubHeightC * y + 1] + 4) >> 3$$

Otherwise, pDsY[0][y] with y=0 . . . nTbH−1 is derived as follows for F set to F2:

$$pDsY[0][y] = (F[0] * pY[0][SubHeightC * y] + +$$
$$F[1] * pY[0][SubHeightC * y + 1] + 1) >> 1$$

//Step 3 is an implementation for obtaining down-sampled luma samples of reconstructed luma samples in a luma block of the current block using respective down-sampling filters.//

When numSampL is greater than 0, the down-sampled neighbouring left luma samples pLeftDsY[y] with y=0 . . . numSampL−1 are derived as follows:

If SubWidthC==1 and SubHeightC==1, the following applies:

pLeftDsY[y] with y=0 . . . nTbH−1 is derived as follows: pLeftDsY[y]=pY[−1][y]

Otherwise the following applies:

If sps_cclm_colocated_chroma_flag is equal to 1, the following applies:

pLeftDsY[y] with y=1 . . . nTbH−1 is derived as follows for F set to F5:

$$pLeftDsY[y] = F[1][0] * pY[-SubWidthC][SubHeightC * y - 1] + +$$
$$F[0][1] * pY[-1 - SubWidthC][SubHeightC * y] + +$$
$$F[1][1] * pY[-SubWidthC][SubHeightC * y] + +$$
$$F[2][1] * pY[1 - SubWidthC][SubHeightC * y] + +$$
$$F[1][2] * pY[-SubWidthC][SubHeightC * y + 1] + 4) >> 3$$

If availTL is equal to TRUE, pLeftDsY[0] is derived as follows for F set to F5:

$$pLeftDsY[0] =$$
$$F[1][0] * pY[-SubWidthC][-1] + +F[0][1] * pY[-1 - SubWidthC][0] + +$$
$$F[1][1] * pY[-SubWidthC][0] + +F[2][1] * pY[1 - SubWidthC][0] + +$$
$$F[1][2] * pY[-SubWidthC][1] + 4) >> 3$$

Otherwise, pDsY[x][0] with x=1 . . . nTbW−1 is derived as follows for F set to F3:

$$pLeftDsY[0] =$$
$$(F[0] * pY[-1 - SubWidthC][0] + +F[1] * pY[-SubWidthC][0] + +$$
$$F[2] * pY[1 - SubWidthC][0] + +2) >> 2$$

Otherwise, the following applies for F set to F6:

$$pLeftDsY[0] = (F[0][1] * pY[-1 - SubWidthC][SubHeightC * y] + +$$
$$F[0][2] * pY[-1 - SubWidthC][SubHeightC * y + 1] + +$$
$$F[1][1] * pY[-SubWidthC][SubHeightC * y] + +$$
$$F[1][2] * pY[-SubWidthC][SubHeightC * y + 1] + +$$
$$F[2][1] * pY[1 - SubWidthC][SubHeightC * y] + +$$
$$F[2][2] * pY[1 - SubWidthC][SubHeightC * y + 1] + 4) >> 3$$

//Explanatory notes: Steps 4 and 5 are an implementation for obtaining down-sampled luma reference samples of selected neighboring luma samples of the luma block using respective down-sampling filters.//

When numSampT is greater than 0, the down-sampled neighbouring top luma samples pTopDsY[x] with x=0 . . . numSampT−1 are specified as follows:

If SubWidthC==1 and SubHeightC−=1, the following applies:

$$-pTopDSY[x] = pY[x][-1] x = 0 \ ... \ numSampT-1$$

Otherwise, the following applies:

If sps_cclm_colocated_chroma_flag is equal to 1, the following applies:

pTopDsY[x] with x=1 . . . numSampT−1 is derived as follows:

If bCTUboundary is equal to FALSE, the following applies for F set to F5:

$$pTopDsY[x] = (F[1][0] * pY[SubWidthC * x][-1 - SubHeightC] + +$$
$$F[0][1] * pY[SubWidthC * x - 1][-SubHeightC] + +$$
$$F[1][1] * pY[SubWidthC * x][-SubHeightC] + +$$
$$F[2][1] * pY[SubWidthC * x + 1][-SubHeightC] + +$$
$$F[1][2] * pY[SubWidthC * x][1 - SubHeightC] + 4) >> 3$$

Otherwise (bCTUboundary is equal to TRUE), the following applies for F set to F3:

$$pTopsDsY[x] =$$
$$(F[0] * pY[SubWidthC * x - 1][-1] + +F[1] * pY[SubWidthC * x][-1] + +$$
$$F[2] * pY[SubWidthC * x + 1][-1] + +2) >> 2$$

pTopDsY[0] is derived as follows:
   If availTL is equal to TRUE and bCTUboundary is equal to FALSE, the following applies for F set to F5:

$$pTopDsY[0] = F[1][0] * pY[-1][-1 - SubHeightC] + +$$
$$F[0][1] * pY[-1][-SubHeightC] + +$$
$$F[1][1] * pY[0][-SubHeightC] + +$$
$$F[2][1] * pY[1][-SubHeightC] + +$$
$$F[1][2]pY[-1][1 - SubHeightC] + +4) >> 3$$

Otherwise if availTL is equal to TRUE and bCTUboundary is equal to TRUE, the following applies for F set to F3:

$$pTopDsY[0] =$$
$$(F[0] * pY[-1][-1] + +F[1] * pY[0][-1] + +F[2] * pY[1][-1] + +2) \gg 2$$

Otherwise if availTL is equal to FALSE and bCTUboundary is equal to FALSE, the following applies for F set to F3:

$$pTopDsY[0] ==$$
$$(F[0] * pY[0][-1] + +F[1] * pY[0][-2] + +F[2] * pY[0][-1] + +2) \gg 2$$

Otherwise (availTL is equal to FALSE and bCTUboundary is equal to TRUE), the following applies:

$$pTopDsY[0] = pY[0][-1]$$

Otherwise, the following applies:
   pTopDsY[x] with x=1 . . . numSampT−1 is derived as follows:
      If bCTUboundary is equal to FALSE, the following applies for F set to F6:

$$pTopDsY[x] = (F[0][1] * pY[SubWidthC * x - 1][-2] + +$$
$$F[0][2] * pY[SubWidthC * x - 1][-1] + +F[1][1] *$$
$$pY[SubWiddthC * x][-2] + +F[1][2] * pY[SubWidthC * x][-1] + +$$
$$F[2][1] * pY[SubWidthC * x + 1][-2] + +$$
$$F[2][2] * pY[SubWidthC * x + 1][-1] + 4) \gg 3$$

Otherwise (bCTUboundary is equal to TRUE), the following applies for F set to F3:

$$pTopDsY[x] = (F[0] * pY[SubWidthC * y - 1][-1] + +F[1] *$$
$$pY[SubWidthC * y][-1] + +F[2] * pY[SubWidthC * y + 1][-1] + +2) \gg 2$$

pTopDsY[0] is derived as follows:
   If availTL is equal to TRUE and bCTUboundary is equal to FALSE, the following applies for F set to F6:

$$pTopDsY[0] =$$
$$(F[0][1] * pY[-1][-2] + +F[0][2] * pY[-1][-1] + +F[1][1] * pY[0][-2] + +$$
$$F[1][2] * pY[0][-1] + +F[2][1] * pY[1][-2] + +F[2][2] * pY[1][-1] + 4) \gg 3$$

Otherwise if availTL is equal to TRUE and bCTUboundary is equal to TRUE, the following applies for F set to F3:

$$pTopDsY[0] =$$
$$(F[0] * pY[-1][-1] + F[1] * pY[0][-1] + +F[2] * pY[1][-1] + +2) \gg 2$$

Otherwise if availTL is equal to FALSE and bCTUboundary is equal to FALSE, the following applies for F set to F2:

pTopDsY[0]=(F[1]*pY[0][-2]+F[0]*pY[0][-1]+1)
>>1

Otherwise (availTL is equal to FALSE and bCTUboundary is equal to TRUE), the following applies:

$$pTopDsY[0] = pY[0][-1]$$

//Explanatory notes: Steps 4 and 5 are an implementation for obtaining down-sampled luma reference samples of selected neighboring luma samples of the luma block by applying respective down-sampling filter.//
The variables nS, xS, yS are derived as follows:
If predModeIntra is equal to INTRA_LT_CCLM, the following applies:

$$nS =$$                                                    (8-192)
$$((availL \&\& \ availT)?\text{Min}(nTbW, nTbH):(availL?nTbH:nTbW))$$

-continued $$xS = 1 \ll (((nTbW > nTbH) \,\&\&\, availL \,\&\&\, availT)?(\text{Log2}(nTbW) - $$
$$\text{Log2}(nTbH)):0)$$

$$yS = \qquad\qquad (8\text{-}193)$$
$$1 \ll (((nTbH > nTbW) \,\&\&\, availL \,\&\&\, availT)?(\text{Log2}(nTbH) - $$
$$\text{Log2}(nTbW)):0)$$

Otherwise if predModeIntra is equal to INTRA_L_C-CLM, the following applies:
nS=numSampL
xS=1
yS=1
Otherwise (predModeIntra is equal to INTRA_T_C-CLM), the following applies:
nS=numSampT
xS=1
yS=1
The variables minY, maxY, minC and maxC are derived as follows:
The variable minY is set equal to $1 \ll (BitDepth_Y)+1$ and the variable maxY is set equal to −1.
If availT is equal to TRUE, the variables minY, maxY, minC and maxC with x=0 . . . nS−1 are derived as follows:
If minY is greater than pTopDsY[x*xS], the following applies:

$$minY = pTopDsY[x * xS]$$
$$minC = p[x * xS][-1]$$

If max Y is less than pTopDsY[x*xS], the following applies:

$$maxY = pTopDsY[x * xS]$$
$$maxC = p[x * xS][-1]$$

If availL is equal to TRUE, the variables minY, maxY, minC and maxC with y=0 . . . nS−1 are derived as follows:
If minY is greater than pLeftDsY[y*yS], the following applies:

$$minY = pLeftDsY[y * yS]$$
$$minC = p[-1][y * yS]$$

If max Y is less than pLeftDsY[y*yS], the following applies:

$$maxY = pLeftDsY[y * yS]$$
$$maxC = p[-1][y * yS]$$

The variables a, b, and k are derived as follows:
If numSampL is equal to 0, and numSampT is equal to 0, the following applies:

$$k = 0$$
$$a = 0$$
$$b = 1 \ll (BitDepth_C - 1)$$

Otherwise, the following applies:

$$diff = maxY - minY$$

If diff is not equal to 0, the following applies:

$$diffC = maxC - minC$$
$$x = \text{Floor}(\text{Log2}(diff))$$
$$normDiff = ((diff << 4) >> x) \& 15$$
$$x += (normDiff \,!= 0) ? 1 : 0$$
$$y = \text{Floor}(\text{Log2}(\text{Abs}(diffC))) + 1$$
$$a = \left(diffC * (divSigTable[normDiff] \,|\, 8) + 2^{y-1}\right) >> y$$
$$k = ((3 + x - y) < 1) ? 1 : 3 + x - y$$
$$a = ((3 + x - y) < 1) ? \text{Sign}(a) * 15 : a$$
$$b = minC - ((a * minY) >> k)$$

where divSigTable[ ] is specified as follows:
divSigTable[ ]={0, 7, 6, 5, 5, 4, 4, 3, 3, 2, 2, 1, 1, 1, 1, 0}
Otherwise (diff is equal to 0), the following applies:
k=0
a=0
b=minC
//Explanatory notes: Steps 6-8 are an implementation for determining one or more linear model coefficients based on the down-sampled luma reference samples of the selected neighboring luma samples and chroma reference samples that correspond to the down-sampled luma reference samples; in particular, determination of linear model coefficients is based on minY, max Y, minC and maxC.//
The prediction samples predSamples [x][y] with x=0 . . . nTbW−1, y=0 . . . nTbH−1 are derived as follows:

$$predSamples[x][y] = Clip1C(((pDsY[x][y] * a) >> k) + b)$$

//Explanatory notes: Step 9 is an implementation for obtaining prediction samples of a chroma block that corresponds to the luma block based on the linear model coefficients and the down-sampled luma samples of the reconstructed luma samples in the luma block.//
It should be noted that in the present disclosure, for the set of filters {F2, F3, F5, F6}, the one-digit number that follows "F" is an index used to represent different filters within a filter set. The filter is defined by one or more filter coefficients to be applied to the corresponding samples. For example, if one or more down-sampling filter coefficients to be applied to the corresponding samples in F3 are same with one or more down-sampling filter coefficients to be applied to the corresponding samples in F2, it can be understood that the F3 and the F2 are the same filter; such as, if F3[0]=1, F3[1]=2, F3[2]=1 and F2[0]=1, F2[1]=2, F2[2]=1, then F3=F2.

For example, if one or more down-sampling filter coefficients to be applied to the corresponding samples in F5 are different from one or more down-sampling filter coefficients to be applied to the corresponding samples in F5, it can be understood that the F5 and the F5 are different filters even the name of the two are same, such as, if F5[0][1]=1, F5[1][1]=4, F5 [2][1]=1, F5[1][0]=1, F5[1][2]=1 and F5[0][1]=0, F5[1][1]=8, F5[2][1]=0, F5[1][0]=0, F5[1][2]=0, then F5≠F5.

It should be noted that there are a filter with coefficient [1], i.e. as a bypass filter, 1D no-separable filter (F[i]) and 2D no-separable filter (F[i][j]) in the present disclosure.

Another embodiment describes the method to derive the CCLM parameters with at most four neighbouring chroma samples and their corresponding down-sampled luma samples.

Suppose the current chroma block dimensions are W×H, then W' and H' are set as

W'=W, H'=H when LM mode is applied (top and left templates are used in the LM mode);

W'=W+H when LM-A mode is applied (only the top template is used in the LM-A mode);

H'=H+W when LM-L mode is applied (only the left templates is used in the LM-L mode);

The above neighbouring samples (i.e., neighbouring chroma samples that are above the current block) are denoted as S[0, −1] . . . . S[W'−1, −1] and the left neighbouring samples (i.e., the neighbouring chroma samples that are on the left of the current block) are denoted as S[−1, 0] . . . . S[−1, H'−1]. Here, S[x, y] denotes the sample at the position (x, y). (x, y) is measured relative to the top-left sample of the current block (i.e., the top-left sample of the block is marked as (0,0)). Then the four neighbouring chroma samples used to derive the CCLM parameters can be specified as (correspondingly, the positions of four down-sampled neighbouring luma samples of selected neighboring luma samples are indicated by):

S[W'/4, −1], S[3 W'/4, −1], S[−1, H'/4], S[−1, 3H'/4] when LM mode is applied and both above and left neighbouring samples are available;

S[W'/8, −1], S[3 W'/8, −1], S[5 W'/8, −1], S[7 W'/8, −1] when LM-A mode is applied or only the above neighbouring samples are available;

S[−1, H'/8], S[−1, 3H'/8], S[−1, 5H'/8], S[−1, 7H'/8] when LM-L mode is applied or only the left neighbouring samples are available;

Each of the four down-sampled neighbouring luma samples is obtained by applying the respective down-sampling filter on a part or a whole of the selected neighboring luma samples. The four down-sampled neighbouring luma samples corresponding to the four neighboring chroma samples selected above are compared four times to find two smaller values: $x^0_A$ and $x^1_A$, and two larger values: $x^0_B$ and $x^1_B$, where any of $x^0_B$ and $x^1_B$ is larger than any of $x^0_A$ and $x^1_A$. Their corresponding chroma sample values are denoted as $y^0_A$, $y^1_A$, $y^0_B$ and $y^1_B$. Then $x_A$, $x_B$, $y_A$ and $y_B$ are derived as:

$$x_A = \left( x^0_A + x^1_A + 1 \right) >> 1;$$

$$x_B = \left( x^0_B + x^1_B + 1 \right) >> 1;$$

-continued $$y_A = \left( y^0_A + y^1_A + 1 \right) >> 1;$$

$$y_B = \left( y^0_B + y^1_B + 1 \right) >> 1.$$

The details of a process for performing intra prediction using a linear model (cross-component prediction of a block) according to another exemplary embodiment presented herein are described as follows in the format of a part of the specification of the VVC draft (the version of the below section 8.4.4.2.8 is different from the version of the above section 8.4.4.2.8):

8.4.4.2.8 Specification of INTRA_LT_CCLM, INTRA_L_CCLM and INTRA_T_CCLM intra prediction mode Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

$$(xTbY, yTbY) = (xTbC << (SubWidthC - 1), yTbC << (SubHeightC - 1))$$

The variables availL, availT and availTL are derived as follows:

The availability of left neighbouring samples derivation process for a block is invoked with the current chroma location (xCurr, yCurr) set equal to (xTbC, yTbC) and the neighbouring chroma location (xTbC−1, yTbC) as inputs, and the output is assigned to availL.

The availability of top neighbouring samples derivation process for a block is invoked with the current chroma location (xCurr, yCurr) set equal to (xTbC, yTbC) and the neighbouring chroma location (xTbC, yTbC−1) as inputs, and the output is assigned to availT.

The availability of top-left neighbouring samples derivation process for a block is invoked with the current chroma location (xCurr, yCurr) set equal to (xTbC, yTbC) and the neighbouring chroma location (xTbC−1, yTbC−1) as inputs, and the output is assigned to availTL.

The number of available top-right neighbouring chroma samples numTopRight is derived as follows:

The variable numTopRight is set equal to 0 and availTR is set equal to TRUE.

When predModeIntra is equal to INTRA_T_CCLM, the following applies for x=nTbW . . . 2*nTbW−1 until availTR is equal to FALSE or x is equal to 2*nTbW−1:

The availability derivation process for a block is invoked with the current chroma location (xCurr, yCurr) set equal to (xTbC, yTbC) and the neighbouring chroma location (xTbC+x, yTbC−1) as inputs, and the output is assigned to availableTR When availableTR is equal to TRUE, numTopRight is incremented by one.

The number of available left-below neighbouring chroma samples numLeftBelow is derived as follows:

The variable numLeftBelow is set equal to 0 and availLB is set equal to TRUE.

When predModeIntra is equal to INTRA_L_CCLM, the following applies for y=nTbH . . . 2*nTbH−1 until availLB is equal to FALSE or y is equal to 2*nTbH−1:

The availability derivation process for a block is invoked with the current chroma location (xCurr, yCurr) set equal to (xTbC, yTbC) and the neighbouring chroma location (xTbC−1, yTbC+y) as inputs, and the output is assigned to availableLB When availableLB is equal to TRUE, numLeftBelow is incremented by one.

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

$$numSampT=availT?nTbW: 0$$

$$numSampL=availL?nTbH: 0$$

Otherwise, the following applies:

$$numSampT = (availT \ \&\& \ predModeIntra == INTRA\_T\_CCLM)?$$
$$(nTbW + Min(numTopRight, nTbH)) : 0$$
$$numSampL = (availL \ \&\& \ predModeIntra == INTRA\_L\_CCLM)?$$
$$(nTbH + Min(numLeftBelow, nTbW)) : 0$$

The variable bCTUboundary is derived as follows:

$$bCTUboundary =$$
$$(yTbC \ \& (1 << (CtbLog2SizeY - 1) - 1) == 0) \ ? \ TRUE : FALSE.$$

The variable cntN and array pickPosN[ ] with N being replaced by L and T, are derived as follows:

The variable numIs4N is set equal to ((availT && availL && predModeIntra==INTRA_LT_CCLM)?0:1).

The variable startPosN is set equal to numSampN>>(2+numIs4N).

The variable pickStepN is set equal to Max(1, num-SampN>>(1+numIs4N)).

If availN is equal to TRUE and predModeIntra is equal to INTRA_LT_CCLM or INTRA_N_CCLM, cntN is set equal to Min (numSampN, (1+numIs4N)<<1), and pickPosN[pos] is set equal to (startPosN+pos*pickStepN), with pos=0 . . . (cntN−1).

Otherwise, cntN is set equal to 0.

The prediction samples predSamples [x][y] with x=0 . . . nTbW−1, y=0 . . . nTbH−1 are derived as follows:

If both numSampL and numSampT are equal to 0, the following applies:

$$predSamples[x][y] = 1 << (BitDepth_C - 1)$$

Otherwise, the following ordered steps apply:

1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).

2. The neighbouring luma samples pY[x][y] are derived as follows:

When numSampL is greater than 0, the neighbouring left luma samples pY[x][y] with x=−1 . . . 3, y=0 . . . . SubHeightC*numSampL−1, are set equal to the reconstructed luma samples prior to the deblocking filter process at the locations (xTbY+x, yTbY+y).

When numSampT is greater than 0, the neighbouring top luma samples pY[x][y] with x=0 . . . . SubWidthC*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, 2, are set equal to the reconstructed luma samples prior to the deblocking filter process at the locations (xTbY+x, yTbY+y).

3. The down-sampled collocated luma samples pDsY [x][y] with x=0 . . . nTbW−1, y=0 . . . nTbH−1 are derived as follows:

If SubWidthC==1 and SubHeightC==1, the following applies:

pDsY[x][y] with x=1 . . . nTbW−1, y=1 . . . nTbH−1 is derived as follows: pDstY[x][y]=pY [x][y]

//Explanatory notes: only for explaining: No filter for YUV 4:4:4. No down-sampling is required, i.e. no filtering is performed when 4:4:4 (if both SubWidthC and SubHeightC are equal to 1), and it also may be interpreted as a filter with coefficient [1], i.e. as a bypass filter//

Otherwise, the following applies for a set of filters {F3, F5, F6}.//Explanatory notes: Here define the coefficients of the filters when 4:2:0 or 4:2:2 (if both SubWidthC and SubHeightC are not equal to 1), in which F2 belongs to both the first and second sets of the down-sampling filters//

F3[0]=1, F3[1]=2, F3[2]=1

If SubWidthC==2 and SubHeightC==2

F5[0][1]=1, F5[1][1]=4, F3[2][1]=1, F5[1][0]=1, F5[1][2]=1,

F6[0][1]=1, F6[1][1]=2, F6[2][1]=1, F6[0][2]=1, F6[1][2]=2, F6[2][2]=1,

F2[0]=1, F2[1]=1.

Otherwise

F5[0][1]=0, F5[1][1]=8, F3[2][1]=0, F5[1][0]=0, F5[1][2]=0,

F6[0][1]=2, F6[1][1]=4, F6[2][1]=2, F6[0][2]=0, F6[1][2]=0, F6[2][2]=0,

F2[0]=2, F2[1]=0.

If sps_cclm_colocated_chroma_flag is equal to 1, the following applies:

pDsY[x][y] with x=1 . . . nTbW−1, y=1 . . . nTbH−1 is derived as follows by setting F to be F5:

$$pDsY[x][y] = (F[1][0] * pY[SubWidthC * x][SubHeightC * y - 1] +$$
$$+F[0][1] * pY[SubWidthC * x - 1][SubHeightC * y] +$$

-continued $$+F[1][1]*pY[SubWidthC*x][SubHeightC*y]+$$

$$+F[2][1]*pY[SubWidthC*x+1][SubHeightC*y]+$$

$$+F[1][2]*pY[SubWidthC*x][SubHeightC*y+1]+4)>>3$$

//Explanatory notes: F5 corresponds to the claimed first downsampling filter//

If availL is equal to TRUE, pDsY[0][y] with y=1 . . . nTbH−1 is derived as follows for F set to F5:

$$pDsY[0][y]=(F[1][0]*pY[0][SubHeightC*y-1]+$$

$$+F[0][1]*pY[-1][SubHeightC*y]+$$

$$+F[1][1]*pY[0][SubHeightC*y]+$$

$$+F[2][1]*pY[1][SubHeightC*y]+$$

$$+F[1][2]*pY[0][SubHeightC*y+1]+4)>>3$$

Otherwise, pDsY[0][y] with y=1 . . . nTbH−1 is derived as follows for F set to F3:

$$pDsY[0][y]=(F[0]*pY[0][SubHeightC*y-1]+$$

$$+F[1]*pY[0][SubHeightC*y]+$$

$$+F[2]*pY[0][SubHeightC*y+1]+$$

$$+2)>>2$$

If availT is equal to TRUE, pDsY[x][0] with x=1 . . . nTbW−1 is derived as follows for F set to F5:

$$pDsY[x][0]=(F[1][0]*pY[SubWidthC*x][-1]+$$

$$+F[0][1]*pY[SubWidthC*x-1][0]+$$

$$+F[1][1]*pY[SubWidthC*x][0]+$$

$$+F[2][1]*pY[SubWidthC*x+1][0]+$$

$$+F[1][2]*pY[SubWidthC*x][1]+4)>>3$$

Otherwise, pDsY[x][0] with x=1 . . . nTbW−1 is derived as follows for F set to F3:

$$pDsY[x][0]=(F[0]*pY[SubWidthC*x-1][0]+$$

$$+F[1]*pY[SubWidthC*x][0]+$$

$$+F[2]*pY[SubWidthC*x+1][0]+2)>>2$$

If availL is equal to TRUE and availT is equal to TRUE, pDsY[0][0] is derived as follows for F set to F5:

$$pDsY[0][0]=(F[1][0]*pY[0][-1]+$$

$$+F[0][1]*pY[-1][0]+$$

$$+F[1][1]*pY[0][0]+$$

-continued $$+F[2][1]*pY[1][0]+$$

$$+F[1][2]*pY[0][1]+4)>>3$$

Otherwise if availL is equal to TRUE and availT is equal to FALSE, pDsY[0][0] is derived as follows for F set to F3:

$$pDsY[0][0]=(F[0]*pY[-1][0]+$$

$$+F[1]*pY[0][0]+$$

$$+F[2]*pY[0][1]+$$

$$+2)>>2$$

Otherwise if availL is equal to FALSE and availT is equal to TRUE, pDsY[0][0] is derived as follows for F set to F3:

$$pDsY[0][0]=(F[0]*pY[0][-1]+$$

$$+F[1]*pY[0][0]+$$

$$+F[2]*pY[0][1]+$$

$$+2)>>2$$

Otherwise (availL is equal to FALSE and availT is equal to FALSE), pDsY[0][0] is derived as follows:

$$pDsY[0][0]=pY[0][0]$$

Otherwise, the following applies:
pDsY[x][y] with x=1 . . . nTbW−1, y=0 . . . nTbH−1 is derived as follows for F set to F6:

$$pDsY[x][y]=$$

$$(F[0][1]*pY[SubWidthC*x-1[SubHeightC*y]+$$

$$+F[0][2]*pY[SubWidthC*x-1][SubHeightC*y+1]+$$

$$+F[1][1]*pY[SubWidthC*x][SubHeightC*y]+$$

$$+F[1][2]*pY[SubWidthC*x][SubHeightC*y+1]+$$

$$+F[2][1]*pY[SubWidthC*x+1][SubHeightC*y]+$$

$$+F[2][2]*pY[SubWidthC*x+1][SubHeightC*y+1]+4)$$

$$>>3$$

If availL is equal to TRUE, pDsY[0][y] with y=0 . . . nTbH−1 is derived as follows for F set to F6:

$$pDsY[0][y]=$$

$$(F[0][1]*pY[-1][SubHeightC*y]+$$

$$+(F[0][2]*pY[-1][SubHeightC*y+1]+$$

$$+(F[1][1]*pY[0][SubHeightC*y]+$$

-continued $$+(F[1][2] * pY[0][SubHeightC * y + 1] +$$

$$+(F[2][1] * pY[1][SubHeightC * y] +$$

$$+(F[2][2] * pY[1][SubHeightC * y + 1] + 4) >> 3$$

Otherwise, pDsY[0][y] with y=0 . . . nTbH−1 is derived as follows for F set to F2:

$$pDsY[0][y] =$$

$$(F[0] * pY[0][SubHeightC * y] +$$

$$+F[1] * pY[0][SubHeightC * y + 1] + 1) >> 1$$

//Step 3 is an implementation for obtaining down-sampled luma samples of reconstructed luma samples in a luma block of the current block using respective down-sampling filters.//

When numSampL is greater than 0, the selected neighbouring left chroma samples pSelC[idx] are set equal to p[−1][pickPosL[idx]] with idx=0 . . . (cntL−1), and the selected down-sampled neighbouring left luma samples pSelDsY[idx] with idx=0 . . . (cntL−1) are derived as follows:

The variable y is set equal to pickPosL[idx].

If SubWidthC==1 and SubHeightC==1, the following applies:

$$- \quad pSelDsY[i] = pY[-1][y]$$

Otherwise the following applies:

If sps_cclm_colocated_chroma_flag is equal to 1, the following applies:

If y>0||availTL==TRUE, for F set to F5:

$$pSelDsY[idx] =$$

$$F[1][0] * pY[-SubWidthC][SubHeightC * y - 1] +$$

$$+F[0][1] * pY[-1 - SubWidthC][SubHeightC * y] +$$

$$+F[1][1] * pY[-SubWidthC][SubHeightC * y] +$$

$$+F[2][1] * pY[1 - SubWidthC][SubHeightC * y] +$$

$$+F[1][2] * pY[-SubWidthC][SubHeightC * y + 1] + 4) >> 3$$

Otherwise, for F set to F3:

$$pSelDsY[idx] =$$

$$(F[0] * pY[-1 - SubWidthC][0] +$$

$$+F[1] * pY[-SubWidthC][0] +$$

$$+F[2] * pY[1 - SubWidthC][0] +$$

$$+2) >> 2$$

Otherwise, the following applies for F set to F6:

$$pSelDsY[idx] =$$

$$(F[0][1] * pY[-1 - SubWidthC][SubHeightC * y] +$$

$$+F[0][2] * pY[-1 - SubWidthC][SubHeightC * y + 1] +$$

$$+F[1][1] * pY[-SubWidthC][SubHeightC * y] +$$

$$+F[1][2] * pY[-SubWidthC][SubHeightC * y + 1] +$$

$$+F[2][1] * pY[1 - SubWidthC][SubHeightC * y] +$$

$$+F[2][2] * pY[1 - SubWidthC][SubHeightC * y + 1] + 4) >> 3$$

//Explanatory notes: Steps 4 and 5 are an implementation for obtaining down-sampled luma reference samples of selected neighboring luma samples of the luma block using respective down-sampling filters.//

When numSampT is greater than 0, the selected neighbouring top chroma samples pSelC[idx] are set equal to p[pickPosT[idx−cntL]][−1] with idx=cntL . . . (cntL+cntT−1), and the down-sampled neighbouring top luma samples pSelDsY[idx] with idx=cntL . . . cntL+cntT−1 are specified as follows:

The variable x is set equal to pickPosT[idx-cntL].

If SubWidthC==1 and SubHeightC==1, the following applies:

$$- \quad pSelDsY[idx] = pY[x][-1]$$

Otherwise, the following applies:

If sps_cclm_colocated_chroma_flag is equal to 1, the following applies:

If x>0:

If bCTUboundary is equal to FALSE, the following applies for F set to F5:

$$pSelDsY[idx] =$$

$$(F[1][0] * pY[SubWidthC * x][-1 - SubHeightC] +$$

$$+F[0][1] * pY[SubWidthC * x - 1][-SubHeightC] +$$

$$+F[1][1] * pY[SubWidthC * x][-SubHeightC] +$$

$$+F[2][1] * pY[SubWidthC * x + 1][-SubHeightC] +$$

$$+F[1][2] * pY[SubWidthC * x][1 - SubHeightC] + 4) >> 3$$

Otherwise (bCTUboundary is equal to TRUE), the following applies for F set to F3:

$$pSelDsY[idx] =$$

$$(F[0] * pY[SubWidthC * x - 1][-1] +$$

$$+F[1] * pY[SubWidthC * x][-1] +$$

$$+F[2] * pY[SubWidthC * x + 1][-1] + 2) >> 2$$

Otherwise:

If availTL is equal to TRUE and bCTUboundary is equal to FALSE, the following applies for F set to F5:

$pSelDsY\,[idx] =$ $F[1][0] * pY[-1] \quad [-1 - SubHeightC] +$ $+F[0][1] * pY[-1] \quad [-SubHeightC] +$ $+F[1][1] * pY[0] \quad [-SubHeightC] +$ $+F[2][1] * pY[1] \quad [-SubHeightC] +$ $+F[1][2]pY[-1] \quad [1 - SubHeightC] + 4) >> 3$ Otherwise if availTL is equal to TRUE and bCTUboundary is equal to TRUE, the following applies for F set to F3:

$pSelDsY\,[idx] =$ $(F[0] * pY[-1][-1] +$ $+F[1] * pY[0][-1] + (8{-}182)$ $+F[2] * pY[1][-1] +$ $+2) >> 2$ Otherwise if availTL is equal to FALSE and bCTUboundary is equal to FALSE, the following applies for F set to F3:

$pSelDsY\,[idx] =$ $(F[0] * pY[0][-1] +$ $+F[1] * pY[0][-2] +$ $+F[2] * pY[0][-1] +$ $+2) >> 2$ Otherwise (availTL is equal to FALSE and bCTUboundary is equal to TRUE), the following applies:

$pSelDsY\,[idx] = pY[0][-1]$

Otherwise, the following applies:
  If x>0:
    If bCTUboundary is equal to FALSE, the following applies for F set to F6:

$pSelDsY[idx] = (F[0][1] * pY[SubWidthC * x - 1][-2] +$ $+F[0][2] * pY[SubWidthC * x][-1][-1] +$ $+F[1][1] * pY[SubWidthC * x][-2] + +F[1][2] * pY[SubWidthC * x][-1] +$ $+F[2][1] * pY[SubWidthC * x + 1][-2] +$ $+F[2][2] * pY[SubWidthC * x + 1][-1] + 4) >> 3$ Otherwise (bCTUboundary is equal to TRUE), the following applies for F set to F3:

$pSelDsY[idx] =$ $(F[0]^* pY[SubWidthC * y - 1][-1] + +F[1] * pY[SubWidthC * y][-1] +$ $+F[2] * pY[SubWidthC * y + 1][-1] + +2) >> 2$ Otherwise:
  If availTL is equal to TRUE and bCTUboundary is equal to FALSE, the following applies for F set to F6:

$pSelDsY[idx] = (F[0][1] * pY[-1][-2] +$ $+F[0][2] * pY[-1][-1] + +F[1][1] * pY[0][-2] + +F[1][2] * pY[0][-1] +$ $+F[2][1] * pY[1][-2] + +F[2][2] * pY[1][-1] + 4) >> 3$ Otherwise if availTL is equal to TRUE and bCTUboundary is equal to TRUE, the following applies for F set to F3:

$pSelDsY[idx] =$ $(F[0] * pY[-1][-1] + +F[1] * pY[0][-1] + +F[2] * pY[1][-1] + +2) >> 2$ Otherwise if availTL is equal to FALSE and bCTUboundary is equal to FALSE, the following applies for F set to F2:

$pSelDsY[idx] = (F[1] * pY[0][-2] + F[0] * pY[0][-1] + 1) >> 1$

Otherwise (availTL is equal to FALSE and bCTUboundary is equal to TRUE), the following applies:

$pSelDsY[idx] = pY[0][-1]$

//Explanatory notes: Steps 4 and 5 are an implementation for obtaining down-sampled luma reference samples of selected neighboring luma samples of the luma block by applying respective down-sampling filter.//
When cntT+cntL is not equal to 0, the variables minY, max Y, minC and maxC are derived as follows:
When cntT+cntL is equal to 2, set pSelComp[3] equal to pSelComp[0], pSelComp[2] equal to pSelComp[1], pSelComp[0] equal to pSelComp[1], and pSelComp[1] equal to pSelComp[3], with Comp being replaced by DsY and C.
The arrays minGrpIdx[ ] and maxGrpIdx[ ] are set as: minGrpIdx[0]=0, minGrpIdx[1]=2, maxGrpIdx[0]=1, maxGrpIdx[1]=3.
If pSelDsY[minGrpIdx[0]]>pSelDsY[minGrpIdx[1]], Swap (minGrpIdx[0], minGrpIdx[1]).
If pSelDsY[maxGrpIdx[0]]>pSelDsY[maxGrpIdx[1]], Swap (maxGrpIdx[0], maxGrpIdx[1]).
If pSelDsY[minGrpIdx[0]]>pSelDsY[maxGrpIdx[1]], Swap (minGrpIdx, maxGrpIdx).
If pSelDsY[minGrpIdx[1]]>pSelDsY[maxGrpIdx[0]], Swap (minGrpIdx[1], maxGrpIdx[0]).

maxY=(pSelDsY[maxGrpIdx[0]]+pSelDsY
    [maxGrpIdx[1]]+1)>>1.

maxC=(pSelC[maxGrpIdx[0]]+pSelC[maxGrpIdx
    [1]]+1)>>1.

minY=(pSelDsY[minGrpIdx[0]]+pSelDsY[min-
    GrpIdx[1]]+1)>>1.

minC=(pSelC[minGrpIdx[0]]+pSelC[minGrpIdx[1]]+
    1)>>1.

The variables a, b, and k are derived as follows:
If numSampL is equal to 0, and numSampT is equal to 0,
the following applies:
k=0
a=0
b=1<< (BitDepthc−1)
Otherwise, the following applies:

$$diff = \max Y - \min Y$$

Figure 12:
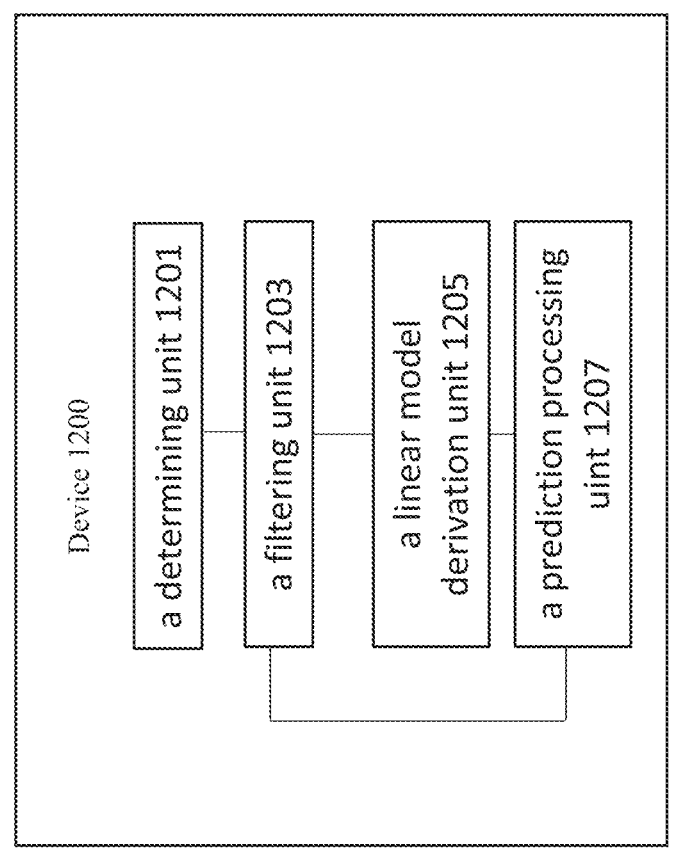
FIG. 12 is a schematic diagram of a device configured for performing cross-component intra-prediction according to some aspects of the present disclosure.

If diff is not equal to 0, the following applies:

$$diffC = \max C - \min C$$

$$x = \text{Floor}(\text{Log2}(diff))$$

$$normDiff = ((diff << 4) >> x) \,\&\, 15$$

$$x += (normDiff != 0) \,?\, 1{:}0$$

$$y = \text{Floor}(\text{Log2}(\text{Abs}(diffC))) + 1$$

$$a = (diffC * (divSigTable[normDiff]|8) + 2^{y-1}) >> y$$

$$k = ((3 + x - y), < 1) \,?\, 1{:}3 + x - y$$

$$a = ((3 + x - y) < 1) \,?\, \text{Sign}(a) * 15{:} a$$

$$b = \min C - ((a * \min Y) >> k)$$

where divSigTable [ ] is specified as follows:
    divSigTable [ ]={0, 7, 6, 5, 5, 4, 4, 3, 3, 2, 2, 1, 1, 1,
    1, 0}
Otherwise (diff is equal to 0), the following applies:
    k=0
    a=0
    b=minC
    //Explanatory notes: Steps 6-7 are an implementation
    for determining one or more linear model coeffi-
    cients based on the down-sampled luma reference
    samples of the selected neighboring luma samples
    and chroma reference samples that correspond to
    the down-sampled luma reference samples; in
    particular, determination of linear model coeffi-
    cients is based on minY, maxY, minC and maxC.//
The prediction samples predSamples [x][y] with x=0 . . .
nTbW−1, y=0 . . . nTbH−1 are derived as follows:
    predSamples [x][y]=Clip1C(((pDsY[x][y] *a)>>k)+b)/
    Explanatory notes: Step 8 is an implementation for
    obtaining prediction samples of a chroma block that
    corresponds to the luma block based on the linear
    model coefficients and the down-sampled luma
    samples of the reconstructed luma samples in the luma
    block.//
FIG. 12 illustrates a device for performing intra prediction
using a linear model according to another aspect of the
disclosure. The device 1200 comprises:

a determining unit 1201 configured for determining a set
    of down-sampling filters based on chroma format infor-
    mation, wherein the chroma format information indi-
    cates a chroma format of a picture that a current block
    belongs to;
a filtering unit 1203 configured for obtaining down-
    sampled luma samples of reconstructed luma samples
    in a luma block of the current block and down-sampled
    luma reference samples of selected luma reference
    samples (or selected luma neighboring samples) of the
    luma block using respective down-sampling filters
    among (selected from) the set of down-sampling filters;
a linear model derivation unit 1205 configured for deter-
    mining one or more linear model coefficients based on
    the down-sampled luma reference samples and chroma
    reference samples that correspond to the down-sampled
    luma reference samples; and
a prediction unit 1207, configured for obtaining prediction
    samples of a chroma block that corresponds to the luma
    block based on the linear model coefficients and the
    down-sampled luma samples of the reconstructed luma
    samples in the luma block.
    Correspondingly, in an example, an example structure of
the device 1200 may be corresponding to encoder 20 in FIG.
2. In another example, an example structure of the device
1200 may be corresponding to the decoder 30 in FIG. 3.
    in another example, an example structure of the device
1200 may be corresponding to intra prediction unit 254 in
FIG. 2. In another example, an example structure of the
device 1200 may be corresponding to the intra prediction
unit 354 in FIG. 3.
    The present disclosure provides the following further
aspects.
    According to a first aspect, the disclosure relates to a
method for intra prediction using linear model. The method
is performed by coding apparatus (in particular, the appa-
ratus for intra prediction). The method includes:
    determining a filter for a luma sample (such as each luma
        sample) belonging to a block (i.e. the internal samples
        of the current block), based on a chroma format of a
        picture that the current block belongs to; in particular,
        different luma samples may correspond to different
        filter. Basically, depending whether it is on the bound-
        ary.
    at the position of the luma sample (such as each luma
        sample) belonging to the current block, applying the
        determined filter to an area of reconstructed luma
        samples, to obtain a filtered reconstructed luma sample
        (such as $\text{Rec}'_L$ [x, y]);
    obtaining, based on the filtered reconstructed luma
        sample, a set of luma samples used as an input of linear
        model derivation; and
    performing cross-component prediction (such as cross-
        component chroma-from-luma prediction or CCLM
        prediction) based on linear model coefficients of the
        linear model derivation and the filtered reconstructed
        luma sample.
    The present disclosure relates to luma filter of CCLM.
The disclosure is about filtering luma samples. The disclo-
sure relates to filter selection that is performed inside
CCLM.
    CCLM relates to chroma prediction, it uses reconstructed
luma to predict chroma signal.
    In a possible implementation form of the method accord-
ing to the first aspect as such, the determining a filter,
comprises:

determining the filter based on a position of the luma sample within the current block and the chroma format; or determining respective filters for a plurality of luma samples belonging to the current block, based on respective positions of the luma samples within the current block and the chroma format. It can be understood that if samples adjacent to the current block are available, the filter may use those as well for filtering the boundary area of the current block.

In a possible implementation form of the method according to the first aspect as such, the determining a filter, comprises: determining the filter based on one or more of the following:

a chroma format of a picture that the current block belongs to, a position of the luma sample within the current block, the number of luma samples belonging to the current block, a width and a height of the current block, and a position of the subsampled chroma sample relative to the luma sample within the current block.

In a possible implementation form of the method according to the first aspect as such, when the subsampled chroma sample is not co-located with the corresponding luma sample, a first relationship (such as Table 4) between a plurality of filters and the values of the width and a height of the current block is used for the determination of the filter;

when the subsampled chroma sample is co-located with the corresponding luma sample, a second or third relationship (such as either Tables 2 or Table 3) between a plurality of filters and the values of the width and a height of the current block is used for the determination of the filter.

In a possible implementation form of the method according to the first aspect as such, the second or third relationship (such as either Tables 2 or Table 3) between a plurality of filters and the values of the width and a height of the current block is determined on the basis of the number of the luma samples belonging to the current block.

In a possible implementation form of the method according to the first aspect as such, the filter comprises non-zero coefficients at positions that are horizontally and vertically adjacent to the position of the filtered reconstructed luma sample, when chroma component of the current block is not subsampled.

(such as $$\begin{bmatrix} 0 & 1 & 0 \\ 1 & 4 & 1 \\ 0 & 1 & 0 \end{bmatrix},$$

wherein the central position with the coefficient "4" corresponds to the position of the filtered reconstructed luma sample.

In a possible implementation form of the method according to the first aspect as such, the area of reconstructed luma samples includes a plurality of reconstructed luma samples which are relative to the position of the filtered reconstructed sample, and the position of the filtered reconstructed luma sample corresponds to the position of the luma sample belonging to the current block, and the position of the filtered reconstructed luma sample is inside a luma block of the current block.

In a possible implementation form of the method according to the first aspect as such, the area of reconstructed luma samples includes a plurality of reconstructed luma samples at positions that are horizontally and vertically adjacent to the position of the filtered reconstructed luma sample, and the position of the filtered reconstructed luma sample corresponds to the position of the luma sample belonging to the current block, and the position of the filtered reconstructed luma sample is inside the current block (such as the current luma block or luma component of the current block). Such as, Position of filtered reconstructed luma sample is inside the current block (right part of FIG. 8, we apply filter to luma samples).

In a possible implementation form of the method according to the first aspect as such, the chroma format comprises YCbCr 4:4:4 chroma format, YCbCr 4:2:0 chroma format, YCbCr 4:2:2 chroma format, or Monochrome.

In a possible implementation form of the method according to the first aspect as such, the set of luma samples used as an input of linear model derivation, comprises:

boundary luma reconstructed samples that are subsampled from filtered reconstructed luma samples (such as Rec'$_L$[x, y]).

In a possible implementation form of the method according to the first aspect as such, the predictor for the current chroma block is obtained based on:

$$pred_C(i, j) = \alpha \cdot rec'_L(i, j) + \beta$$

Where $pred_C(i, j)$ represents a chroma sample, and $rec_L(i, j)$ represents a corresponding reconstructed luma sample.

In a possible implementation form of the method according to the first aspect as such, the linear model is a multi-directional linear model (MDLM), and the linear model coefficients are used to obtain the MDLM.

According to a second aspect of the disclosure, a method for intra prediction using linear model is provided, the method comprising:

determining a filter for a luma component of a current block, based on a chroma format of a picture that the current block belongs to;

applying the determined filter to an area of reconstructed luma samples of the luma component of the current block and luma samples in selected position neighboring (one or several rows/columns adjacent to the left or the top side of the current block) to the current block, to obtain filtered reconstructed luma samples (e.g. the filtered reconstructed luma sample inside the current block (such as the luma component of the current block));

obtaining, based on the filtered reconstructed luma samples as an input of linear model derivation (e.g. the set of luma samples includes the filtered reconstructed luma samples inside the current block and filtered neighboring luma samples outside the current block, for example, the determined filter may be also applied to the neighboring luma samples outside the current block), linear model coefficients; and performing cross-component prediction based on the obtained linear model coefficients and the filtered reconstructed luma samples of the current block (e.g. the filtered reconstructed luma samples inside the current block (such as the luma component of the current block)) to obtain the predictor of a current chroma block.

In a possible implementation form of the method according to the second aspect as such, the determining a filter comprises:

determining the filter based on a position of the luma sample within the current block and the chroma format; or determining respective filters for a plurality of luma samples belonging to the current block, based on respective positions of the luma samples within the current block and the chroma format.

In a possible implementation form of the method according to the second aspect as such, the determining a filter comprises: determining the filter based on one or more of the following:

subsampling ratio information (such as SubWidthC and SubHeightC, which may be obtained from a table according to a chroma format of a picture that the current block belongs to), a chroma format of a picture that the current block belongs to (such as, wherein the chroma format is used to obtain subsampling ratio information (such as SubWidthC and SubHeightC)), a position of the luma sample within the current block, the number of luma samples belonging to the current block, a width and a height of the current block, and/or a position of the subsampled chroma sample relative to the luma sample within the current block.

In a possible implementation form of the method according to any preceding implementation of the second aspect or the second aspect as such, when the subsampled chroma sample is not co-located with the corresponding luma sample, a first preset relationship (such as Table 4) between a plurality of filters and subsampling ratio information (such as SubWidthC and SubHeightC, or such as the values of the width and a height of the current block) is used for the determination of the filter; and/or, when the subsampled chroma sample is co-located with the corresponding luma sample, a preset second or third preset relationship (such as either Tables 2 or Table 3) between a plurality of filters and subsampling ratio information (such as SubWidthC and SubHeightC, or such as the values of the width and a height of the current block) is used for the determination of the filter.

In a possible implementation form of the method according to any preceding implementation of the second aspect or the second aspect as such, the second or third relationship (such as either Tables 2 or Table 3) between a plurality of filters and subsampling ratio information (such as SubWidthC and SubHeightC, or such as the values of the width and a height of the current block) is determined on the basis of the number of the certain luma samples (such as the available luma sample) belonging to the current block.

In a possible implementation form of the method according to any preceding implementation of the second aspect or the second aspect as such, the filter is determined conditionally as follows:

if a first condition (such as the subsampling ratio information obtained from the table defined in the specification, such as SubWidthC==1 and SubHeightC==1) is not met, the following applies for a set of filters {F3, F5, F6};

F3[0]=1, F3[1]=2, F3[2]=1;

if a second condition (such as the subsampling ratio information obtained from the table, such as SubWidthC==2 and SubHeightC==2) is met,

F5[0][1]=1, F5[1][1]=4, F3[2][1]=1, F5[1][0]=1, F5[1][2]=1,

F6[0][1]=1, F6[1][1]=2, F6[2][1]=1,

F6[0][2]=1, F6[1][2]=2, F6[2][2]=1,

F2[0]=1, F2[1]=1 otherwise, (e.g. if a second condition (the subsampling ratio information obtained from the table, such as SubWidthC==2 and SubHeightC==2) is not met),

F5[0][1]=0, F5[1][1]=8, F5[2][1]=0, F5[1][0]=0, F5[1][2]=0,

F6[0][1]=2, F6[1][1]=4, F6[2][1]=2,

F6[0][2]=0, F6[1][2]=0, F6[2][2]=0,

F2[0]=2, F2[1]=0.

In a possible implementation form of the method according to any preceding implementation of the second aspect or the second aspect as such, the filter comprises non-zero coefficients at positions that are horizontally and/or vertically adjacent to the position of the filtered reconstructed luma sample, when chroma component of the current block is not subsampled.
(such as $$\begin{bmatrix} 0 & 1 & 0 \\ 1 & 4 & 1 \\ 0 & 1 & 0 \end{bmatrix},$$

wherein the central position with the coefficient "4" corresponds to the position of the filtered reconstructed luma sample).

In a possible implementation form of the method according to any preceding implementation of the second aspect or the second aspect as such, the area of reconstructed luma samples includes a plurality of reconstructed luma samples which are relative to the position of the filtered reconstructed sample, and the position of the filtered reconstructed luma sample corresponds to the position of the luma sample belonging to the block, and the position of the filtered reconstructed luma sample is inside a luma block of the block.

In a possible implementation form of the method according to any preceding implementation of the second aspect or the second aspect as such, the area of reconstructed luma samples includes a plurality of reconstructed luma samples at positions that are horizontally and/or vertically adjacent to the position of the filtered reconstructed luma sample, and the position of the filtered reconstructed luma sample corresponds to the position of the luma sample belonging to the block, and the position of the filtered reconstructed luma sample is inside the block (such as the current luma block or luma component of the current block).

In a possible implementation form of the method according to any preceding implementation of the second aspect or the second aspect as such, the chroma format comprises YCbCr 4:4:4 chroma format, YCbCr 4:2:0 chroma format, YCbCr 4:2:2 chroma format, or Monochrome.

In a possible implementation form of the method according to any preceding implementation of the second aspect or the second aspect as such, the set of luma samples used as an input of linear model derivation, comprises:

boundary luma reconstructed samples that are subsampled from filtered reconstructed luma samples (such as $Rec'_L[x, y]$).

In a possible implementation form of the method according to any preceding implementation of the second aspect or the second aspect as such, the predictor for the current chroma block is obtained based on:

$$pred_C(i, j) = \alpha \cdot rec'_L(i, j) + \beta$$

Where $pred_C(i, j)$ represents a chroma sample, and $rec_L(i, j)$ represents a corresponding reconstructed value of a luma sample (such as, the position of the corresponding reconstructed luma sample is inside the current block), $\alpha$ and $\beta$ represent the linear model coefficients.

In a possible implementation form of the method according to any preceding implementation of the second aspect or the second aspect as such, the linear model is a multi-directional linear model (MDLM), and the linear model coefficients are used to obtain the MDLM.

According to a third aspect of the disclosure, a method of encoding implemented by an encoding device is provided, the method comprising:

performing intra prediction using linear model (such as cross-component linear model, CCLM, or multi-directional linear model, MDLM) as described in the present disclosure; and generating a bitstream including a plurality of syntax elements, wherein the plurality of syntax elements include a syntax element which indicates a selection of a filter for a luma sample belonging to a block (such as a selection of a luma filter of CCLM, in particular, a SPS flag, such as sps_cclm_colocated_chroma_flag).

In a possible implementation form of the method according to the third aspect as such, when the value of the syntax element is 1 or true, the filter is not applied to a luma sample for the linear model determination and the prediction;

when the value of the syntax element is 0 or false, the filter is applied to a luma sample for the linear model determination and the prediction.

According to a fourth aspect of the disclosure, a method of decoding implemented by a decoding device, comprising:

parsing from a bitstream a plurality of syntax elements, wherein the plurality of syntax elements include a syntax element which indicates a selection of a filter for a luma sample belonging to a block (such as a selection of a luma filter of CCLM, in particular, a SPS flag, such as sps_cclm_colocated_chroma_flag); and performing intra prediction using the indicated linear model (such as CCLM) as described in the present disclosure.

In a possible implementation form of the method according to the fourth aspect as such, when the value of the syntax element is 0 or false, the filter is applied to a luma sample for the linear model determination and the prediction;

when the value of the syntax element is 1 or true, the filter is not applied to a luma sample for the linear model determination and the prediction.

According to a fifth aspect of the disclosure, an apparatus for intra prediction using linear model is provided, comprising:

a determining unit, configured for determining a filter for a luma sample belonging to a block, based on a chroma format of a picture that the current block belongs to;

a filtering unit, configured for at the position of the luma sample belonging to the current block, applying the determined filter to an area of reconstructed luma samples, to obtain a filtered reconstructed luma sample;

a obtaining unit, configured for obtaining, based on the filtered reconstructed luma sample, a set of luma samples used as an input of linear model derivation; and a prediction unit, configured for performing cross-component prediction based on linear model coefficients of the linear model derivation and the filtered reconstructed luma sample.

In a possible implementation form of the device according to any preceding implementation of the fifth aspect or the fifth aspect as such, the number of the filtered reconstructed samples is equal to or larger than a size of the current luma block.

In a possible implementation form of the device according to any preceding implementation of the fifth aspect or the fifth aspect as such, CCLM is performed for down-sampled reconstructed samples.

In a possible implementation form of the device according to any preceding implementation of the fifth aspect or the fifth aspect as such, only one row of neighboring reconstructed luma samples are used to obtain the filtered reconstructed samples when the current chroma block is at a top boundary.

In a possible implementation form of the device according to any preceding implementation of the fifth aspect or the fifth aspect as such, the linear model is a multi-directional linear model (MDLM), and the linear model coefficients are used to obtain the MDLM.

In a possible implementation form of the device according to any preceding implementation of the fifth aspect or the fifth aspect as such, CCLM or MDLM parameter derivation is performed for the filtered reconstructed samples only belong to a top template of the current luma block, or only belong to a left template of the current luma block, or wherein the reconstructed samples belong to a top template of the current luma block and a left template of the current luma block.

In a possible implementation form of the device according to any preceding implementation of the fifth aspect or the fifth aspect as such, the luma samples in the selected position neighboring to the current block that are samples in a samples row neighboring to the top of the current block, and/or in a samples column neighboring to the left of the current block are evenly separated by an interval/distance/a number of pixels therebetween.

In a possible implementation form of the device according to any preceding implementation of the fifth aspect or the fifth aspect as such, the selected position neighboring to the current block is indicated by:

$S[W'/4, -1]$, $S[3\,W'/4, -1]$, $S[-1, H'/4]$, $S[-1, 3H'/4]$ when LM mode is applied and both above and left neighbouring samples are available;

$S[W'/8, -1]$, $S[3\,W'/8, -1]$, $S[5\,W'/8, -1]$, $S[7\,W'/8, -1]$ when LM-A mode is applied or only the above neighbouring samples are available;

$S[-1, H'/8]$, $S[-1, 3H'/8]$, $S[-1, 5H'/8]$, $S[-1, 7H'/8]$ when LM-L mode is applied or only the left neighbouring samples are available.

A sixth aspect of a decoder (30) comprising processing circuitry for carrying out the method according to any one of the first to third aspects.

A seventh aspect of a computer program product comprising a program code for performing the method according to any one of the first to third aspects.

An eighth aspect of a decoder, comprising:

one or more processors; and a non-transitory computer-readable storage medium coupled to the processors and storing programming for execution by the processors, wherein the programming, when executed by the processors, configures the decoder to carry out the method according to any one of the first to third aspects.

A ninth aspect of an encoder, comprising:

one or more processors; and a non-transitory computer-readable storage medium coupled to the processors and storing programming for execution by the processors, wherein the programming, when executed by the processors, configures the encoder to carry out the method according to any one of the first to third aspects.

A tenth aspect of a non-transitory computer-readable medium carrying a program code which, when executed by a computer device, causes the computer device to perform the method according to any one of the first to third aspects.

An eleventh aspect of an encoder (20) comprising processing circuitry for carrying out the method according to any one of the first to third aspects.

Based on the above, the embodiments disclosed herein have the following technical advantages: the embodiments disclosed herein take into account the chroma format of the picture when predicting chroma samples from luma samples. By selecting the filter set based on the chroma format, the flaws of the previous design are eliminated leading to prediction error reduction and thus a more accurate chroma prediction. The technical result of a smaller prediction error is the reduction of residual signal energy. Coding methods may utilize this residual signal energy reduction to decrease distortion of the reconstructed signal, decrease the bitrate that is required to encode the residual signal, or decrease both distortion and bitrate. These beneficial effects achieved by the embodiments presented herein improve the overall compression performance of the coding method.

In addition, the filters disclosed herein have the following two properties:

the number of taps in horizontal and vertical directions does not exceed 3.

the values of the coefficients are a power of two.

The first property allows the region being accessed for filtering does not exceed 3 samples (the smallest possible non-phase-shifting filter support size). The second property (power of two coefficients) allows the filters to be implemented without multiplication. Instead, the filters can be implemented using left-shifting by a constant value, which requires minimal complexity in hardware design.

No prior art has proposed practical FIR (finite impulse response) filters that have the above properties. None of the FIP filters in the art can provide the same smoothing properties and in the meantime have the same simple implementation as the ones disclosed herein.

Following is an explanation of the applications of the encoding method as well as the decoding method as shown in the above-mentioned embodiments, and a system using them.

Figure 13:
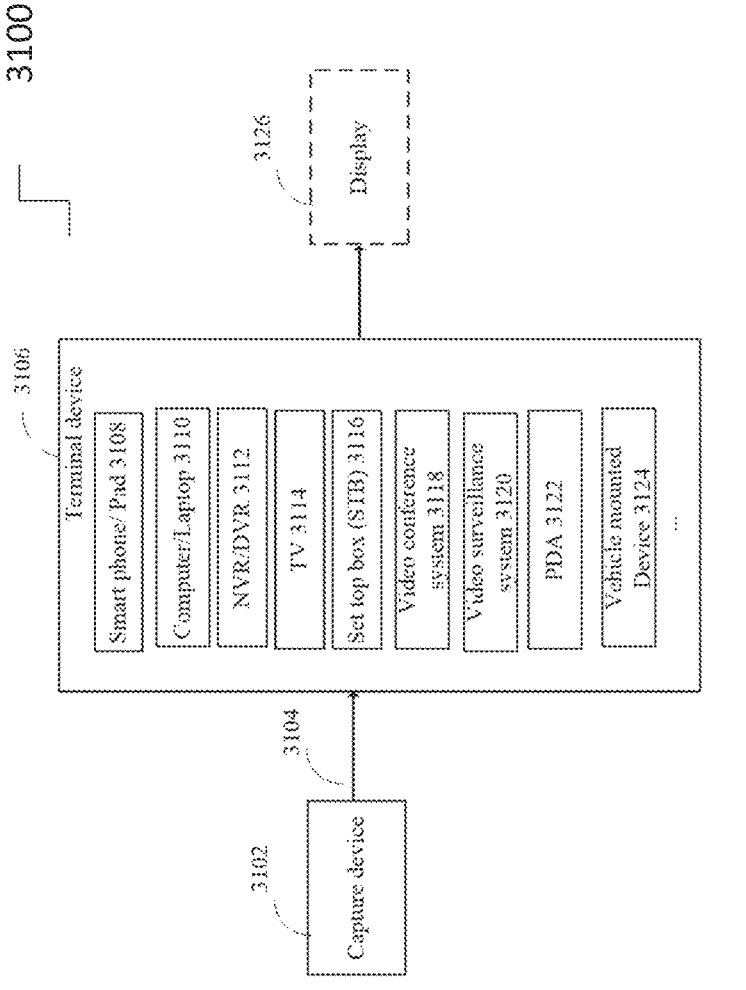
FIG. 13 is a block diagram showing an example structure of a content supply system which realizes a content delivery service.

FIG. 13 is a block diagram showing a content supply system 3100 for realizing content distribution service. This content supply system 3100 includes capture device 3102, terminal device 3106, and optionally includes a display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 3106 receives and reproduces the encoded data. The terminal device 3106 could be a device with data receiving and recovering capability, such as a smart phone or Pad 3108, a computer or laptop 3110, a network video recorder (NVR)/digital video recorder (DVR) 3112, a TV 3114, a set top box (STB) 3116, a video conference system 3118, a video surveillance system 3120, a personal digital assistant (PDA) 3122, a vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, the smart phone or Pad 3108, the computer or laptop 3110, the network video recorder (NVR)/digital video recorder (DVR) 3112, the TV 3114, the personal digital assistant (PDA) 3122, or the vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 14:
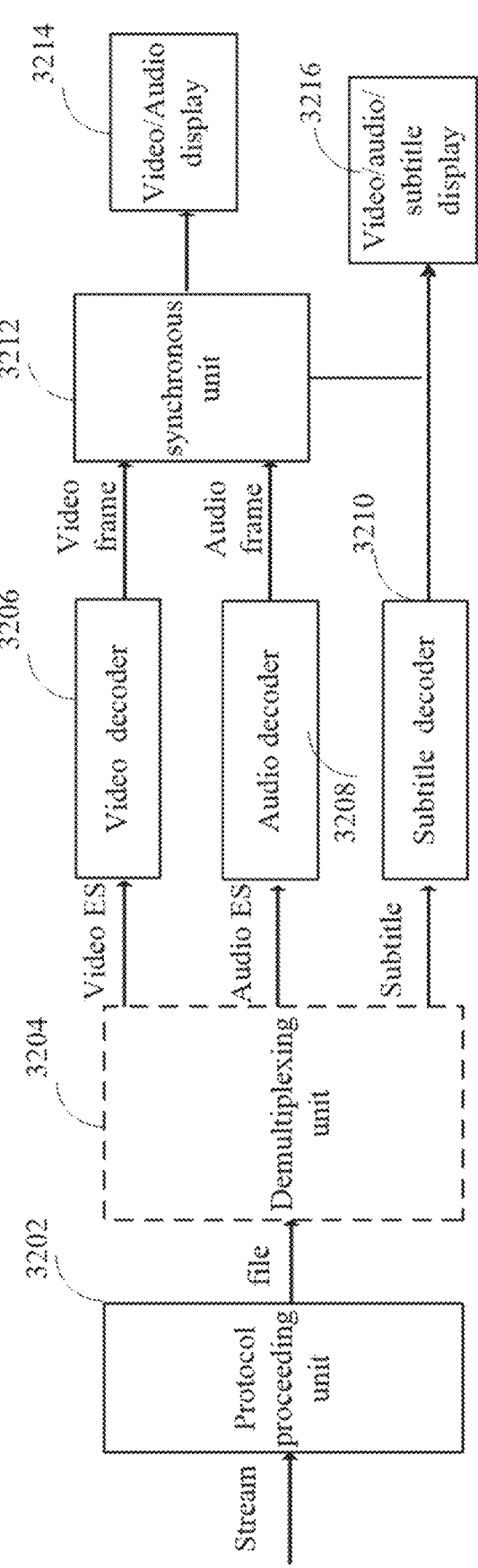
FIG. 14 is a block diagram showing a structure of an example of a terminal device.

FIG. 14 is a diagram showing a structure of an example of the terminal device 3106. After the terminal device 3106 receives stream from the capture device 3102, a protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 14) before feeding it to the synchronous unit 3212. Similarly, the audio frame may store in a buffer (not shown in FIG. 14) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

| + | Addition |
|---|---|
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/ 4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f( i ) with i taking all integer values from x up to and including y. |
| x % y | Modulus. Remainder of x divided by y, defined only for integers x and y with x >= 0 and y > 0. |

Logical Operators

The following logical operators are defined as follows:

x&&y Boolean logical "and" of x and y x||y Boolean logical "or" of x and y

!Boolean logical "not"

x?y:z If x is TRUE or not equal to 0, evaluates to the value of y; otherwise, evaluates to the value of z.

Relational Operators

The following relational operators are defined as follows:

| > | Greater than |
|---|---|
| >= | Greater than or equal to |
| < | Less than |
| <= | Less than or equal to |
| = = | Equal to |
| != | Not equal to |

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

| & | Bit-wise "and". When operating on integer arguments, operates on a two's complement representation of the integer value. When operating on a binary argument that contains fewer bits than another argument, the shorter argument is extended by adding more significant bits equal to 0. |
|---|---|
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

US 12,563,184 B2

85

Assignment Operators

The following arithmetic operators are defined as follows:

| | |
|---|---|
| = | Assignment operator |
| + + | Increment, i.e., x+ + is equivalent to x = x + 1; when used in an array index, evaluates to the value of the variable prior to the increment operation. |
| − − | Decrement, i.e., x− − is equivalent to x = x −1; when used in an array index, evaluates to the value of the variable prior to the decrement operation. |
| += | Increment by amount specified, i.e., x += 3 is equivalent to x = x + 3, and x += (−3) is equivalent to x = x + (−3). |
| −= | Decrement by amount specified, i.e., x −= 3 is equivalent to x = x − 3, and x −= (−3) is equivalent to x = x − (−3). |

Range Notation

The following notation is used to specify a range of values:

X=y . . . z, x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to 1÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \ \&\& \ y >= 0 \\ Atan\left(\frac{y}{x}\right) - \pi; & x < 0 \ \&\& \ y < 0 \\ +\frac{\pi}{2}; & x == 0 \ \&\& \ y >= 0 \\ -\frac{\pi}{2}; & \text{otherwise} \end{cases}$$

Ceil(x) the smallest integer greater than or equal to x.

Clip1$_Y$(x)=Clip3(0,(1<<BitDepth$_Y$)−1,x)

Clip1$_C$(x)=Clip3(0,(1<<BitDepth$_C$)−1,x)

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d & ; \ b - a >= d/2 \\ c - d & ; \ a - b > d/2 \\ c & ; \ \text{otherwise} \end{cases}$$

Ln(x) the natural logarithm of x (the base-e logarithm, where e is the natural logarithm base constant 2.718 281 828 . . . ).
Log 2(x) the base-2 logarithm of x.
Log 10(x) the base-10 logarithm of x.

$$Min(x, y) = \begin{cases} x & ; \ x <= y \\ y & ; \ x > y \end{cases}$$

$$Min(x, y) = \begin{cases} x & ; \ x >= y \\ y & ; \ x < y \end{cases}$$

$$Round(x) = Sign(x) * Floor(Abs(x) + 0.5)$$

$$Sign(x) = \begin{cases} 1 & ; \ x > 0 \\ 0 & ; \ x == 0 \\ -1 & ; \ x < 0 \end{cases}$$

Sin(x) the trigonometric sine function operating on an argument x in units of radians $$Sqrt(x) = \sqrt{x}$$

$$Swap(x, y) = (y, x)$$

Tan(x) the trigonometric tangent function operating on an argument x in units of radians

Order of Operation Precedence

When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)
"x++", "x−−"
"!x", "−x" (as a unary prefix operator)
x$^y$ "x * y", "x/y", "x ÷ y", "$\frac{x}{y}$", "x % y"

"x + y", "x − y" (as a two-argument operator), "$\sum_{i=x}^{y} f(i)$"

"x << y", "x >> y"
"x < y", "x <= y", "x > y", "x >= y"
"x == y", "x != y"
"x & y"
"x | y"

TABLE-continued

| Operation precedence from highest (at top of table) to lowest (at bottom of table) |
| --- |
| "x && y" |
| "x \| \| y" |
| "x ? y : z" |
| "x ... y" |
| "x = y", "x += y", "x −= y" |

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

. . . as follows/ . . . the following applies:

If condition 0, statement 0

Otherwise, if condition 1, statement 1

. . .

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:

. . . as follows/ . . . the following applies:

If all of the following conditions are true, statement 0:

condition 0a condition 0b

Otherwise, if one or more of the following conditions are true, statement 1:

condition 1a condition 1b

. . .

Otherwise, statement n

In the text, a statement of logical operations as would be described mathematically in the following form:

if (condition 0)

statement 0 if (condition 1)

statement 1 may be described in the following manner:

When condition 0, statement 0

When condition 1, statement 1.

Although embodiments disclosed herein have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform processing unit 206, quantization 208, inverse quantization 210/310, (inverse) transform 212/312, partitioning 262/362, intra-prediction 254/354, and/or loop filtering 220, 320, and entropy coding 270 and entropy decoding unit 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of an example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method of encoding implemented by an encoding device, comprising:

performing intra prediction using a linear model by:

determining subsampling ratio information in horizontal and vertical directions based on chroma format information, wherein the chroma format information indicates a chroma format of a picture that a current block belongs to, wherein the subsampling ratio information in horizontal and vertical directions are represented by values of variables SubWidthC and SubHeightC, respectively;

determining a down-sampling filter used for the values of the variables SubWidthC and SubHeightC;

obtaining down-sampled luma samples of reconstructed luma samples in a luma block of the current block and down-sampled luma reference samples of selected neighboring luma reference samples of the luma block using the down-sampling filter;

determining one or more linear model coefficients based on the obtained down-sampled luma reference samples and neighboring chroma reference samples that correspond to the obtained down-sampled luma reference samples; and obtaining prediction samples of a chroma block that corresponds to the luma block based on the one or more linear model coefficients and the obtained down-sampled luma samples of the reconstructed luma samples in the luma block; and generating a bitstream including a plurality of syntax elements, wherein the plurality of syntax elements includes a SPS flag indicating whether a subsampled chroma sample is co-located with the corresponding luma sample.

2. The method of claim 1, wherein the SPS flag has a value being 0 or 1 indicating whether a subsampled chroma sample is co-located with the corresponding luma sample.

3. The method of claim 1, wherein in the case that SubWidthC=2 and SubHeightC=2, the determining a down-sampling filter used for the values of the variables SubWidthC and SubHeightC comprises:

determining the down-sampling filter corresponding to the values of the variables SubWidthC and SubHeightC based on whether a subsampled chroma sample is co-located with the corresponding luma sample.

4. The method of claim 1, wherein
wherein in the case that SubWidthC=1 and SubHeightC=1, the down-sampling filter $$\begin{bmatrix} 000 \\ 010 \\ 000 \end{bmatrix}$$

is used;
in the case that SubWidthC=2 and SubHeightC=1, the down-sampling filter $$\begin{bmatrix} 000 \\ 121 \\ 000 \end{bmatrix}$$

is used; and
in the case that SubWidthC=2 and SubHeightC=2, the down-sampling filter $$\begin{bmatrix} 010 \\ 141 \\ 010 \end{bmatrix} \text{ or } \begin{bmatrix} 0 & 0 & 0 \\ 1 & 2 & 1 \\ 1 & 2 & 1 \end{bmatrix}$$

is used;
wherein F[i][j] corresponds to a form of a matrix of coefficients of the down-sampling filter used for the values of the variables SubWidthC and SubHeightC, and i=0, 1, 2, j=0, 1, 2.

5. The method of claim 4, wherein in the case that SubWidthC=2 and SubHeightC=2, the down-sampling filter $$\begin{bmatrix} 010 \\ 141 \\ 010 \end{bmatrix} \text{ or } \begin{bmatrix} 0 & 0 & 0 \\ 1 & 2 & 1 \\ 1 & 2 & 1 \end{bmatrix}$$

is used depending on whether a subsampled chroma sample is co-located with the corresponding luma sample.

6. The method of claim 1, wherein the determining one or more linear model coefficients based on the obtained down-sampled luma reference samples of the selected luma reference samples and chroma reference samples that correspond to the obtained down-sampled luma reference samples, comprises:

determining a maximum luma value and a minimum luma value based on the down-sampled luma reference samples;

obtaining a first chroma value based, at least in part, upon one or more positions of one or more down-sampled luma reference samples associated with the maximum luma value;

obtaining a second chroma value based, at least in part, upon one or more positions of one or more down-sampled luma reference samples associated with the minimum luma value; and calculating the one or more linear model coefficients based on the first chroma value, the second chroma value, the maximum luma value and the minimum luma value.

7. The method of claim 1, wherein the determining subsampling ratio information in horizontal and vertical directions based on chroma format information, comprises:

determining subsampling ratio information in horizontal and vertical directions based on the chroma format information using a table, wherein the subsampling ratio information in horizontal and vertical directions are represented by values of the variables SubWidthC and SubHeightC, respectively;

wherein the table comprises:

| chroma_format_idc | separate_colour_plane_flag | Chroma format | SubWidth C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1. |

8. An encoding device, comprising:

a video data memory; and a video encoder configured to:

perform intra prediction using a linear model by:

determining subsampling ratio information in horizontal and vertical directions based on chroma format information, wherein the chroma format information indicates a chroma format of a picture that a current block belongs to, wherein the subsampling ratio information in horizontal and vertical directions are represented by values of variables SubWidthC and SubHeightC, respectively;

determining a down-sampling filter used for the values of the variables SubWidthC and SubHeightC;

obtaining down-sampled luma samples of reconstructed luma samples in a luma block of the current block and down-sampled luma reference samples of selected neighboring luma reference samples of the luma block using the down-sampling filter;

determining one or more linear model coefficients based on the obtained down-sampled luma reference samples and neighboring chroma reference samples that correspond to the obtained down-sampled luma reference samples; and obtaining prediction samples of a chroma block that corresponds to the luma block based on the determined one or more linear model coefficients and the obtained down-sampled luma samples of the reconstructed luma samples in the luma block; and generate a bitstream including a plurality of syntax elements, wherein the plurality of syntax elements includes a SPS flag indicating whether a subsampled chroma sample is co-located with the corresponding luma sample.

9. The encoding device of claim 8, wherein the SPS flag has a value being 0 or 1 indicating whether a subsampled chroma sample is co-located with the corresponding luma sample.

10. The encoding device of claim 8, wherein in the case that SubWidthC=2 and SubHeightC=2, the video encoder is further configured to:

determine the down-sampling filter corresponding to the values of the variables SubWidthC and SubHeightC based on whether a subsampled chroma sample is co-located with the corresponding luma sample.

11. The encoding device of claim 8, wherein wherein in the case that SubWidthC=1 and SubHeightC=1, the down-sampling filter $$\begin{bmatrix} 000 \\ 010 \\ 000 \end{bmatrix}$$

is used;

in the case that SubWidthC=2 and SubHeightC=1, the down-sampling filter $$\begin{bmatrix} 000 \\ 121 \\ 000 \end{bmatrix}$$

is used; and in the case that SubWidthC=2 and SubHeightC=2, the down-sampling filter $$\begin{bmatrix} 010 \\ 141 \\ 010 \end{bmatrix} \text{ or } \begin{bmatrix} 0 & 0 & 0 \\ 1 & 2 & 1 \\ 1 & 2 & 1 \end{bmatrix}$$

is used;

wherein F[i][j] corresponds to a form of a matrix of coefficients of the down-sampling filter used for the values of the variables SubWidthC and SubHeightC, and i=0, 1, 2, j=0, 1, 2.

12. The encoding device of claim 11, wherein in the case that SubWidthC=2 and SubHeightC=2, the down-sampling filter $$\begin{bmatrix} 010 \\ 141 \\ 010 \end{bmatrix} \text{ or } \begin{bmatrix} 0 & 0 & 0 \\ 1 & 2 & 1 \\ 1 & 2 & 1 \end{bmatrix}$$

is used depending on whether a subsampled chroma sample is co-located with the corresponding luma sample.

13. The encoding device of claim 8, wherein the video encoder is further configured to:

determine a maximum luma value and a minimum luma value based on the down-sampled luma reference samples;

obtain a first chroma value based, at least in part, upon one or more positions of one or more down-sampled luma reference samples associated with the maximum luma value;

obtain a second chroma value based, at least in part, upon one or more positions of one or more down-sampled luma reference samples associated with the minimum luma value; and calculate the one or more linear model coefficients based on the first chroma value, the second chroma value, the maximum luma value and the minimum luma value.

14. The encoding device of claim 8, wherein the video encoder is further configured to:

determine subsampling ratio information in horizontal and vertical directions based on the chroma format information using a table, wherein the subsampling ratio information in horizontal and vertical directions are represented by values of the variables SubWidthC and SubHeightC, respectively;

wherein the table comprises:

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1. |

15. A non-transitory computer-readable medium storing computer instructions that, when executed by one or more processors, cause the one or more processors to perform encoding operations comprising:

performing intra prediction using a linear model by:

determining subsampling ratio information in horizontal and vertical directions based on chroma format information, wherein the chroma format information indicates a chroma format of a picture that a current block belongs to, wherein the subsampling ratio information in horizontal and vertical directions are represented by values of variables SubWidthC and SubHeightC, respectively;

determining a down-sampling filter used for the values of the variables SubWidthC and SubHeightC;

obtaining down-sampled luma samples of reconstructed luma samples in a luma block of the current block and down-sampled luma reference samples of selected neighboring luma reference samples of the luma block using the down-sampling filter;

determining one or more linear model coefficients based on the obtained down-sampled luma reference samples and neighboring chroma reference samples that correspond to the obtained down-sampled luma reference samples; and obtaining prediction samples of a chroma block that corresponds to the luma block based on the determined one or more linear model coefficients and the obtained down-sampled luma samples of the reconstructed luma samples in the luma block; and generating a bitstream including a plurality of syntax elements, wherein the plurality of syntax elements includes a SPS flag indicating whether a subsampled chroma sample is co-located with the corresponding luma sample.

16. The non-transitory computer-readable medium of claim 15, wherein the SPS flag has a value being 0 or 1 indicating whether a subsampled chroma sample is co-located with the corresponding luma sample.

17. The non-transitory computer-readable medium of claim 15, wherein in the case that SubWidthC=2 and SubHeightC=2, the determining a down-sampling filter used for the values of the variables SubWidthC and SubHeightC comprises:

determining the down-sampling filter corresponding to the values of the variables SubWidthC and SubHeightC based on whether a subsampled chroma sample is co-located with the corresponding luma sample.

18. The non-transitory computer-readable medium of claim 15, wherein wherein in the case that SubWidthC=1 and SubHeightC=1, the down-sampling filter $$\begin{bmatrix} 000 \\ 010 \\ 000 \end{bmatrix}$$

is used;

in the case that SubWidthC=2 and SubHeightC=1, the down-sampling filter $$\begin{bmatrix} 000 \\ 121 \\ 000 \end{bmatrix}$$

is used; and in the case that SubWidthC=2 and SubHeightC=2, the down-sampling filter $$\begin{bmatrix} 010 \\ 141 \\ 010 \end{bmatrix} \text{ or } \begin{bmatrix} 0 & 0 & 0 \\ 1 & 2 & 1 \\ 1 & 2 & 1 \end{bmatrix}$$

is used;

wherein F[i][j] corresponds to a form of a matrix of coefficients of the down-sampling filter used for the values of the variables SubWidthC and SubHeightC, and i=0, 1, 2, j=0, 1, 2.

19. The non-transitory computer-readable medium of claim 18, wherein in the case that SubWidthC=2 and SubHeightC=2, the down-sampling filter $$\begin{bmatrix} 010 \\ 141 \\ 010 \end{bmatrix} \text{ or } \begin{bmatrix} 0 & 0 & 0 \\ 1 & 2 & 1 \\ 1 & 2 & 1 \end{bmatrix}$$

is used depending on whether a subsampled chroma sample is co-located with the corresponding luma sample.

20. A non-transitory computer-readable medium storing an encoded bitstream and computer instructions that, when executed by one or more processors, cause the one or more processors to generate the encoded bitstream for video signals, the encoded bitstream comprising a plurality of syntax elements, wherein the plurality of syntax elements includes a SPS flag indicating whether a subsampled chroma sample is co-located with the corresponding luma sample, and wherein generating the encoded bitstream comprises:

determining subsampling ratio information in horizontal and vertical directions based on chroma format information, wherein the chroma format information indicates a chroma format of a picture that a current block belongs to, wherein the subsampling ratio information in horizontal and vertical directions are represented by values of variables SubWidthC and SubHeightC, respectively;

determining a down-sampling filter corresponding to the values of the variables SubWidthC and SubHeightC based on whether the subsampled chroma sample is co-located with the corresponding luma sample;

obtaining down-sampled luma samples of reconstructed luma samples in a luma block of the current block and down-sampled luma reference samples of selected neighboring luma reference samples of the luma block using the down-sampling filter;

determining one or more linear model coefficients based on the obtained down-sampled luma reference samples and neighboring chroma reference samples that correspond to the obtained down-sampled luma reference samples; and obtaining prediction samples of a chroma block that corresponds to the luma block based on the determined one or more linear model coefficients and the obtained down-sampled luma samples of the reconstructed luma samples in the luma block.

* * * * *